(12) United States Patent
Walley et al.

(10) Patent No.: US 10,985,619 B2
(45) Date of Patent: Apr. 20, 2021

(54) SYSTEM, DEVICE, AND METHOD FOR RECEPTION AND TRANSMISSION OF WIRELESS POWER AND COMMUNICATION BETWEEN A WIRELESS POWER TRANSMITTER AND A PERIPHERAL DEVICE

(71) Applicant: KONINKLIJKE PHILIPS N.V., Eindhoven (NL)

(72) Inventors: John Walley, Ladera Ranch, CA (US); Jeyhan Karaoguz, Irvine, CA (US); Ahmadreza (Reza) Rofougaran, Newport Coast, CA (US); Nambirajan Seshadri, Irvine, CA (US); Reinier Van Der Lee, Lake Forest, CA (US)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 16/445,752

(22) Filed: Jun. 19, 2019

(65) Prior Publication Data

US 2019/0305827 A1    Oct. 3, 2019

Related U.S. Application Data

(63) Continuation of application No. 12/772,210, filed on May 1, 2010, now abandoned.
(Continued)

(51) Int. Cl.
*H02J 50/80* (2016.01)
*H02J 50/12* (2016.01)
(Continued)

(52) U.S. Cl.
CPC .......... *H02J 50/80* (2016.02); *G06K 7/10207* (2013.01); *G06K 7/10346* (2013.01);
(Continued)

(58) Field of Classification Search
CPC .. H02J 7/025; H02J 50/80; H02J 50/12; H02J 5/005; H02J 50/40; H04B 5/0037;
(Continued)

(56) References Cited

U.S. PATENT DOCUMENTS 7,631,105 B2    12/2009    Dowling
8,427,101 B2    4/2013    Saunamaki
(Continued)

FOREIGN PATENT DOCUMENTS

WO    2004061887 A1    7/2004
WO    2008118477 A1    10/2008

OTHER PUBLICATIONS

WiTricity: Wireless Electricity Oct. 2009, p. 29.
(Continued)

*Primary Examiner* — Richard Isla
*Assistant Examiner* — Manuel Hernandez

(57) ABSTRACT

A wireless power system includes a primary device and a secondary device. The primary device includes a power conversion unit, a function module, and a transceiver. The peripheral device includes a wireless power receiver circuit, a peripheral transceiver, and a peripheral unit. The power conversion unit converts a power source into an electromagnetic signal. The functional module executes a function regarding peripheral information. The transceiver communicates information regarding the electromagnetic signal and the peripheral information. The wireless power receiver circuit converts the electromagnetic signal into a voltage. The peripheral transceiver communicates the information regarding the electromagnetic signal and the peripheral information. The peripheral unit processes the peripheral information.

20 Claims, 61 Drawing Sheets

Related U.S. Application Data

(60) Provisional application No. 61/264,925, filed on Nov. 30, 2009.

(51) Int. Cl.

| | | |
|---|---|---|
| *H04B 5/00* | (2006.01) | |
| *G06K 7/10* | (2006.01) | |
| *G06K 19/07* | (2006.01) | |
| *H02J 7/02* | (2016.01) | |
| *H04L 29/06* | (2006.01) | |
| *H02J 5/00* | (2016.01) | |
| *H02J 50/40* | (2016.01) | |

(52) U.S. Cl.
CPC ..... *G06K 19/0701* (2013.01); *G06K 19/0715* (2013.01); *G06K 19/0723* (2013.01); *H02J 7/025* (2013.01); *H02J 50/12* (2016.02); *H04B 5/0037* (2013.01); *H02J 5/005* (2013.01); *H02J 50/40* (2016.02); *H04L 29/06163* (2013.01); *H04L 69/18* (2013.01)

(58) Field of Classification Search
CPC ........... G06K 7/10207; G06K 7/10346; G06K 19/0701; G06K 19/0715; G06K 19/0723; H04L 69/18; H04L 29/06163
USPC .......................................... 320/108; 307/104
See application file for complete search history.

(56) References Cited

U.S. PATENT DOCUMENTS

| | | | |
|---|---|---|---|
| 8,525,370 B2 | 9/2013 | Walley | |
| 8,618,697 B2 | 12/2013 | Karaoguz | |
| 9,035,601 B2* | 5/2015 | Kim ........................ | H02J 7/025 320/108 |
| 10,074,837 B2* | 9/2018 | Miller ..................... | H02J 50/12 |
| 2004/0204071 A1* | 10/2004 | Bahl ....................... | H04W 28/18 455/557 |
| 2005/0095498 A1 | 5/2005 | Silverman | |
| 2005/0134213 A1 | 6/2005 | Takagi et al. | |
| 2006/0038572 A1 | 2/2006 | Philbrook | |
| 2006/0113955 A1* | 6/2006 | Nunally .................. | H02J 7/025 320/108 |
| 2006/0252370 A1* | 11/2006 | Goossens ................. | H04B 5/02 455/41.1 |
| 2007/0086225 A1* | 4/2007 | Baarman ........... | H02M 7/53803 363/131 |
| 2007/0103110 A1* | 5/2007 | Sagoo ..................... | H02J 50/10 320/109 |
| 2009/0187495 A1 | 7/2009 | Bertness | |
| 2009/0212781 A1 | 8/2009 | Bertness | |
| 2010/0036773 A1* | 2/2010 | Bennett .................. | G06Q 50/06 705/67 |
| 2010/0066305 A1* | 3/2010 | Takahashi ............... | H02J 50/10 320/108 |
| 2010/0148723 A1* | 6/2010 | Cook .................. | G06K 7/0008 320/108 |
| 2010/0194335 A1 | 8/2010 | Kirby et al. | |
| 2011/0025265 A1* | 2/2011 | Mochida ................ | H02J 50/80 320/108 |
| 2011/0101783 A1* | 5/2011 | Hoffman ................ | H02J 5/005 307/72 |
| 2011/0115430 A1 | 5/2011 | Saunamaki | |
| 2011/0127951 A1* | 6/2011 | Walley .................... | H02J 50/80 320/108 |
| 2012/0153894 A1* | 6/2012 | Widmer .................. | H02J 50/90 320/108 |
| 2014/0349573 A1* | 11/2014 | Moes ...................... | H02J 50/40 455/41.1 |
| 2015/0022016 A1* | 1/2015 | Kim ........................ | H02J 50/80 307/104 |
| 2015/0155739 A1 | 6/2015 | Walley | |
| 2015/0326062 A1* | 11/2015 | Gonzalez Valdez ........................ | H04B 5/0075 320/108 |

OTHER PUBLICATIONS

Andre Kurs et al "Wireless Power Transfer via Strongly Coupled Magnetic Resonances" Science, Jul. 6, 2007, p. 83-86 vol. 317.
Partial European Search Report EP Application No. EP10014990; dated Apr. 13, 2011.

* cited by examiner

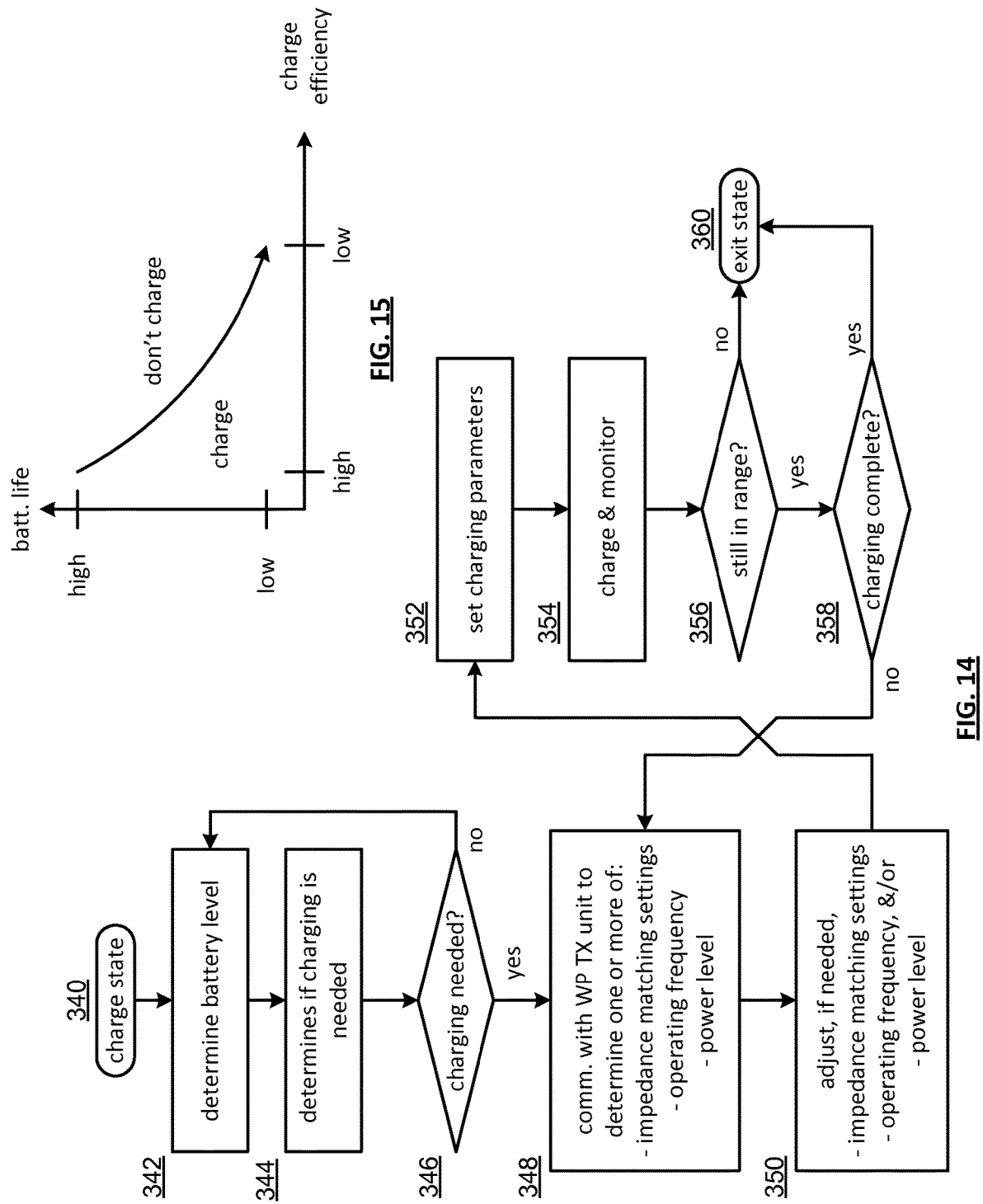

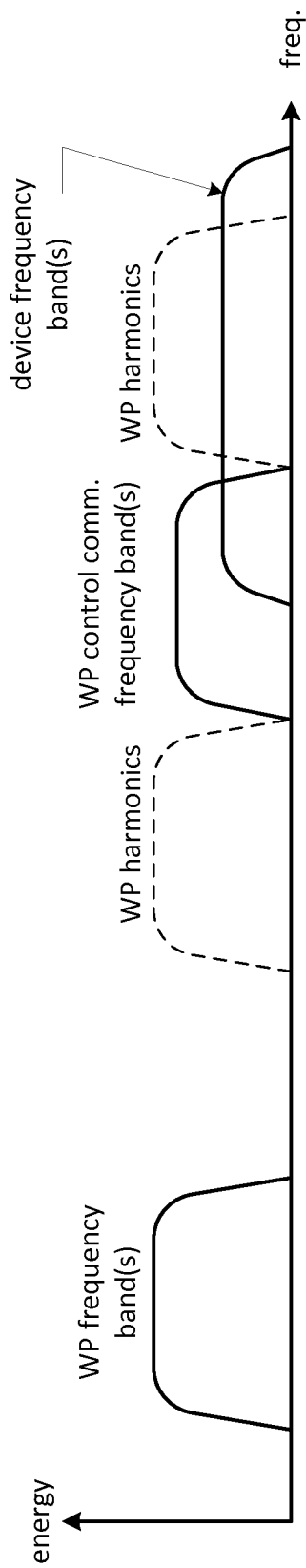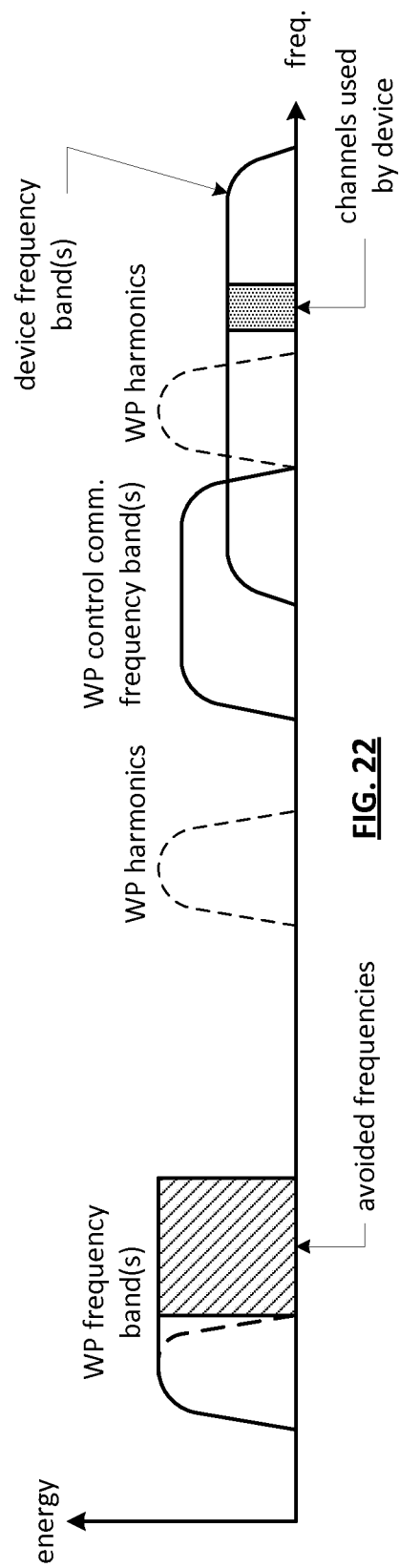

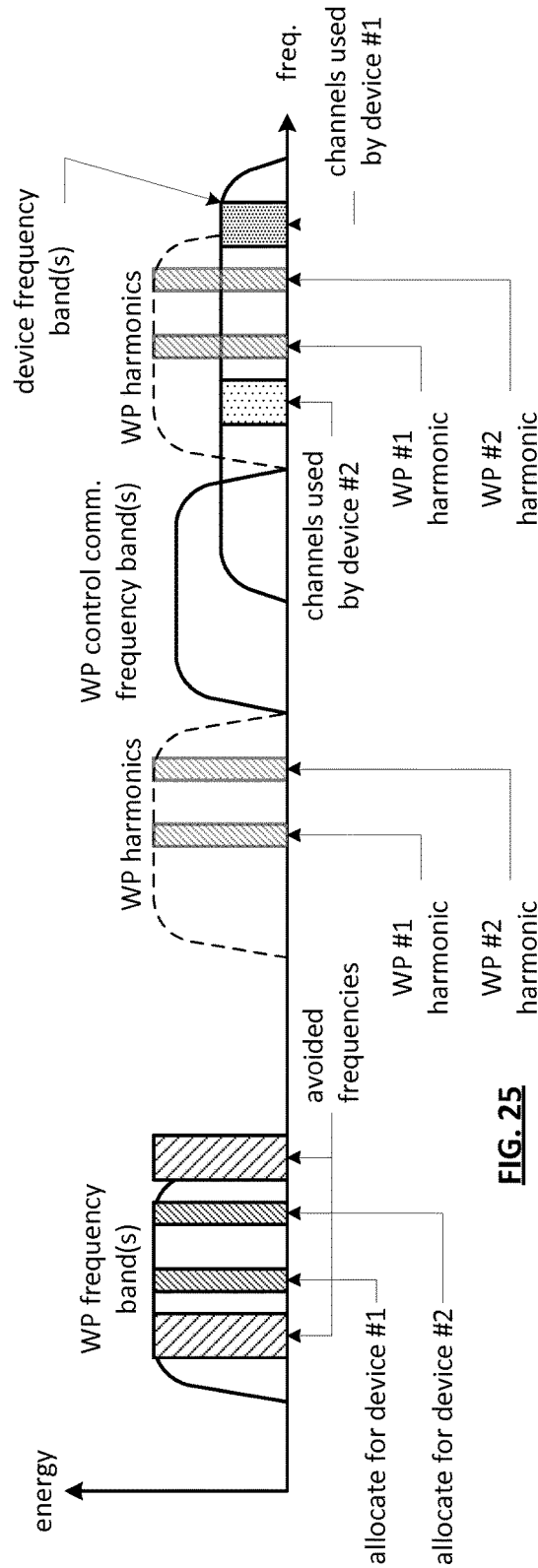
FIG. 25
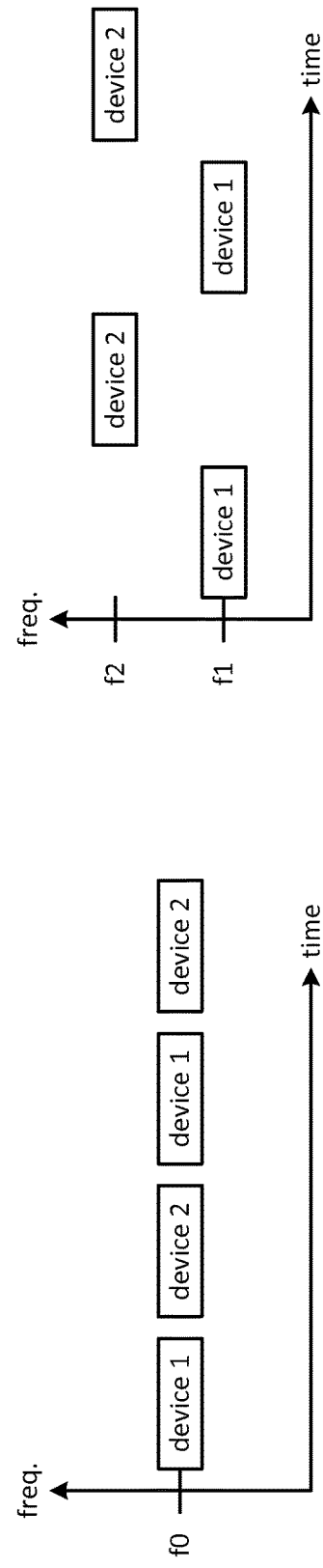
FIG. 27
FIG. 26

# SYSTEM, DEVICE, AND METHOD FOR RECEPTION AND TRANSMISSION OF WIRELESS POWER AND COMMUNICATION BETWEEN A WIRELESS POWER TRANSMITTER AND A PERIPHERAL DEVICE

CROSS-REFERENCE TO PRIOR APPLICATIONS

This application a continuation of U.S. patent application Ser. No. 12/772,210, filed on May 1, 2010, which claims the benefit of U.S. Patent Application No. US 61/264,925 filed on Nov. 30, 2009. These applications are hereby incorporated by reference.

BACKGROUND OF THE INVENTION

Technical Field of the Invention

This invention relates to power conversion and more particularly to wireless power conversion and supporting communications thereof.

Description of Related Art

The concept of wireless power (i.e., powering a device without an electrical power cord) has been around for a while and has recently been commercialized. In addition, there are a couple of on-going standards discussions (WPC—wireless communication alliance and CEA—consumer electronics association) to standardize wireless power systems.

Current commercially available wireless power products include a transmit unit, a receive unit, and a bidirectional control channel. In these products, the primary method of energy transfer is inductive coupling, but some lower power applications may include solar energy transfer, thermoelectronic energy transfer, and/or capacitive energy transfer. To use these products, the receive unit is a separate unit that must be coupled to a device that is to be wirelessly powered. Thus, the device itself cannot be wirelessly powered without the receive unit coupled to it.

To develop these products, effort has been spent on inductive power transfer, closed loop systems, and multiple load support. In the area of inductive power transfer, effort has been spent on optimizing the tuning the transmit and receive circuits (each of which includes a single inductor) for resonance, efficiency, and/or thermal issues, detecting loads, turning off the inductive power transfer, coil alignment, magnetic alignment, lower phantom power, Class D, E power transmitters with load compensation, antenna design, and coil switching. In the area of multiple load support, effort has been spent on power sharing and tuning, control channel multi-access, and collision avoidance.

In the area of closed loop systems, effort has been spent on regulating the transmit power, the transmit resonance, alignment to maximize safety and/or power transfer using a particular control channel protocol (e.g., backscatter, IrDA, or Bluetooth). As such, as long as the receive unit and transmit unit are from the same vendor using the same communication protocol for the control channel, wireless power transfer can occur. While the above referenced standards organization are attempting to establish standards regarding the control channel protocol, currently, vendors are free to use whatever protocol they chose, making compatibility issues between different vendors' wireless power products.

While effort has been spent to commercialize wireless power systems, there is still significant effort needed to make cost-effective and/or feature rich wireless power systems.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 14 is a logic diagram of an embodiment of a method for a charge state in accordance with the present invention;

FIG. 15 is a diagram of an example of a graph of charge need versus charge efficiency in accordance with the present invention;

FIG. 21 is a diagram of an example of frequency planning within a wireless power system in accordance with the present invention;

FIG. 22 is a diagram of another example of frequency planning within a wireless power system in accordance with the present invention;

FIG. 25 is a diagram of another example of frequency planning within a wireless power system in accordance with the present invention;

FIG. 26 is a diagram of another example of frequency planning within a wireless power system in accordance with the present invention;

FIG. 27 is a diagram of another example of frequency planning within a wireless power system in accordance with the present invention;

DETAILED DESCRIPTION OF THE INVENTION

Figure 1:
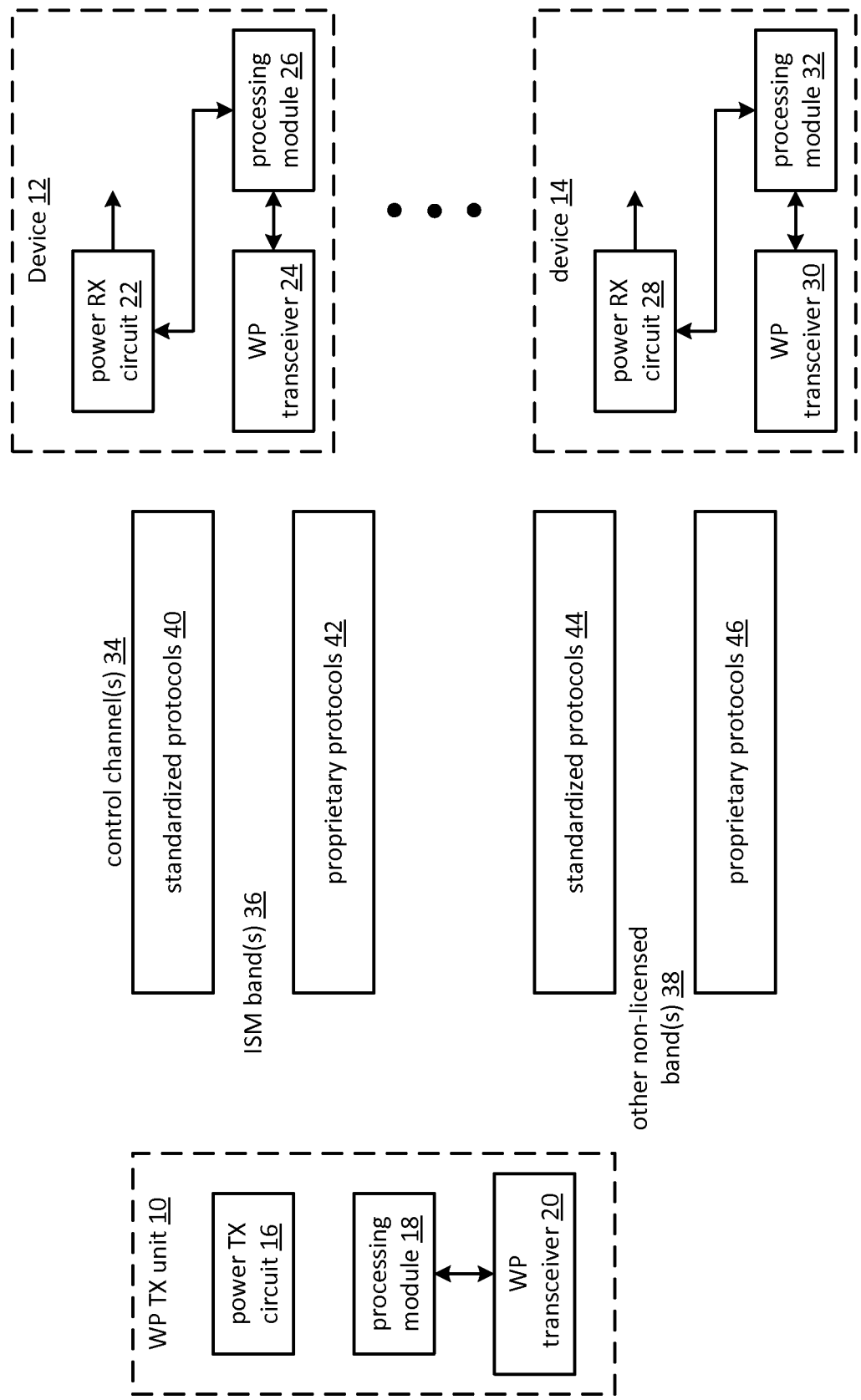
FIG. 1 is a schematic block diagram of an embodiment of a wireless power system in accordance with the present invention.

FIG. 1 is a schematic block diagram of an embodiment of a wireless power system that includes a wireless power (WP) transmit (TX) unit 10 and one or more devices 12-14. The WP TX unit 10 includes a processing module 18, a WP transceiver 20, and a power TX circuit 16. Each device 12-14 includes a WP receive (RX) circuit 22, 28, a processing module 26, 32, and a WP transceiver 24, 30. The device 12-14 will most likely include a plurality of other components depending on its desired functionality. For example, the device 12-14 may be a cell phone, a personal audio/video player, a video game unit, a toy, etc. and includes the corresponding circuitry.

The processing modules 18, 26, 32 of the WP TX unit 10 and in each of the devices 12-14 may each be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 18, 26, 32 may have an associated memory and/or memory element, which may be a single memory device, a plurality of memory devices, and/or embedded circuitry of the processing module 18, 26, 32. Such a memory device may be a read-only memory, random access memory, volatile memory, non-volatile memory, static memory, dynamic memory, flash memory, cache memory, and/or any device that stores digital information. Note that if the processing module 18, 26, 32 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 18, 26, 32 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 18, 26, 32 executes, hard coded and/or operational instructions corresponding to at least some of the steps and/or functions illustrated in FIGS. 1-36.

The WP TX unit 10 communicates with the WP transceivers 24, 30 of the devices 12-14 via one or more control channels 34 that use one or more frequencies in the ISM bands 36 and/or one or more frequencies in another non-licensed frequency band(s) 38. The communication via the control channel 34 may use one or more standardized protocols 40, 44 and/or one or more proprietary protocols 42, 46. For example, the standardized protocols 40, 44 may include Bluetooth (2400 MHz), HIPERLAN (5800 MHz), IEEE 802.11 (2400 MHz and 5800 MHz), and IEEE 802.15.4 (personal area networks using 915 MHz or 2400 MHz).

The ISM bands 36 include:

| Frequency range | Center frequency |
| --- | --- |
| 6.765-6.795 MHz | 6.780 MHz |
| 13.553-13.567 MHz | 13.560 MHz |
| 26.957-27.283 MHz | 27.120 MHz |
| 40.66-40.70 MHz | 40.68 MHz |
| 433.05-434.79 MHz | 433.92 MHz |
| 902-928 MHz | 915 MHz |
| 2.400-2.500 GHz | 2.450 GHz |
| 5.725-5.875 GHz | 5.800 GHz |
| 24-24.25 GHz | 24.125 GHz |
| 61-61.5 GHz | 61.25 GHz |
| 122-123 GHz | 122.5 GHz |
| 244-246 GHz | 245 GHz |

Each of the WP power transceivers 20, 24, 30 (e.g., in the WP TX unit 10 and in each of the devices 12-14) includes baseband processing (which may be done by the corresponding processing module 18, 26, 32), a radio frequency (RF) and/or a millimeter wave (MMW) transmitter section, and an RF and/or MMW receiver section. In an example of operation, the baseband processing converts outbound data into outbound symbol stream in accordance with one or more wireless communication standards (e.g., GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), proprietary protocol, etc.). Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion.

The transmitter section converts the outbound symbol stream into an outbound RF signal that has a carrier frequency within a given frequency band (e.g., ISM bands 36). In an embodiment, this may be done by mixing the outbound symbol stream with a local oscillation to produce an up-converted signal. One or more power amplifiers and/or power amplifier drivers amplifies the up-converted signal, which may be RF bandpass filtered, to produce the outbound RF signal. In another embodiment, the transmitter section includes an oscillator that produces an oscillation. The outbound symbol stream provides phase information (e.g., +/−Δθ [phase shift] and/or θ(t) [phase modulation]) that adjusts the phase of the oscillation to produce a phase adjusted RF signal, which is transmitted as the outbound RF signal. In another embodiment, the outbound symbol stream includes amplitude information (e.g., A(t) [amplitude modulation]), which is used to adjust the amplitude of the phase adjusted RF signal to produce the outbound RF signal.

In yet another embodiment, the transmitter section includes an oscillator that produces an oscillation. The outbound symbol provides frequency information (e.g., +/−Δf [frequency shift] and/or f(t) [frequency modulation]) that adjusts the frequency of the oscillation to produce a frequency adjusted RF signal, which is transmitted as the outbound RF signal. In another embodiment, the outbound symbol stream includes amplitude information, which is used to adjust the amplitude of the frequency adjusted RF signal to produce the outbound RF signal. In a further embodiment, the transmitter section includes an oscillator that produces an oscillation. The outbound symbol provides amplitude information (e.g., +/−ΔA [amplitude shift] and/or A(t) [amplitude modulation) that adjusts the amplitude of the oscillation to produce the outbound RF signal.

The receiver section receives and amplifies an inbound RF signal to produce an amplified inbound RF signal. The receiver section may then mix in-phase (I) and quadrature (Q) components of the amplified inbound RF signal with in-phase and quadrature components of a local oscillation to produce a mixed I signal and a mixed Q signal. The mixed I and Q signals are combined to produce an inbound symbol stream. In this embodiment, the inbound symbol may include phase information (e.g., +/−Δθ [phase shift] and/or θ(t) [phase modulation]) and/or frequency information (e.g., +/−Δf [frequency shift] and/or f(t) [frequency modulation]). In another embodiment and/or in furtherance of the preceding embodiment, the inbound RF signal includes amplitude information (e.g., +/−ΔA [amplitude shift] and/or A(t) [amplitude modulation]). To recover the amplitude information, the receiver section includes an amplitude detector such as an envelope detector, a low pass filter, etc.

The baseband processing converts the inbound symbol stream into inbound data (e.g. control channel data) in accordance with one or more wireless communication standards (e.g., GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), proprietary protocol, etc.). Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling.

The WP TX unit 10 communicates with the devices 12-14 via the control channel to facilitate efficient wireless power transfer from the WP TX unit 10 to the power RX circuit 22, 28 of the devices 12-14. For example, the communication may be to determine which frequency to use, to reposition the device 12-14 to improve magnetic coupling, to tune the components of the power TX circuit 16 and/or the power RX circuit 22, 28, to indicate desired power levels, to adjust power levels, etc. As such, during the wireless transfer of energy from the power TX circuit 16 to the power RX circuit 22, 28 of one or more devices 12-14, the WP TX unit 10 and the devices 12-14 communicate to provide a desired performance level of wireless energy transfer.

In another example of operation, the receive unit processing module 26, 32 functions to identify the control channel protocol used by the wireless power transmit unit 10 for control channel communications. Note that the control channel includes one of a plurality of control channel protocols that includes at least one or more standard control channel protocols and/or one or more proprietary control channel protocols. Further note that the transmit unit transceiver 20 uses one of the control channel protocols and is capable of using a subset of the plurality of control channel protocols. For instance, one transmit unit transceiver 20 may use a Bluetooth protocol or a proprietary protocol for its control channel protocol, while another transmit unit transceiver 20 of another wireless power transmit unit 10 may use a different control channel protocol. As such, the receive unit needs to identify the control channel protocol.

The receive unit processing module 26, 32 may identify the control channel protocol by interpreting a beacon signal transmitted by the transmit unit transceiver to determine the control channel protocol. Alternatively, or in addition to the preceding example, the receive unit processing module 26, 32 may identify the control channel protocol by receiving a set-up communication from the transmit unit transceiver 20 using a default control channel protocol. As another alternative, or in addition to one or more of the preceding examples, the receive unit processing module 26, 32 may identify the control channel protocol by scanning a frequency spectrum for control channel activity to produce scanned frequency spectrum and identify the control channel protocol from the scanned frequency spectrum. As yet another alternative, or in addition to one or more of the preceding examples, the receive unit processing module 26, 32 may identify the control channel protocol by evoking a trial and error system using known control channel protocols.

When the receive unit processing module 26, 32 identifies the control channel protocol, it determines whether the receive unit transceiver is capable of communication using the control channel protocol. For example, the processing module is determining whether the receive unit transceiver 24, 30 be configured to support the control channel protocol. When the receive unit transceiver 24, 30 is capable of communication using the control channel protocol, the processing module coordinates configuration of the receive unit transceiver to transceive the communication regarding the wireless power magnetic field via the control channel. Configuring of the receive unit transceiver 24, 30 is discussed in greater detail with reference to FIG. 6.

As yet another alternative to identifying the control channel protocol, the transmit unit transceiver 20 and the receive unit transceiver 24, 30 may negotiate which control channel protocol to use. For example, the transmit unit transceiver may transceive negotiation information (e.g., what protocols they each support, desired data rate, available bandwidth, etc.) with the receive unit transceiver to mutually select the control channel protocol.

If the processing module 26, 32 cannot identify the control channel or the receive unit transceiver 24, 30 is not capable of being configured to use the control channel protocol, the processing module determines whether the receive unit transceiver is lacking hardware or lacking software to support the control channel protocol. When the receive unit transceiver is lacking software, the processing module generates a network message to download the software to support the control channel protocol. Once the software is downloaded, the receive unit transceiver 24, 30 is configured to support the control channel protocol.

With the control channel established between the wireless power transmit unit 10 and the device 12, 14, the wireless power transmit circuit 16 generates a wireless power magnetic field in accordance with the control channel data (e.g., power level, frequency, tuning, etc.). The wireless power receive circuit 22, 28 converts the wireless power magnetic field into a voltage, which may be used to charge a battery of the device and/or to power at least a portion of the device 12, 14.

Figure 2:
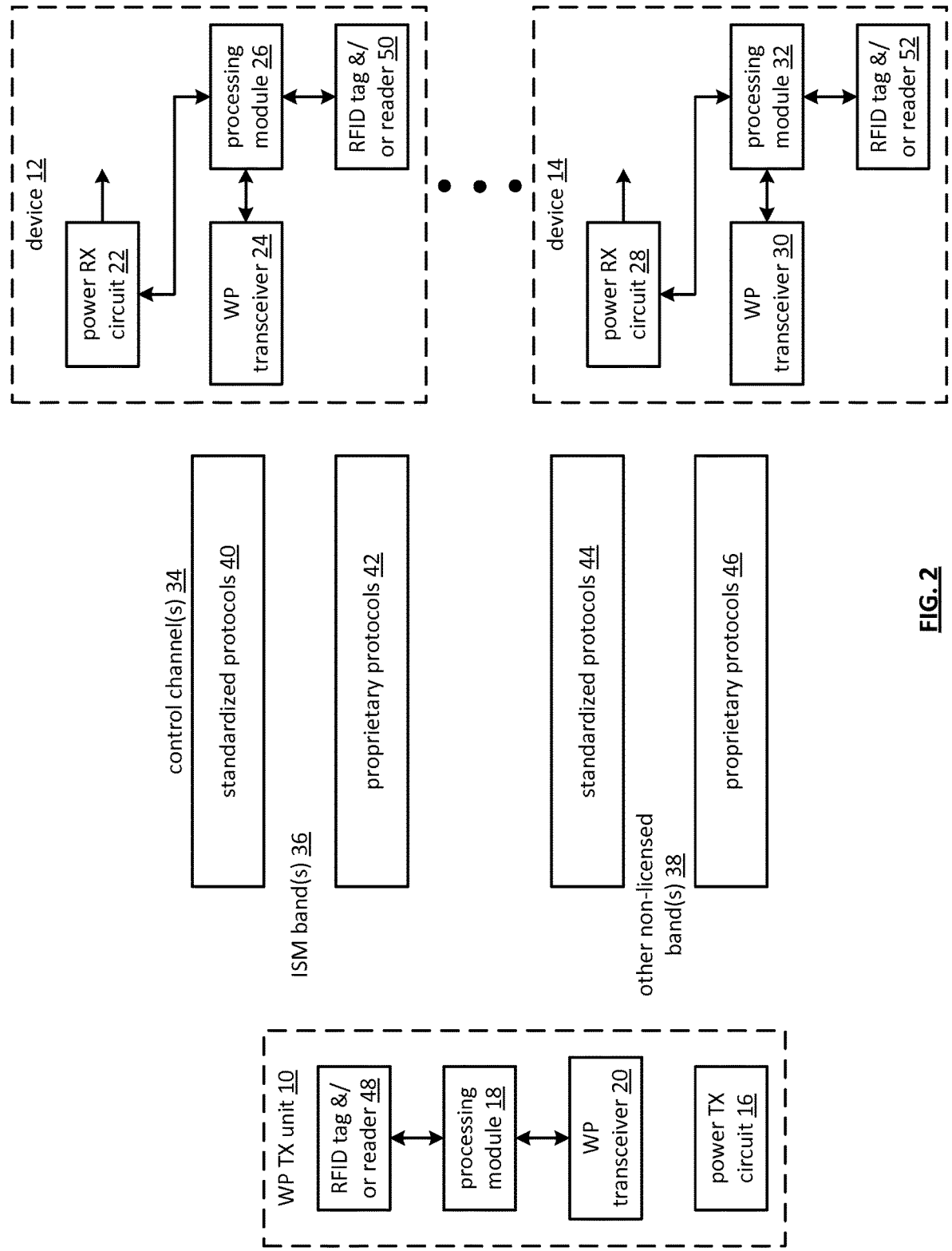
FIG. 2 is a schematic block diagram of another embodiment of a wireless power system in accordance with the present invention.

FIG. 2 is a schematic block diagram of another embodiment of a wireless power system that includes a wireless power (WP) transmit (TX) unit 10 and one or more devices. The WP TX unit 10 includes a processing module 18, a WP transceiver 20, an RFID (radio frequency identification) tag and/or reader 48, and a power TX circuit 16. Each device 12-14 includes a WP receive (RX) circuit 24, 28, a processing module 26, 32, an RFID tag and/or reader 50, 52, and a WP transceiver 24, 30. The device 12-14 will most likely include a plurality of other components depending on its desired functionality. For example, the device may be a cell phone, a personal audio/video player, a video game unit, a toy, etc. and it includes the corresponding circuitry.

In this embodiment, the RFID tags 48, 50, 52 include information regarding the wireless power requirements and capabilities of the devices 12-14 and of the WP TX unit 10. For instance, the information may include the communication protocol to use (e.g., one or more of the standardized protocols 40, 44 or one or more of the proprietary protocols 42, 46), the wireless power frequency spectrum, impedance matching information, battery charging requirements, etc. The RFID readers and tags 48, 50, 52 may be active or passive devices and may use backscattering to communicate. As such, the devices 12-14 initially communicate with the WP TX unit 10 to exchange set up information and, once set up, the devices 12-14 communicate with the WP TX unit 10 via the WP transceivers 20, 24, 30.

Figure 3:
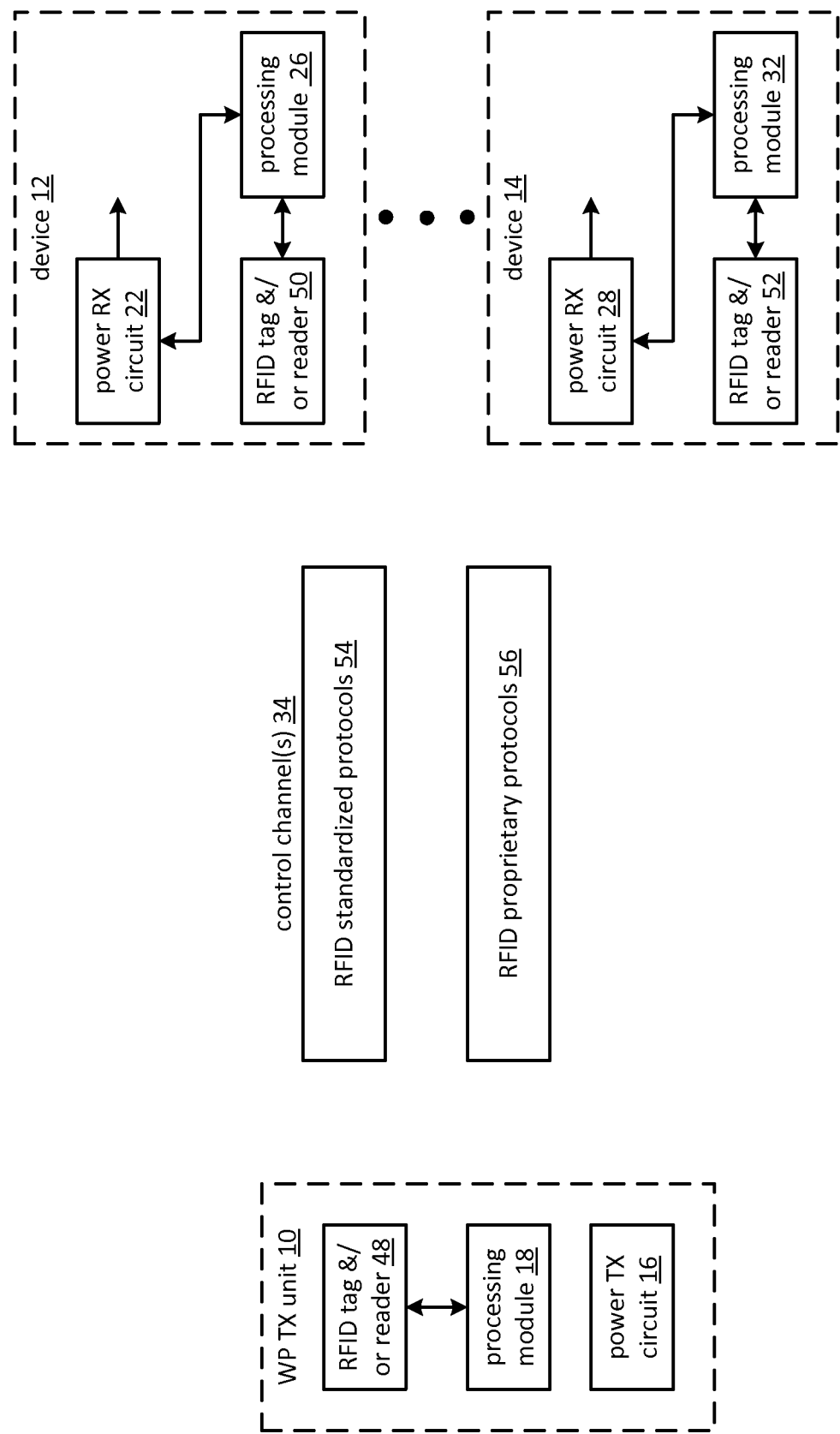
FIG. 3 is a schematic block diagram of another embodiment of a wireless power system in accordance with the present invention.

FIG. 3 is a schematic block diagram of another embodiment of a wireless power system that includes a wireless power (WP) transmit (TX) unit 10 and one or more devices 12-14. The WP TX unit 10 includes a processing module 18, an RFID (radio frequency identification) tag and/or reader 48, and a power TX circuit 16. Each device 12-14 includes a WP receive (RX) circuit 22, 28, a processing module 26, 32, and an RFID tag and/or reader 50, 52. The device 12-14 will most likely include a plurality of other components depending on its desired functionality. For example, the device may be a cell phone, a personal audio/video player, a video game unit, a toy, etc. and it includes the corresponding circuitry.

In this embodiment, the RFID tags 48, 50, 52 include information regarding the wireless power requirements and capabilities of the devices 12-14 and of the WP TX unit 10. For instance, the information may include the communication protocol to use (e.g., one or more of the standardized protocols 54 or one or more of the proprietary protocols 56), the wireless power frequency spectrum, impedance matching information, battery charging requirements, etc. In addition to exchanging set up information, the WP TX unit 10 and the devices 12-14 use the RFID tags and readers 48, 50, 52 as the primary communication means between them. Note that the RFID readers and tags 48, 50, 52 may be active or passive devices and may use backscattering to communicate.

Figure 4:
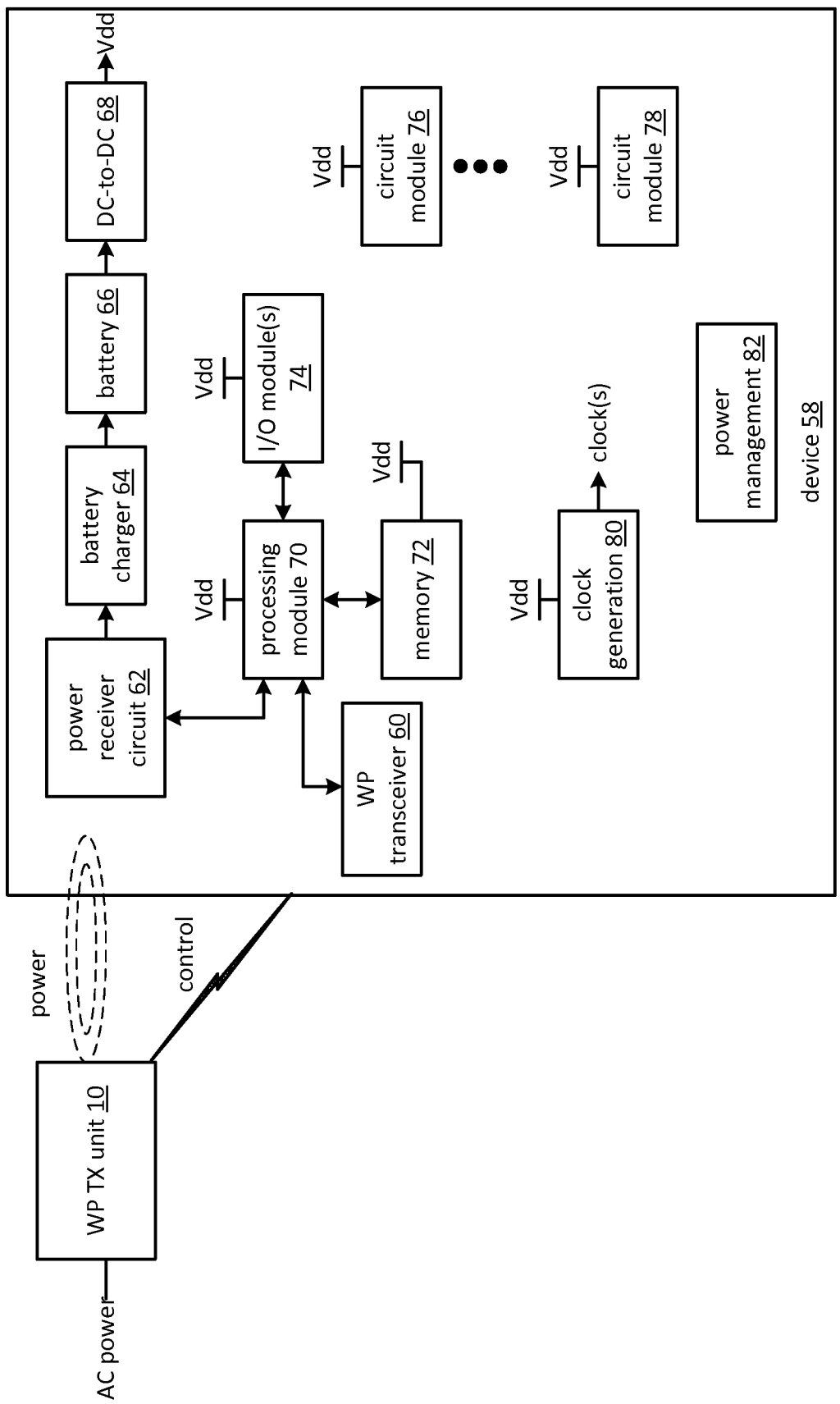
FIG. 4 is a schematic block diagram of another embodiment of a wireless power system in accordance with the present invention.

FIG. 4 is a schematic block diagram of another embodiment of a wireless power system that includes the WP TX unit 10 and a device 58. The device 58 includes the power receiver circuit 62, a battery charger 64, a battery 66, a DC-to-DC converter 68, the processing module 70, memory 72, a plurality of input/output (I/O) modules 74, a plurality of circuit modules 76-78, a clock generation unit 80, and a power management unit 82. Note that the device 58 may be one of the devices 12-14 of FIGS. 1-3.

In an example of operation, after the WP TX unit 10 and the device 58 have established communication, the WP TX unit 10 generates a magnetic field that is received by the power receiver circuit 62, which is integrated into device 58. This will be discussed in greater detail with reference to one or more of the subsequent figures. The power receiver circuit 62 generates an AC voltage from the magnetic field, rectifies the AC voltage to produce a rectified voltage, and filters to the rectified voltage to produce a DC voltage rail (e.g., V+ and V−). The power receiver circuit 62 may be tuned based on control signals provided by the processing module 70. The tuning includes adjusting one or more electromagnetic properties, such as the quality factor of the circuit, adjusting impedance, current limiting, etc., of the magnetic field and/or the wireless power receiver circuit 62.

The battery charger 64 converts the DC voltage rail into a battery charge voltage, which it provides to the battery 66. The battery charger 64 monitors the charging to insure proper charging in accordance with the type of battery and, once the battery 66 is charged, may implement a trickle charge. Note that the processing module 70 may provide control signals to the battery charger 64 to regulate the charging in accordance with the type of battery.

The DC-to-DC converter 68 converts the battery voltage (e.g., 1.5 volts, 4.2 volts, etc.) into one or more supply voltages (e.g., 1 volt, 2.2 volts, 3.3 volts, 5 volts, 12 volts, etc.). The DC-to-DC converter 68 provides the supply voltages to one or more of the other modules 70, 72, 74, 76, 78, 80 under the direction of the power management module 82. In general, the power management module 82 functions to control power consumption by the device 58 to an optimal level (e.g., balancing of performance and battery life). In this regard, the power management module 82 may treat each module 70, 72, 74, 76, 78, 80 as a separate power island that can be individually controlled. For example, when a circuit module 76-78 is inactive, the power management module 82 may remove power from the circuit module 76-78. As another example, the power management module 82 may reduce the voltage provided to a circuit module 76-78 when the circuit module 76-78 does not need to operate at its maximum potential.

In addition to controlling the supply voltage to each power island, the power management module 82 may control the clock signals provided to each circuit module 76-78 that uses a clock signal. For example, when a circuit is idle, the power management module 82 may provide a reduced supply voltage to the circuit module 76-78, but disable the clock signal provided to the circuit module 76-78. In this way, minimal power is consumed, but the circuit module 76-78 may be quickly activated when it is needed. As another example, the power management module 82 may reduce the frequency of a clock signal for a circuit module 76-78 when the circuit module 76-78 does not need to operate at its maximum potential.

The plurality of circuit modules 76-78 provides at least some of the functionality for the device 58. For example, if the device is a cell phone, the circuit modules 76-78 may provide a digital image capture function, a digital image display function, an audio file playback function, a data messaging function, a voice call function, etc. The plurality of input/output (I/O) modules 74 provides the interface to the user input/output components (e.g., speaker, microphone, display, buttons, etc.) of the device 58. For example, a circuit module may generate outbound data (e.g., a captured digital image). The processing module processes the outbound data to produce processed data (e.g., generates a digital image file) and provides the processed outbound data to an input/output module for display on a peripheral output component (e.g., an LCD display). As another example, an input/output module may receive inbound data (e.g., a place call command) from a peripheral input component (e.g., keypad of the device) and provide it to the processing module. The processing module processes the inbound data to produce processed inbound data (e.g., retrieve the phone number of the target identified in the call command). The processing module provides the processed inbound data to a circuit module, which performs a function on the processed inbound data (e.g., places the call to the target).

Figure 5:
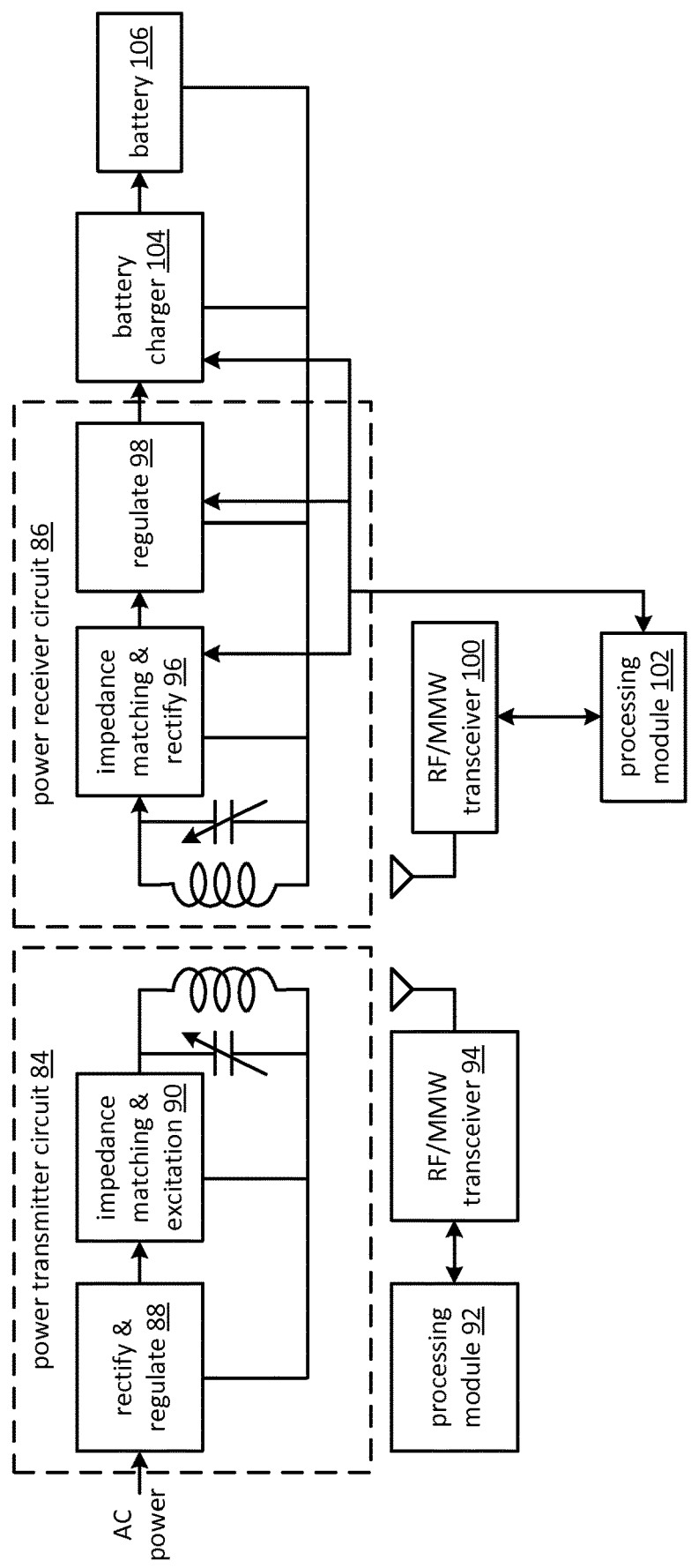
FIG. 5 is a schematic block diagram of another embodiment of a wireless power system in accordance with the present invention.

FIG. 5 is a schematic block diagram of an embodiment of a portion of a wireless power system that includes the power transmitter circuit 84 and the power receiver circuit 86. The power transmitter circuit 84 includes a coil (i.e., an inductor), a rectify and regulate circuit 88, an impedance matching and excitation circuit 90, a processing module 92, and an RF and/or MMW transceiver 94. The power receiver circuit 86 includes a coil, an impedance matching and rectify circuit 96, a regulate circuit 98, and an RF and/or MMW transceiver 100. The power receiver circuit 86 is coupled to the battery charger 104 and the processing module 102. In this regard, the power receiver circuit 84 is readily integrated into the device and uses components of the device (e.g., the processing module 102). As such, the power receiver circuit 86 is not a standalone component coupled to the device, but an integral part of the device. Note that the device 12,14, 58 will typically include a housing, which houses the power receiver circuit 86, the battery charger 104, the battery 106, and the RF/MMW transceiver 100, the processing module 102, and the components as shown in FIG. 4.

In an example of operation, the rectify and regulate circuit of the power transceiver circuit 84 converts an AC voltage (e.g., 110 VAC, 220 VAC, etc.) into a DC voltage (e.g., 160 VDC, 320 VDC, etc.). The impedance matching and excitation circuit 90 couple the TX power coil to the DC voltage in an alternating pattern (e.g., a full bridge inverter, a half bridge inverter) at a given frequency (e.g., 10 MHz, etc.). The impedance matching allows the LC circuit of the capacitor and coil to be tuned to a desired resonant frequency and to have a desired quality factor. For example, the LC circuit may be tuned to resonant at the excitation rate.

The coil of the power RX 86 unit is proximal to the coil of the TX unit 84 to receive the magnetic field created by the TX coil and to create an AC voltage therefrom. The LC circuit of the RX coil and capacitor may be tuned to have a desired resonance and/or a desired quality factor. The impedance matching and rectify circuit 96 rectifies the AC voltage of the RX coil to produce a DC rail voltage that is regulated via the regulation circuit. The remainder of the diagram functions as previously discussed and/or as will be subsequently discussed.

Figure 6:
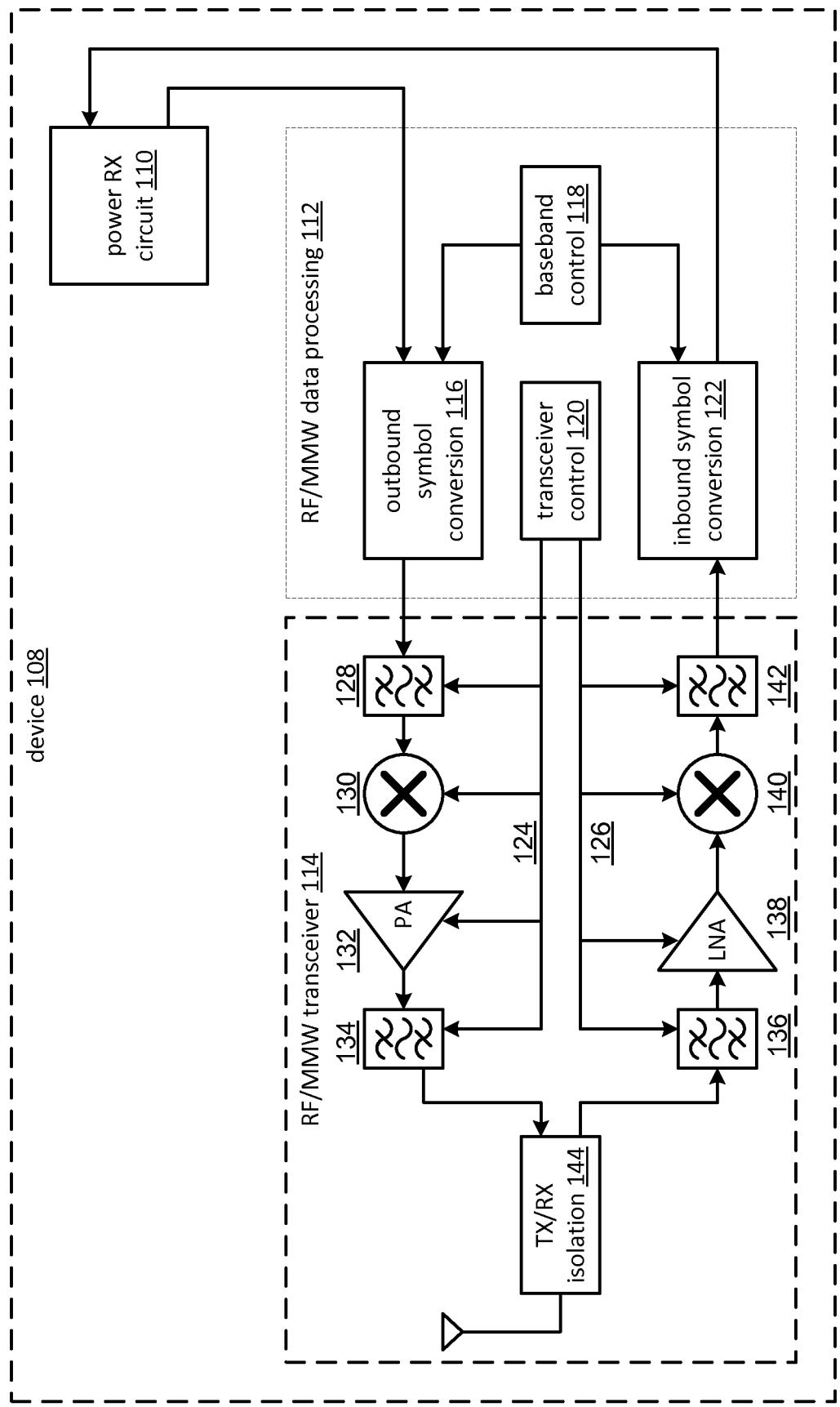
FIG. 6 is a schematic block diagram of an embodiment of a wirelessly powered device in accordance with the present invention.

FIG. 6 is a schematic block diagram of an embodiment of a wirelessly powered device 108 that includes the power RX circuit 110, an RF and/or MMW data processing module 112 (which may be implemented within the processing module) and the RF and/or MMW transceiver 114. The RF and/or MMW data processing module 112 includes an outbound symbol conversion module 116, a baseband control module 118, a transceiver control module 120, and an inbound symbol conversion module 122. The RF and/or MMW transceiver 114 includes a transmitter 124 and a receiver 126. The transmitter 124 includes a low IF (e.g., 0 to a few MHz) bandpass filter 128, a mixing module 130, a power amplifier (PA) 132, and an RF bandpass filter 134. The receiver 126 includes an RF bandpass filter 136, a low noise amplifier (LNA) 138, a mixing module 140, and a low IF bandpass filter 142. If the transmitter 124 and receiver 126 share an antenna, the transceiver 114 further includes a TX/RX isolation circuit 144 (e.g., a circulator, a transformer balun, a TX/RX switch, etc.).

In an example of operation, the data processing module 112 configures itself based on the communication protocol being implemented and the corresponding data modulation. In addition, the transceiver control module provides control signals to the transceiver 114 to adjust one or more of the components thereof based on the protocol being implemented. In this regard, the data processing module 112 and the transceiver 114 may be configured to implement one or more of the standard communication protocols and/or one or more of the proprietary communication protocols. Note that the device 108 may include one or more configurable RF/MMW data processing modules 112 and/or one or more configurable RF/MMW transceivers 114.

Figure 7:
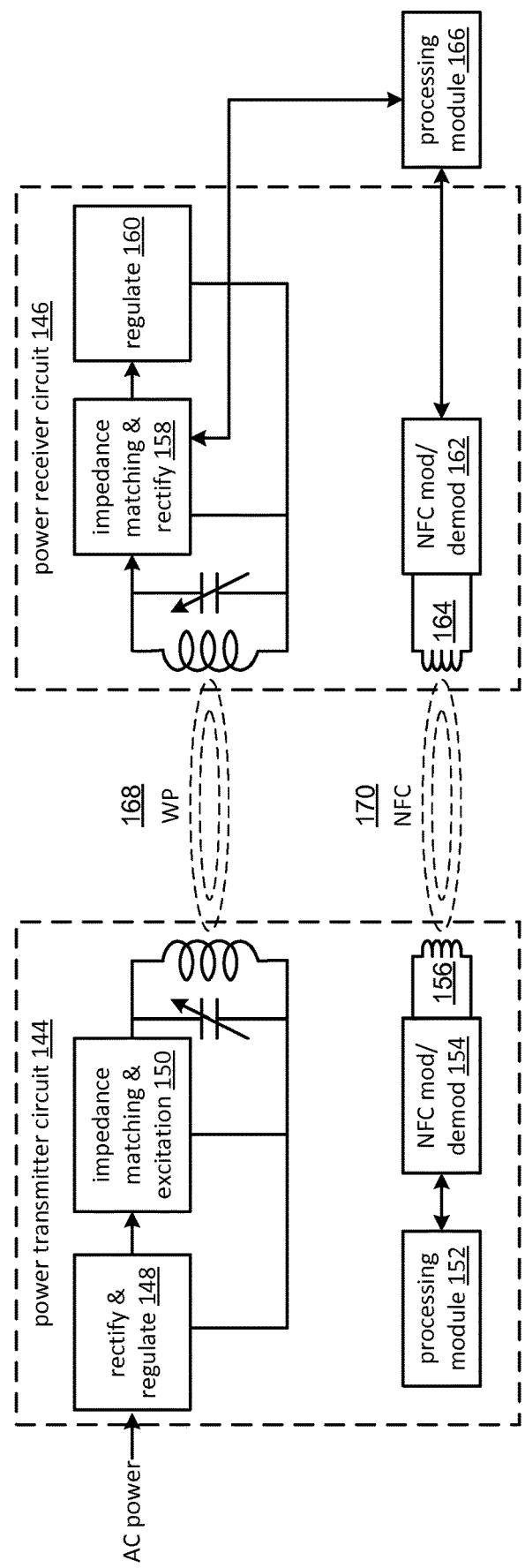
FIG. 7 is a schematic block diagram of an embodiment of a portion of a wireless power system in accordance with the present invention.

FIG. 7 is a schematic block diagram of an embodiment of a portion of a wireless power system that includes the power transmitter circuit 144 and the power receiver circuit 146. The power transmitter circuit 144 includes a rectify and regulate circuit 148, an impedance matching and excitation circuit 150, a processing module 152, an NFC modulator/demodulator 154, and an NFC coil 156. The power receiver circuit 146 includes an impedance matching and rectify circuit 158, a regulate circuit 160, an NFC modulator/demodulator 162, and an NFC coil 164. The power receiver circuit 146 is coupled to the battery charger (not shown in figure) and the processing module 166.

In an example of operation, the rectify and regulate circuit 148 of the power transmitter circuit 144 converts an AC voltage (e.g., 110 VAC, 220 VAC, etc.) into a DC voltage (e.g., 160 VDC, 320 VDC, etc.). The impedance matching and excitation circuit 150 couple the TX power coil to the DC voltage in an alternating pattern (e.g., a full bridge inverter, a half bridge inverter) at a given frequency (e.g., 10 MHz, etc.). The impedance matching allows the LC circuit of the capacitor and coil to be tuned to a desired resonant frequency and to have a desired quality factor. For example, the LC circuit may be tuned to resonant at the excitation rate.

The coil of the power receiver circuit 146 is proximal to the coil of the transmitter circuit 144 to receive the magnetic field created by the TX coil and to create an AC voltage therefrom. The LC circuit of the RX coil and capacitor may be tuned to have a desired resonance and/or a desired quality factor. The impedance matching and rectify circuit 158 rectifies the AC voltage of the RX coil to produce a DC rail voltage that is regulated via the regulation circuit 160.

The device communicates to the power transmitter circuit 144 via NFC (near field communication) 170. For example, when the device has data to convey to the power transmitter circuit 144, the processing module 166 generates the data, which it provides to the NFC modulator/demodulator 162. The NFC mod/demodulator 162 modulates the data at a given frequency (e.g., 13 MHz, 900 MHz, etc.) that drives the NFC coil 164. The NFC coil 164 creates a magnetic field that is received by the NFC coil 156 of the power transmitter circuit 144. The NFC mod/demod unit 154 demodulates the signal produced by the NFC coil 156 to recover the transmitted data, which is provided to the processing module 152. Data from the power transmitter circuit 144 to the device is processed in a similar manner.

Figure 8:
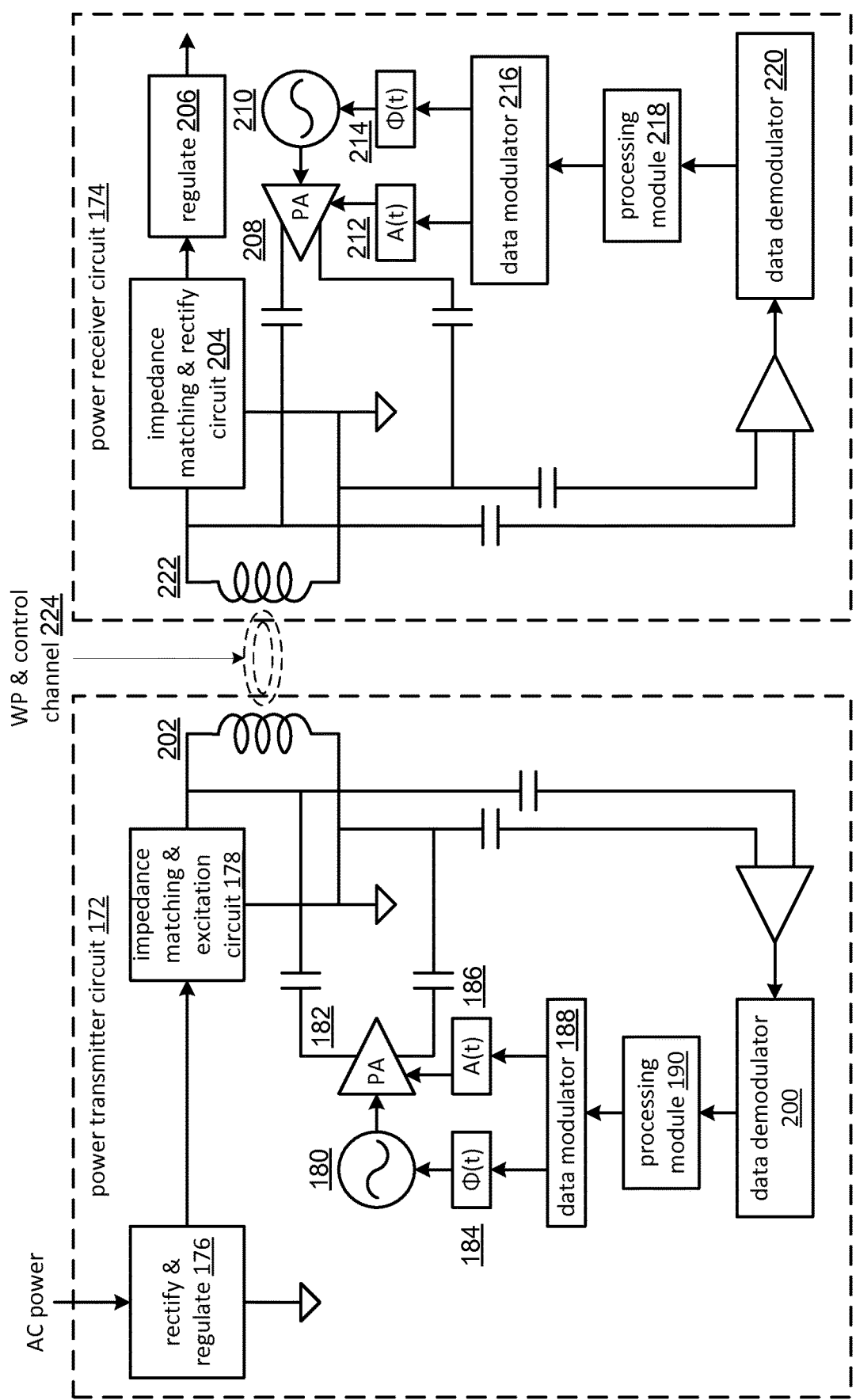
FIG. 8 is a schematic block diagram of another embodiment of a portion of a wireless power system in accordance with the present invention.

FIG. 8 is a schematic block diagram of another embodiment of a portion of a wireless power system that includes the power transmitter circuit 172 and the power receiver circuit 174. The power transmitter circuit 172 includes a rectify and regulate circuit 176, an impedance matching and excitation circuit 178, a processing module 190, an NFC modulator/demodulator 188, 200, and a share WP & NFC coil 202. The power receiver circuit 174 includes an impedance matching and rectify circuit 204, a regulate circuit 206, an NFC modulator/demodulator 216, 220, and an NFC coil 222. The power receiver circuit 174 is coupled to the battery charger (not shown in figure) and the processing module 218.

In an example of operation, the rectify and regulate circuit 176 of the power transmitter circuit 172 converts an AC voltage (e.g., 110 VAC, 220 VAC, etc.) into a DC voltage (e.g., 160 VDC, 320 VDC, etc.). The impedance matching and excitation circuit 178 couple the TX power coil 202 to the DC voltage in an alternating pattern (e.g., a full bridge inverter, a half bridge inverter) at a given frequency (e.g., 10 MHz, etc.). The impedance matching allows the LC circuit of the capacitor and coil to be tuned to a desired resonant frequency and to have a desired quality factor. For example, the LC circuit may be tuned to resonant at the excitation rate.

The coil 202 of the power receiver circuit 174 is proximal to the coil 222 of the power transmitter circuit 172 to receive the magnetic field created by the TX coil 202 and to create an AC voltage therefrom. The LC circuit of the RX coil 222 and capacitor may be tuned to have a desired resonance and/or a desired quality factor. The impedance matching and rectify circuit 204 rectifies the AC voltage of the RX coil 222 to produce a DC rail voltage that is regulated via the regulation circuit.

The device communicates with the WP TX unit via NFC (near field communication) using the shared WP & NFC coils 202, 222. For example, when the device has data to convey to the WP TX unit, the processing module 218 generates the data, which it provides the NFC data modulator 216. The NFC modulator 216 modulates the data at a given frequency (e.g., 13 MHz, 900 MHz, etc.) to produce an amplitude component (A(t)) 212 and a phase component (Φ(t) 214. The phase component 214 adjusts the phase of an oscillation (cos ω(t)) to produce a phase adjusted oscillation (cos(ω(t)+Φ(t)) 210. The power amplifier 208 amplifies the phase adjusted oscillation 210 by the amplitude component 212 to produce an amplitude modulated and phase adjusted signal (A(t) cos(ω(t)+Φ(t))). The signal is AC coupled to the shared WP & NFC coil 222 for conveyance to the WP TX unit.

The shared coil 202 of the WP TX unit receives the signal (e.g., $A_0$ cos($\omega_0$(t))*A(t) cos(ω(t)+Φ(t)), where $A_0$ is the amplitude of the WP signal and $\omega_0$ corresponds to the frequency of the WP signal). The NFC signal component is AC coupled to the data demodulator 200 and the WP component is provided to the impedance matching circuit 178. The data demodulator 200 recovers the data from the amplitude component 186 and the phase component 184 and provides the data to the processing module 190.

Figure 9:
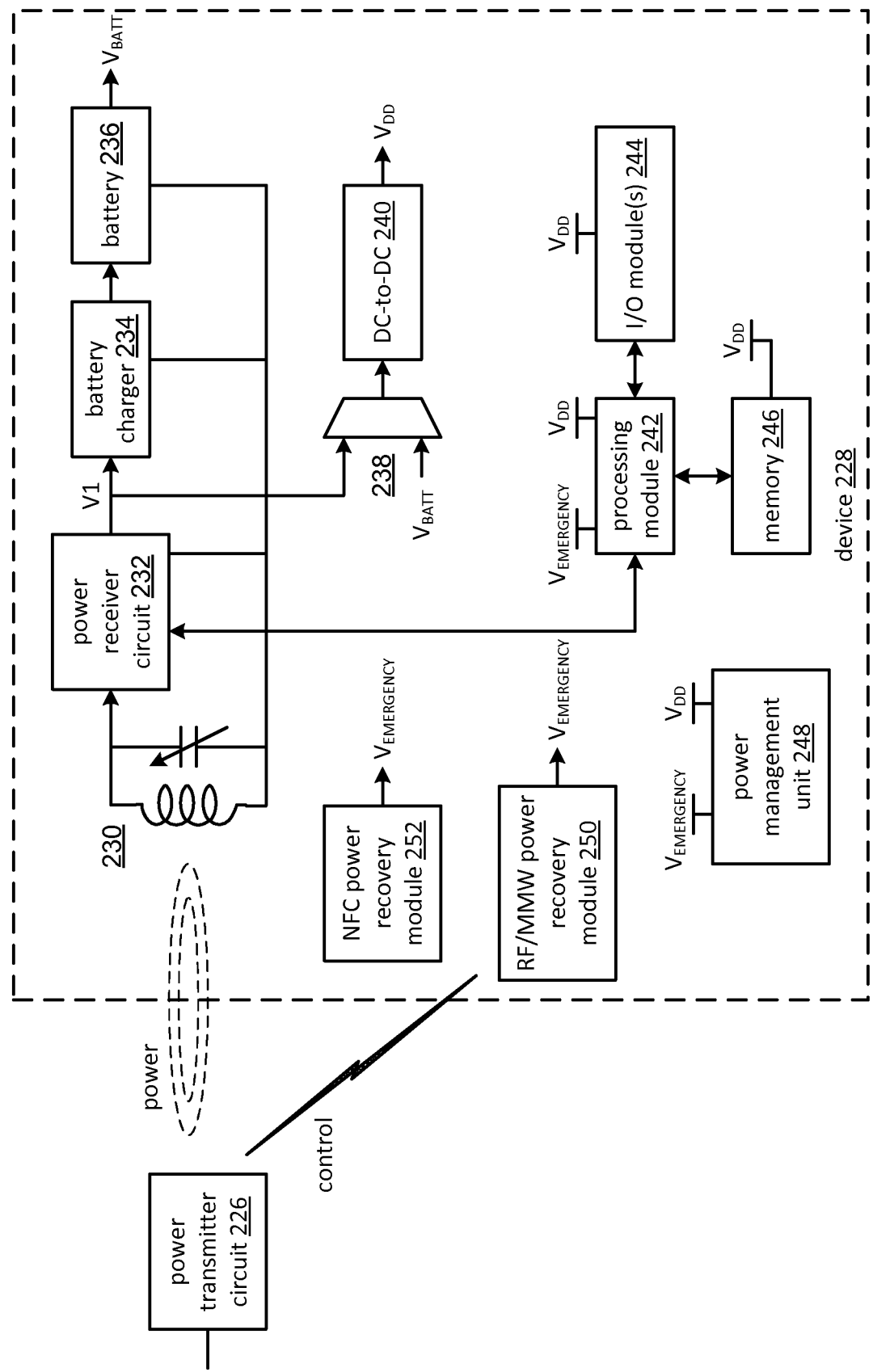
FIG. 9 is a schematic block diagram of another embodiment of a wireless power system in accordance with the present invention.

FIG. 9 is a schematic block diagram of another embodiment of a wireless power system that includes the WP TX unit 226 and a device 228. The device 228 includes the WP coil 230, the power RX circuit 232, the battery charger 234, the battery 236, a multiplexer 238 or the like, the DC-to-DC converter 240, the processing module 242, the IO interface modules 244, the memory 246, the power management unit 248, an NFC power recovery module 252, and/or an RF/MMW power recovery module 250.

In an example of operation, when the battery 236 is dead or near dead and as insufficient power to power minimal circuitry to facilitate battery charging, the NFC power recovery module 252 and/or RF/MMW power recovery module 250 generate an emergency voltage to provide the energy to initiate battery charging. Once energy is being received from the WP TX unit 226, the emergency supply generators may be disabled and the supply voltage V1 may be used to power the device 228 during charging and/or after charging is complete (i.e., in a trickle charge mode). Note that as long as WP energy is being received, the device 228 may be powered by V1 or another voltage derived from the WP energy.

Figure 10:
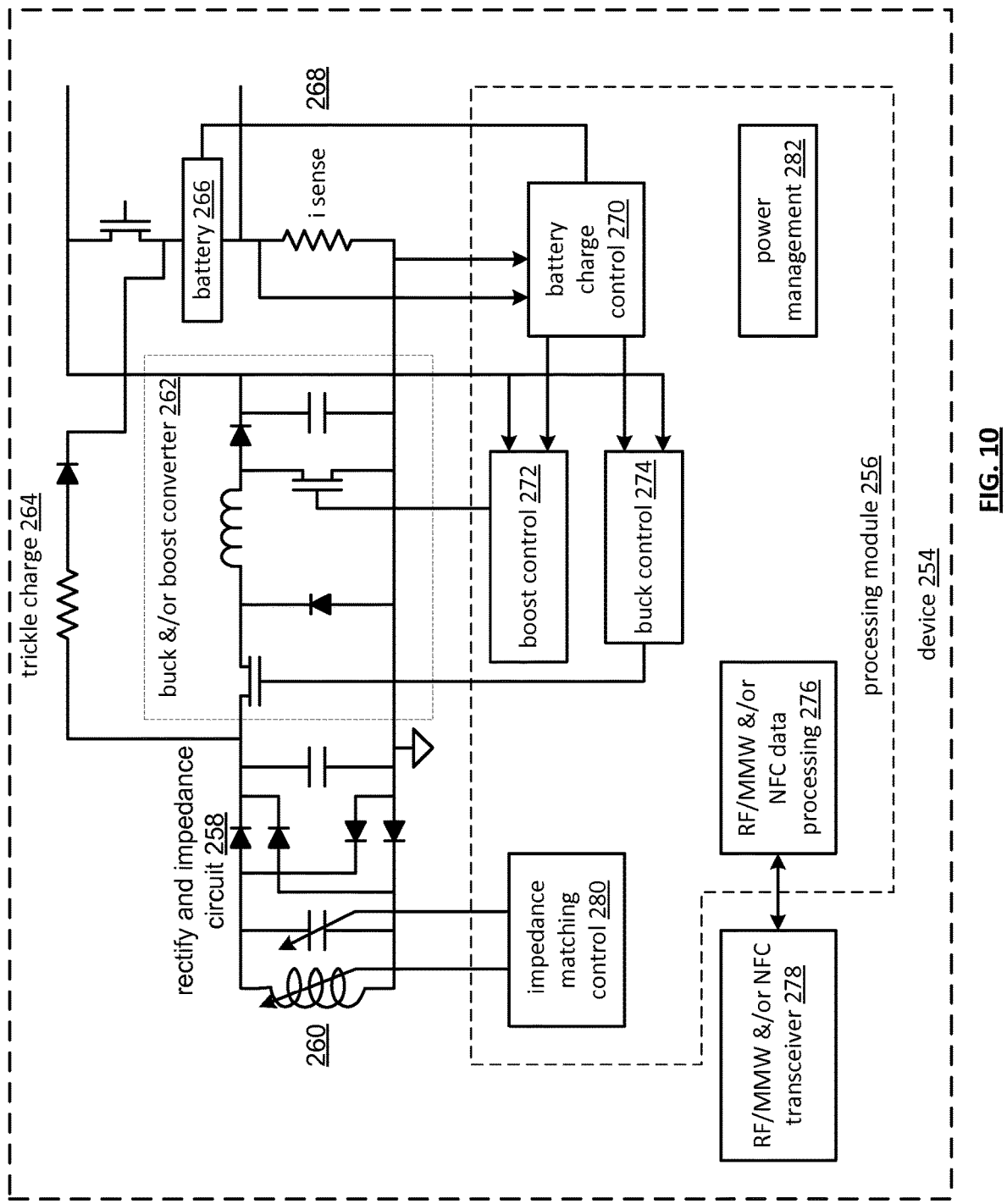
FIG. 10 is a schematic block diagram of another embodiment of a wirelessly powered device in accordance with the present invention.

FIG. 10 is a schematic block diagram of another embodiment of a wirelessly powered device 254 that includes the processing module 256, the rectify and impedance matching circuit (e.g., capacitors and diodes) 258, the RX coil 260, a buck &/or boost converter 262, a trickle charge circuit 264, a battery 266, and a battery current sensor 268. The processing module 256 implements a battery charger controller 270, a boost controller 272, a buck controller 274, an impedance matching control 280, and an RF/MMW and/or NFC data processing module 276. The processing module 256 may further implement the power management unit 282. Note that the processing module 256 may be fabricated on a single integrated circuit or on a multiple integrated circuit with one or more of the components of the converter 262, the rectifier circuit 258, the trickle charge circuit 264, and/or the battery current sense 268.

In an example of operation, the RX coil 260 (which may include one or more adjustable inductors) receives a magnetic field from the WP TX unit and creates an AC voltage therefrom. The adjustable capacitor is tuned (alone in conjunction with the RX coil 260) to a desired resonance, impedance, and/or quality factor to facilitate the creation of the AC voltage. The full bridge rectifier (e.g., the diodes) rectify the AC voltage to produce a rectified voltage that is filtered by the capacitor to produce a DC rail voltage (e.g., 3-20 volts).

The buck and/or boost converter 262 is enabled in a buck converter mode when the DC voltage rail is to be stepped down to produce battery charge voltage (and the supply voltage Vdd for the device) and is enabled in boost converter mode when the DC rail voltage is to be stepped up to produce the battery charge voltage (and the supply voltage Vdd). Note that when the buck and/or boost converter 262 is in the boost mode, the buck transistor is enabled. Further note that the buck and/or boost converter 262 may include multiple inductors, transistors, diodes, and capacitors to produce multiple supply voltages.

When the battery 266 is charging, the battery charge control module 270 monitors the battery current and voltage to insure charging is in accordance with the charging requirements of the battery 266. When the battery 266 is charged, the battery 266 is disconnected from the converter 262 (which may be disabled or enabled to provide Vdd) and the battery 266 may be trickle charged. Note that when the WP is lost, the battery 266 is coupled to provide the power for the device 254.

Figure 11:
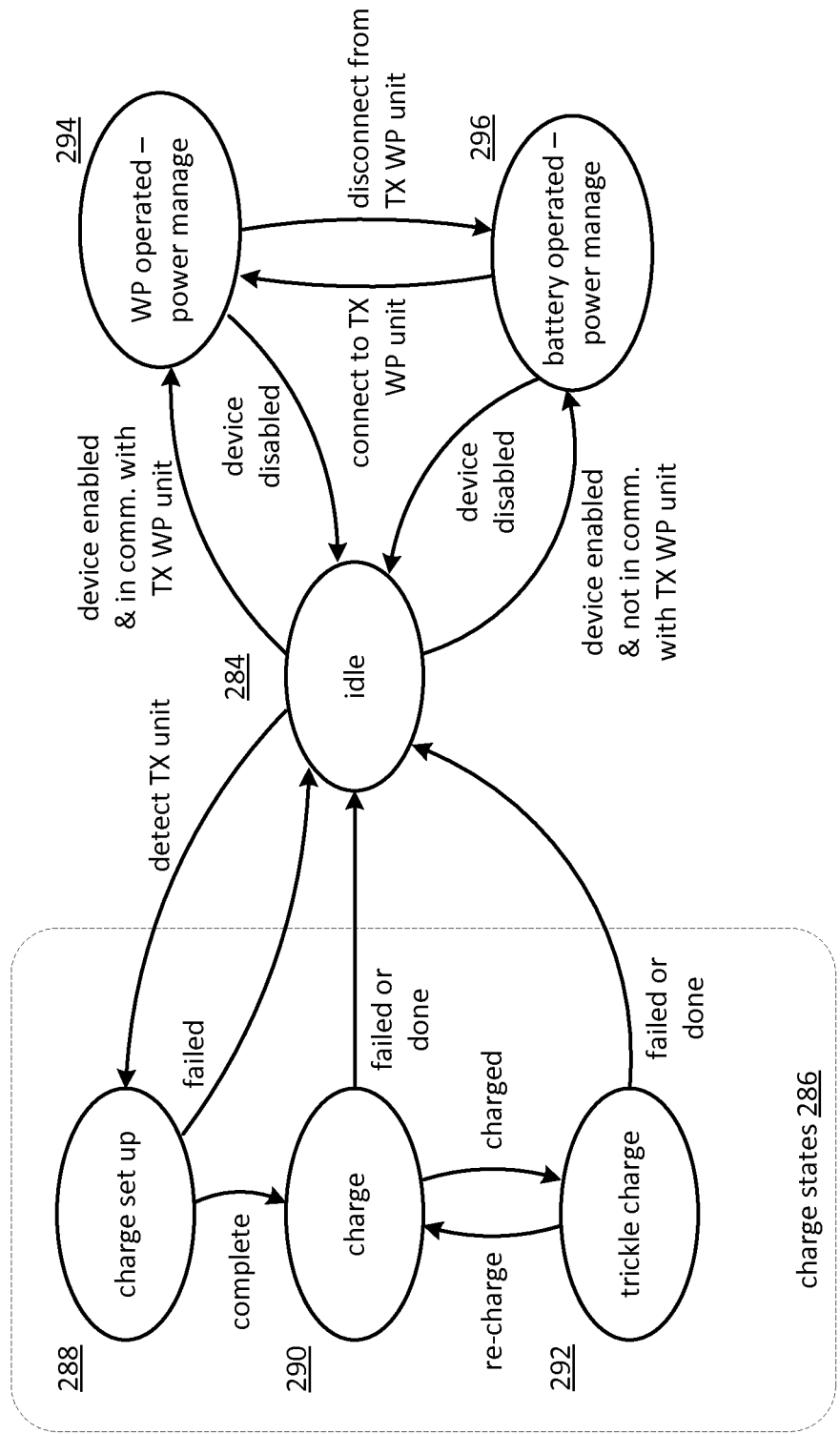
FIG. 11 is an example state diagram of a processing module of a wirelessly powered device in accordance with the present invention.

FIG. 11 is an example state diagram of a processing module of a wirelessly powered device 12-14, 58 that includes six states 286: idle 284, charge set up 288, charge 290, trickle charge 292, WP operated—power management 294, and battery operated—power management 296. The device starts in the idle state 284 and waits to detect the WP TX unit, WP operation enablement, or battery operation enablement. The device may be in one of the charge states 286 and the WP operated—power management state 294 concurrently.

When the device detects the WP TX unit (e.g., via RFID communication, via control channel communication, via sensing a magnetic field, etc.), the device transitions from the idle state 284 to the charge set up state 288. When in the charge set up state 288, the device functions as referenced in FIGS. 12 and/or 13, which will be subsequently discussed. The device transitions back to the idle state 284 if the set up failed, which may result from failing to establish a control channel communication, the WP TX unit not being able to currently service the device, circuit damage, a bad battery, or loss of connection.

The device transitions to the charge state 290 when the charge set up is complete. While in the charge state 290, the device functions as referenced in FIGS. 14 and/or 15, which will be subsequently discussed. The device transitions to the idle state 284 if the charging failed or the charging is complete and the battery does not require a trickle charge. If the charging is complete and the battery will be trickled charge, the device transitions to the trickle charge state 292. The device stays in this state until a failure occurs (e.g., loss of connection with the WP TX unit) or until the trickle charge is complete. In either event, the device transitions back to the idle state 284.

When the device is enabled for operation, the device transitions to the WP operated—power manage state 294 when the device is enabled and is connected to the WP TX unit. While in this state, the device functions as referenced in FIG. 16, which will be subsequently discussed. The device transitions back to the idle state 284 when the device is disabled (e.g., turned off, placed in a sleep mode, etc.). Note that while the device is in this state, it may also be in one of the charge states.

The device transitions from the WP operated state 294 to the battery operated—power manage state 296 when the device is disconnected from the WP TX unit. The device may also enter the battery-operated state 296 from the idle state 284 when the device is enabled and not connected to the WP TX unit. While in this state, the device functions as referenced in FIG. 17, which will be subsequently discussed. The device transitions back to the WP operated state 294 when the device is again connected to the WP TX unit. The device transitions back to the idle state 284 when the device is disabled (e.g., turned off, sleep mode, low battery, etc.).

In an embodiment, the device may include an integrated circuit (IC) that includes at least a portion of a wireless power receiver circuit 86 (e.g., an on-chip coil, an on-chip variable capacitor, components of the impedance matching & rectify circuit 96 (diodes of the rectify circuit may be off-chip), and components of the regulation circuit 98), a transceiver, and a processing module. The wireless power receiver circuit converts the electromagnetic signal into a voltage and the transceiver, when operable, transceives a control channel communication.

The processing module is operable to transition the device from an idle state to a charge state when a wireless power transmitter unit is detected. The processing module is further operable to transition the device from the idle state to a wireless power operated state when a wireless power transmit circuit is detected and the device is enabled. The processing module is still further operable to transition the device from the idle state to a battery operated state when the device is enabled and the wireless power transmit circuit is not detected.

Alternatively, or in addition to the above, the processing module may be operable to detect availability of the wireless power transmitter unit via the control channel communication. The processing module may then, when the wireless power transmitter unit is available, determine battery charging needs and whether the device is active. The processing module may then, when the battery charging needs compares unfavorable to a threshold, initiate battery charging using the voltage. The processing may, when the device is active, enable wireless power operation and, when the wireless power transmitter is not available, enable battery operated mode for the device.

Figure 12:
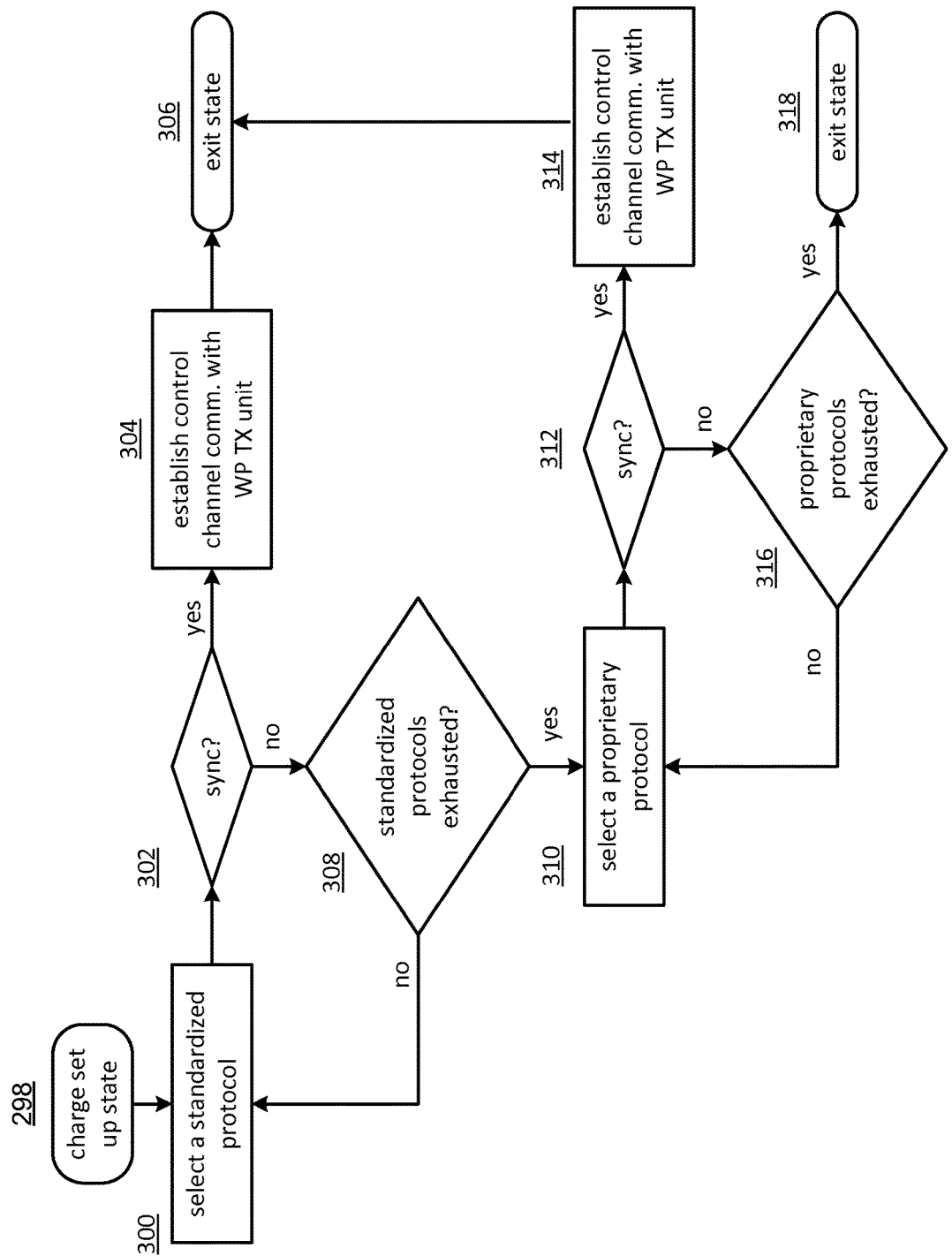
FIG. 12 is a logic diagram of an embodiment of a method for a charge set up state in accordance with the present invention.

FIG. 12 is a logic diagram of an embodiment of a method for a charge set up state 298 that begins with the device working with the WP TX unit to select a standardized communication protocol 300. Examples of the communication protocols were presented with reference to FIGS. 1-3. Note this step may begin by assuming a default communication protocol (e.g., RFID, Bluetooth, etc.) to initiate communication and then, once communication is established, selecting another communication protocol. The method continues with the device determining whether the device is synchronized via a control channel with the WP TX unit 302. In other words, is a useable control channel established between the device and the WP TX unit? If yes, the method continues with the device establishing a control channel communication with the WP TX unit 304 and exiting the state 306.

If a control channel is not established, the method continues with the device determining whether it has exhausted its standardized communication protocols 308 (e.g., the ones it is capable of executing). If not, the process repeats with the device selecting another standardized protocol 300. If the standardized protocols are exhausted, the method continues with the device selecting a proprietary communication protocol 310. Note that the method may begin with proprietary protocols and if they are exhausted, then try standardized protocols. Further note that there may be no distinction between a standard protocol and a proprietary protocol such that the method attempts to find a useable protocol regardless of whether it is a standard or proprietary protocol.

The method continues with the device determining whether the device is synchronized via a control channel with the WP TX unit using the proprietary protocol 312. If yes, the method continues with the device establishing a control channel communication with the WP TX unit 314 using the proprietary protocol and exiting the state 318.

If a control channel is not established using a proprietary protocol, the method continues with the device determining whether it has exhausted its proprietary communication protocols 316 (e.g., the ones it is capable of executing). If not, the process repeats with the device selecting another proprietary protocol 310. If the proprietary protocols are exhausted, the method continues with the device exiting this state due to a failure 318.

Figure 13:
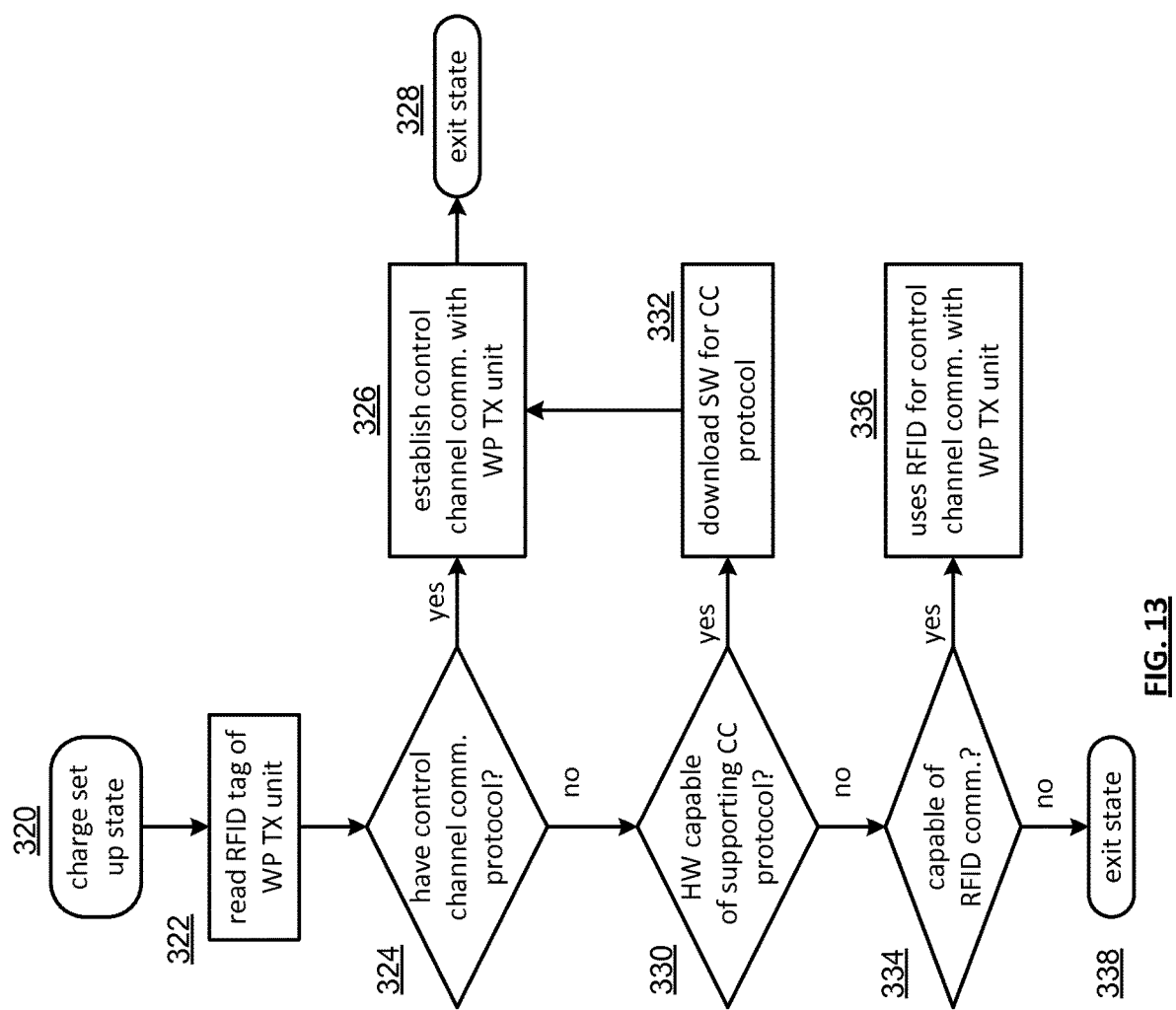
FIG. 13 is a logic diagram of another embodiment of a method for a charge set up state in accordance with the present invention.

FIG. 13 is a logic diagram of another embodiment of a method for a charge set up state 320 that begins with the device reading an RFID tag of the WP TX unit 322 to determine a desired control channel protocol. The method continues with the device determining whether it is capable of executing the desired control channel protocol 324. If yes, the method continues with the device establishing a control channel communication with the WP TX unit 326 and exiting the state 328.

If the device does not have the desired control channel protocol, the method continues with the device determining whether it includes the hardware to support the desired control channel protocol 330. For example, does it include the NFC circuitry, the RF circuitry, and/or the MMW circuitry to support the operating frequency, power requirements, transmission range, etc. of the desired control channel protocol. If yes, then the device is lacking the desired control channel protocol software and the method continues with the device downloading the software for the desired control channel protocol 332. After the device has the software, the method continues with the device establishing a control channel communication with the WP TX unit 326.

If the device does not have the hardware to support the desired control channel protocol, the method continues with the device determining whether it can use RFID as the control channel protocol with the WP TX unit 334. In an embodiment, the device requests that they use RFID, if the WP TX unit agrees, then the method continues with the device using RFID for the control channel with the WP TX unit 336. If the device cannot use RFID for the control channel, then the device exits the state due to a failure 338.

FIG. 14 is a logic diagram of an embodiment of a method for a charge state 340 that begins with the device determining the level of its battery 342 (e.g., the battery life left based on the battery type, the power demands of the device, etc.). The method continues with the device determining if the battery needs charging 344-346. For example, has the power capacity of the battery been drained below a threshold, which may be based on battery life, not being fully charged, and/or some other criteria.

The method branches back to the beginning if the battery does not need charging and branches to the next step if it does. At the next step, the device communicates with the WP TX unit to determine one or more of: impedance matching settings, operating frequency, power level, number of coils, etc 348. The method continues with the device determining whether it needs to adjust one or more of the impedance of its power RX circuit, the operating frequency of the power RX circuit, the power level, etc. and making the appropriate adjustments as needed 350.

The method continues with the device setting charging parameters 352 (e.g., Vdd, current limits, trickle level, charge time intervals, etc.). The method continues with the device charging the battery and monitoring the charging 354 (e.g., the charging current and/or the charging voltage). The device also determines whether it is still in range of the WP TX unit 356. If so, the method continues with the device determining whether the charging is complete 358. If not, the process continues by setting (i.e., adjusting if needed in subsequent repetitions of the loop) the charging parameters 348. If the device is out of range, the method continues with the device exiting this state due to a failure 360. The device also exits this state 360 if the battery is charged.

FIG. 15 is a diagram of an example of a graph of charge need versus charge efficiency that may be used by the device to determine whether charging is needed as mentioned in the logic diagram of FIG. 14. As can be inferred by the diagram of FIG. 15, the determination of whether charging is needed is a sliding scale that varies based on battery life and charging efficiency. As such, when the battery life is high, don't charge the battery unless it can be done efficiently. As the battery life diminishes, the need to charge it is greater, which, at some point, outweighs the desired for the charging to be done efficiently.

Figure 16:
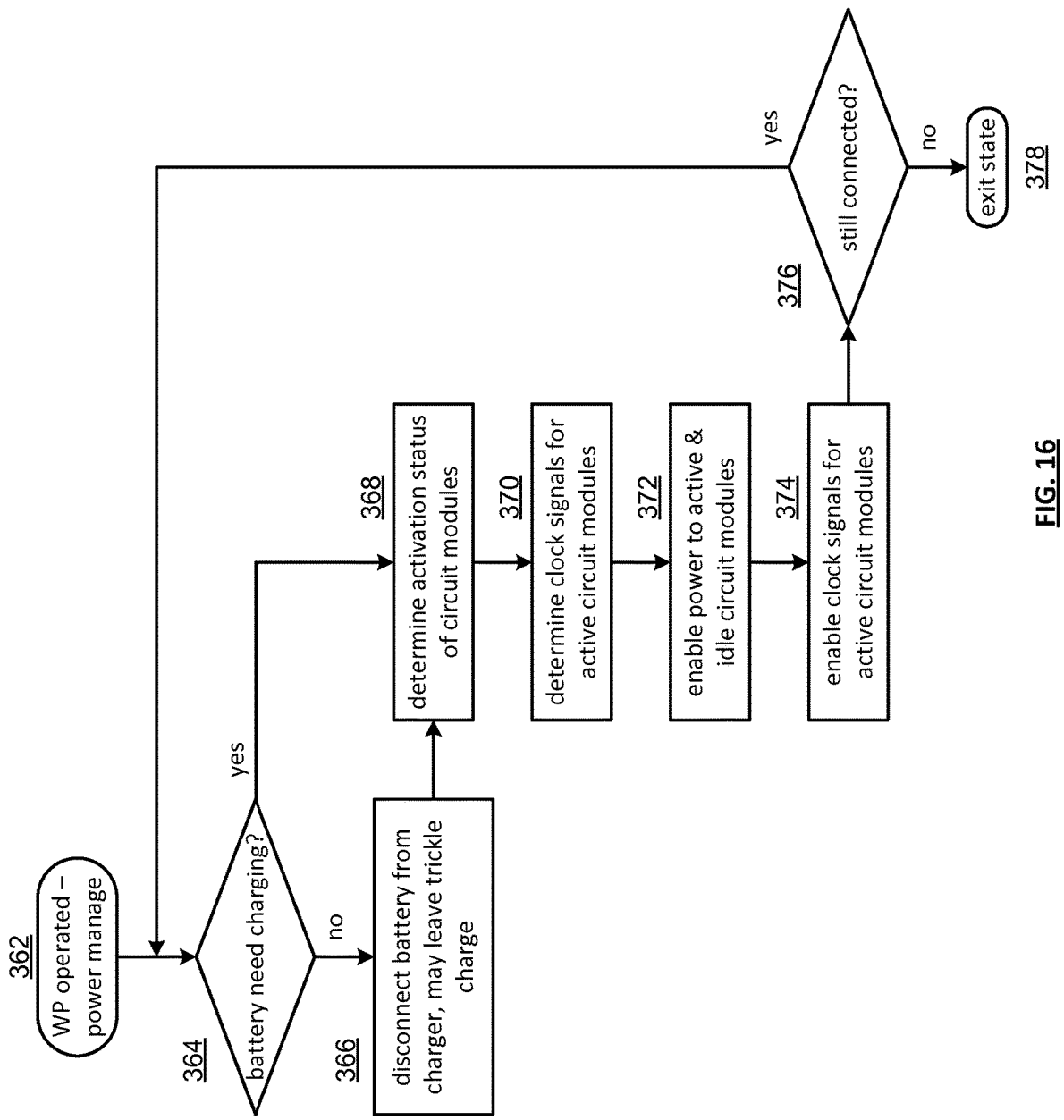
FIG. 16 is a logic diagram of an embodiment of a method for a wirelessly powered power management state in accordance with the present invention.

FIG. 16 is a logic diagram of an embodiment of a method for a wirelessly powered power management state 362 that begins with the device determining whether the battery needs charging 364. If not, the method continues with the device disconnecting the battery from the charger 366. The device may engage a trickle charge if desired or required per the battery charging requirements. The method continues with the device determining the activation status of the circuit modules 368 (e.g., disabled, active, idle, etc.). The method continues with the device determining clock signals for the active circuit modules 370 (e.g., select clock rate to just meet operational needs, which will typically be less than a maximum clock rate).

The method continues with the device determining supply voltages for the active and idle circuit modules 372. For example, the device may set the power levels for idle circuit modules at a level to provide just enough energy to determine whether the circuit module is to remain in the idle state or transition into an active state. As another example, the device may set the power level for active circuits modules to a level just sufficient enough for the circuit module to perform its task, which will typically be less than a maximum power level.

The method continues with the device enabling the clock signals for the active circuits and providing the selected power levels to the active and idle circuit modules 374. The method continues with the device determining whether it is still connected to the WP TX unit 376. If yes, the method repeats from the beginning. If not, the method continues with the device exiting the state 378. Note that in this state, power management of the device is a less critical task than when the device is battery operated. As such, the setting of the clock signal rates and power levels may be set near maximum values to enhance performance.

Figure 17:
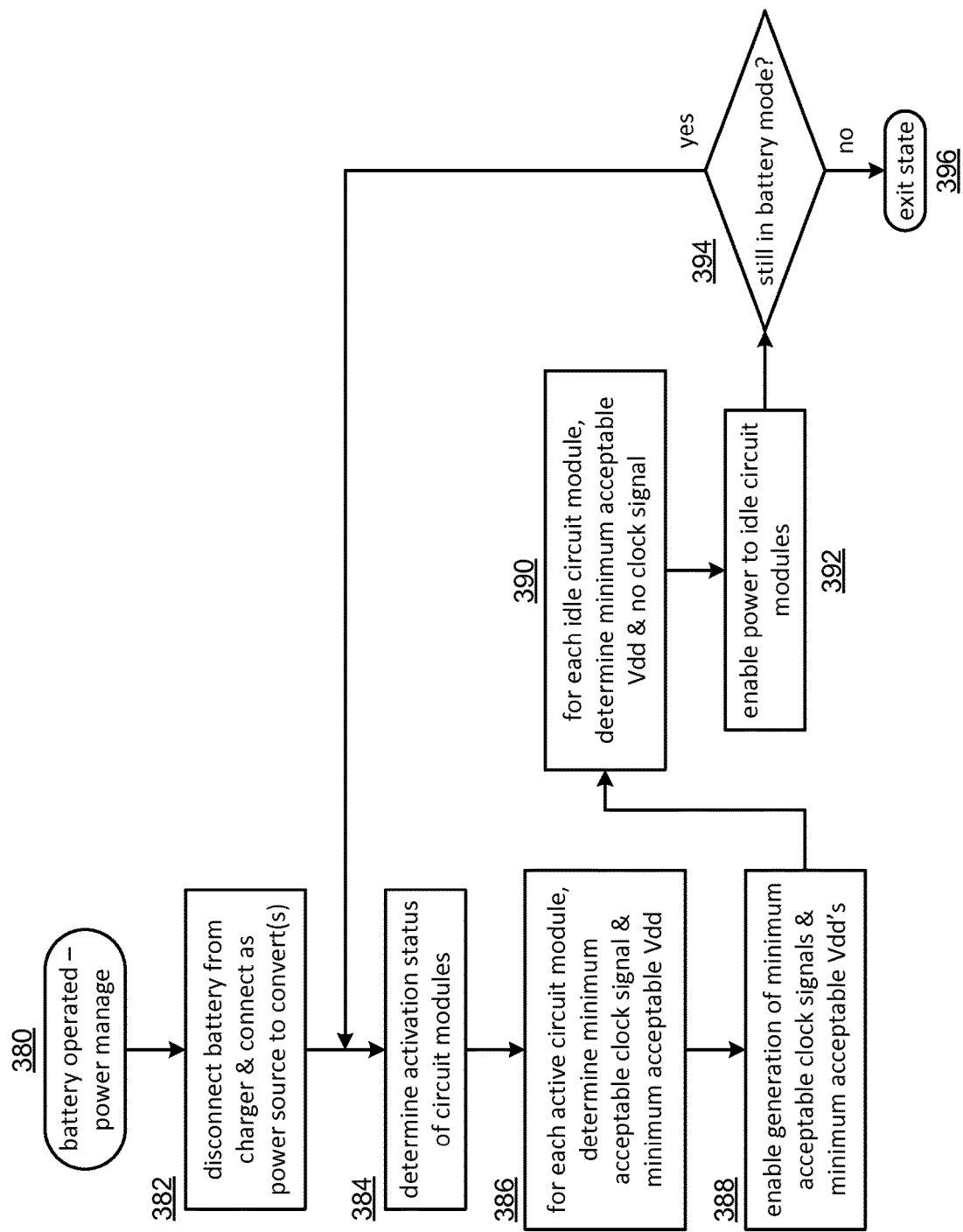
FIG. 17 is a logic diagram of an embodiment of a method for a battery powered power management state in accordance with the present invention.

FIG. 17 is a logic diagram of an embodiment of a method for a battery powered power management state 380 that begins with the device disconnecting the battery from the charger and connecting it as the primary power source 382. The method continues with the device determining activation status of the circuit modules 384 (e.g., disabled, active, idle, etc.). The method continues with the device determining, for each active circuit module, a minimum acceptable clock signal and a minimum acceptable supply voltage 386 (e.g., Vdd).

The method continues with the device enabling generation of the minimum acceptable clock signals by the clock generator and the minimum acceptable supply voltages by the converter 388. The method continues with the device determining, for each idle circuit module, a minimum acceptable idle supply voltage and no clock signal 390. The method continues with the device enabling generation of the idle supply voltage by the converter 392. The method continues with the device determining whether it is still in the battery mode 394. If yes, the method repeats. If not, the device exits this state 396.

Figure 18:
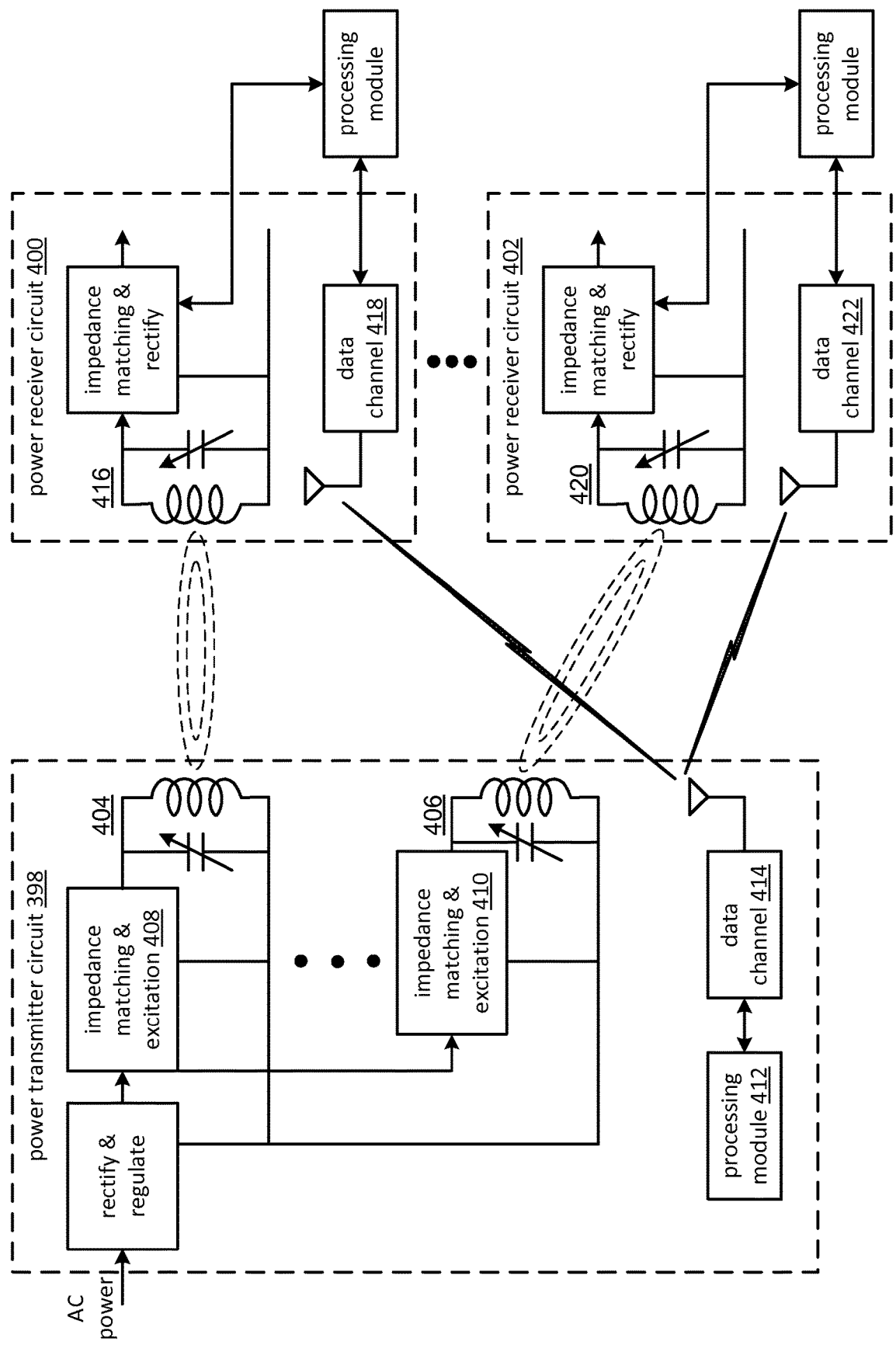
FIG. 18 is a schematic block diagram of another embodiment of a wireless power system in accordance with the present invention.

FIG. 18 is a schematic block diagram of another embodiment of a wireless power system that includes the WP TX unit 398 and a plurality of RX power circuits 400-402. In this embodiment, the WP TX unit 398 includes a plurality of coils 404-406 and impedance matching & excitation circuits, 408-410 where a TX coil 404-406 may be allocated to a RX power circuit 400-402 of a device. Each matching of a TX coil 404-406 to an RX power circuit 400-402 may operate at a unique frequency to minimize interference. Further, the power provided by each TX coil 404-406 may be limited due to a power allocation function of the WP TX unit 398. For example, if the WP TX unit 398 has a maximum output power of 100 Watts and it is coupled to six RX units 400-402, each wanting 20 Watts, the WP TX unit allocates power to the six RX units 400-402 based an allocation scheme (e.g., equal sharing, prioritized sharing, need based, etc.).

The WP TX unit 398 further includes a processing module 412 and a data channel transceiver 414 (RF, MMW, and/or NFC) to communicate with the corresponding transceivers 418-422 of the RX power circuits 400-402. In this manner, the communication protocol includes provisions to support multiple communications.

In this embodiment, the transmit unit processing module 412 (which may be the same as previously discussed processing modules) functions to determine a number of transmit unit coils. The processing module then determines a number of proximal wireless power receive units of the plurality of wireless power receive units. The processing module continues by determining whether the number of transmit unit coils is equal to or greater than the number of proximal wireless power receive units. When the number of transmit unit coils is equal to or greater than the number of proximal wireless power receive units, the processing module continues by determining pairings of a transmit unit coil of the transmit unit coils to a wireless power receive unit of the proximal wireless power receive units. The processing module continues by determining, for each of the pairings, at least one of frequency allocation and power allocation.

When the number of transmit unit coils is less than the number of proximal wireless power receive units, the processing module continues by determining an affiliation of one of the transmit unit coils and at least two of the proximal wireless power receive units. The processing module continues by determining sharing parameters of the one of the transmit unit coils by the at least two of the proximal wireless power receive units. Sharing the transmit coil(s) will be discussed in greater detail with reference to FIG. 19.

Figure 19:
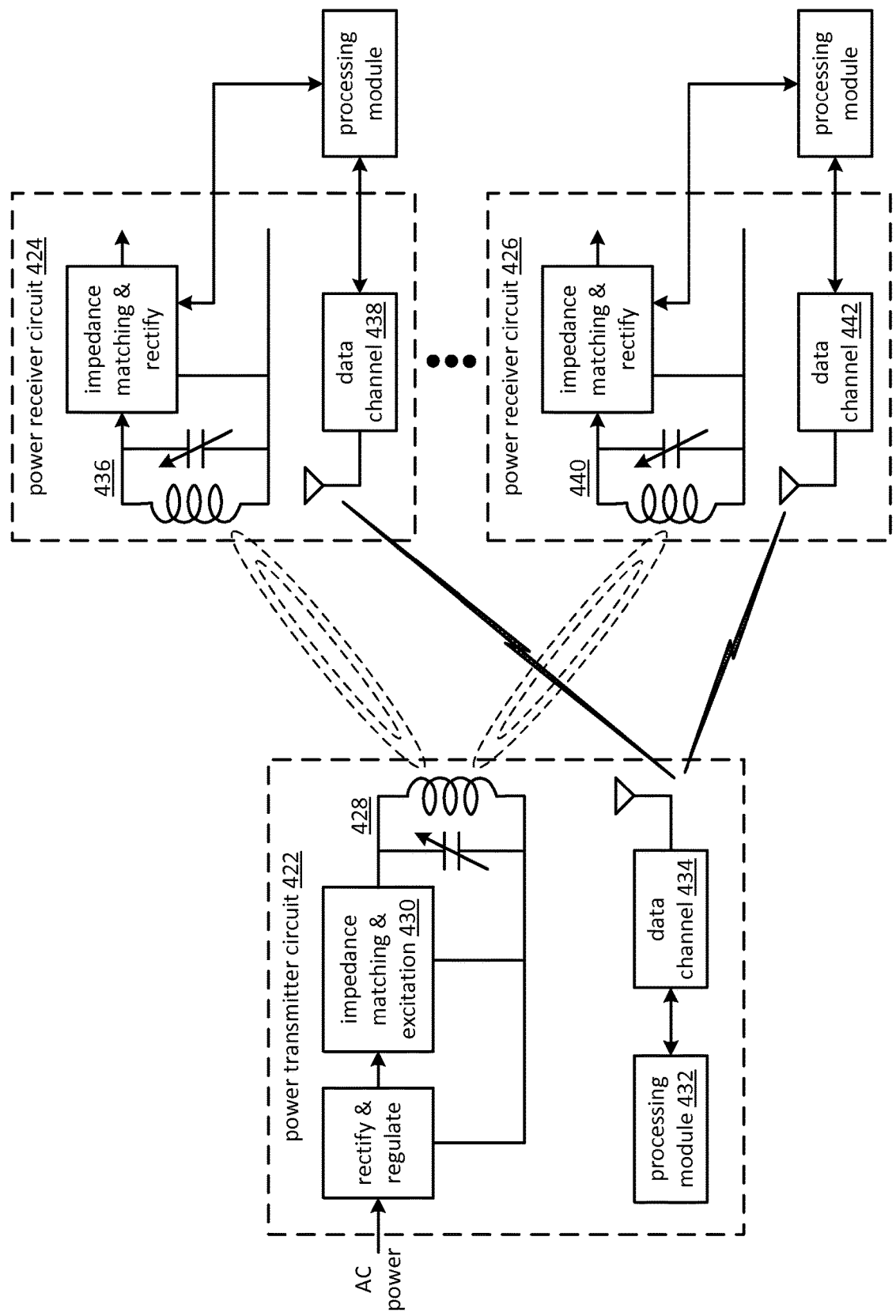
FIG. 19 is a schematic block diagram of another embodiment of a wireless power system in accordance with the present invention.

FIG. 19 is a schematic block diagram of another embodiment of a wireless power system that includes the WP TX unit 422 and a plurality of RX power circuits 424-426. In this embodiment, the WP TX unit 422 includes a TX coil 428 and an impedance matching & excitation circuit 430, where the RX power circuits 424-426 share the TX coil 428. The sharing of the TX coil 428 may be concurrent and/or sequential. For example, if the RX coil 436, 440 of multiple RX power circuits 424-426 is in range of the magnetic field generated by the TX coil 428, then multiple RX power circuits 424-426 may be concurrently enabled. In this instance, power limiting may be required based on the power capabilities of the WP TX unit 422 and the power requirements of the RX power circuits 424-426.

When the TX coil 428 is shared in a sequential manner, each RX power circuit 424-426 needing wireless power is provided time divisional multiple access (TDMA) access to the TX coil 428. The time slots of the TDMA allocation scheme may be the same size or of different sizes. Also an RX power circuit 424-426 may be allocated more than one time slot per TDMA frame.

When the TX coil 428 is shared in a concurrent and sequential manner, the RX power circuit 424-426 may be grouped, where, from group to group, there is TDMA access to the TX coil 428. Within a group, however, the access to the TX coil 428 is concurrent. In this manner, a single TX coil 428 may support multiple RX power circuits 424-426.

The WP TX unit 422 further includes a processing module 432 and a data channel transceiver 434 (RF, MMW, and/or NFC) to communicate with the corresponding transceivers 438, 442 of the RX power circuits 424-426. In this manner, the communication protocol includes provisions to support multiple communications.

Figure 20:
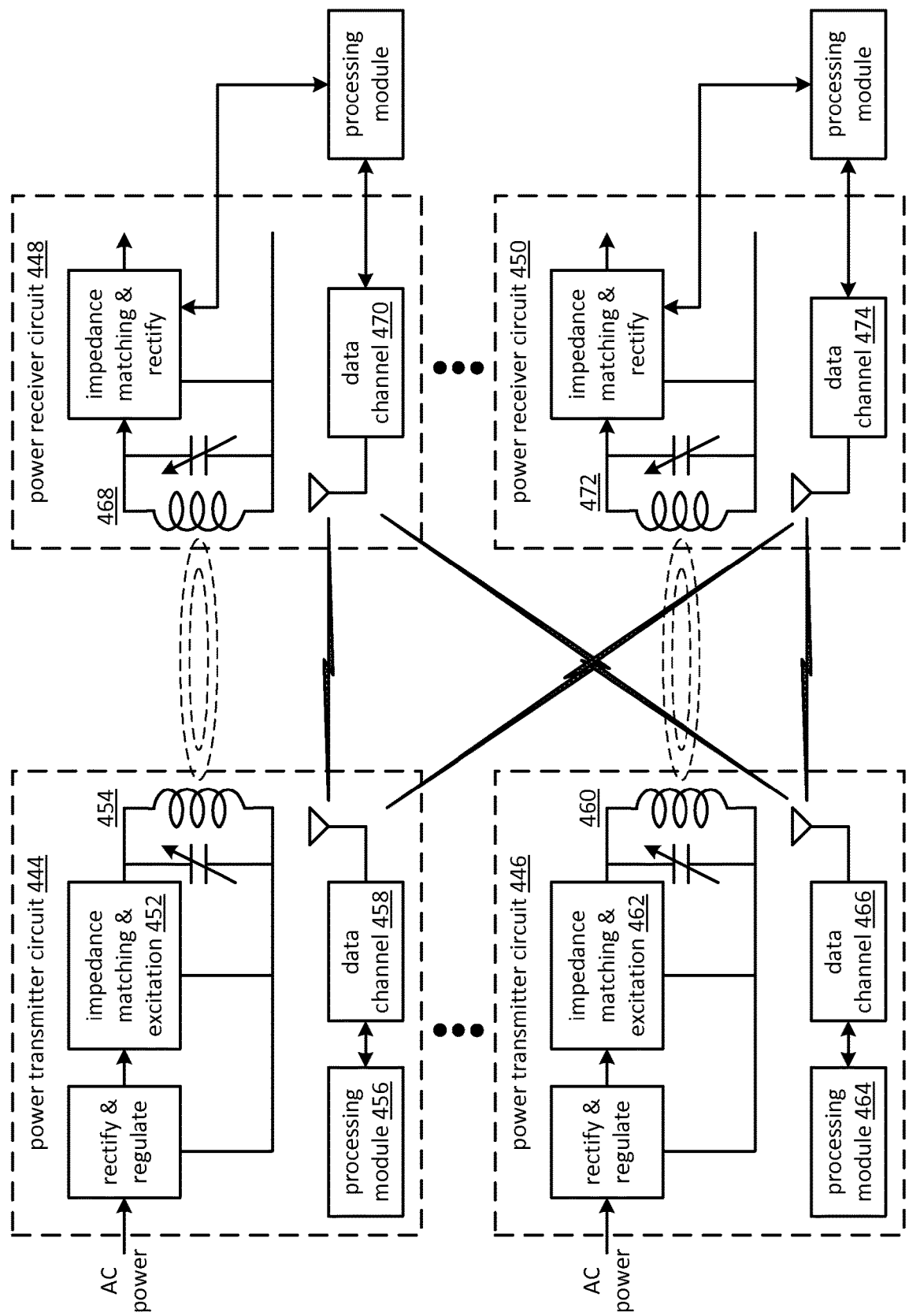
FIG. 20 is a schematic block diagram of another embodiment of a wireless power system in accordance with the present invention.

FIG. 20 is a schematic block diagram of another embodiment of a wireless power system that includes a plurality of WP TX units 444-446 and a plurality of RX power circuits 448-450. In this embodiment, each WP TX unit 444-446 includes a TX coil 454, 460 and an impedance matching & excitation circuit 452, 462 and may be allocated to one of the RX power circuits 448-450. Each matching of a WP TX unit 444-446 to an RX power circuit 448-450 may operate at a unique frequency to minimize interference.

The WP TX unit 444-446 further includes a processing module 456, 464 and a data channel transceiver 458, 466 (RF, MMW, and/or NFC) to communicate with the corresponding transceivers 470, 474 of the RX power circuits 448, 450. In this manner, the communication protocol includes provisions to support multiple communications.

For a given geographic area (e.g., an office, a home, a public internet café, etc.) may include one or more the WP system of FIGS. 18-20, which would require communication between to the system to minimize interference there between. In any of the systems, an RX power circuit may be paired with a TX coil that provides an efficient WP transfer. In this regard, allocation of RX coil to an RX power circuit may change to make the overall system more efficient.

FIG. 21 is a diagram of an example of frequency planning within a wireless power system that includes one or more frequency bands for wireless power (WP) transmissions (5-50 MHz), one or more frequency bands for WP control channel communications (e.g., 2400 MHz, 5800 MHz, 60 GHz, etc.), and one or more frequency bands used by the device based on the device function (e.g., 900 MHz, 1800 MHz, 60 GHz, etc.). Also shown are harmonics of the WP frequency bands and that the device frequency bands may overlap or fully coincide with the WP control channel frequency bands. Without some frequency planning, unnecessary interference with the operation of the device and/or the control channel communications may result.

FIG. 22 is a diagram of another example of frequency planning within a wireless power system to avoid harmonics of the WP frequency bands interfering with the channels being use by the device. In this example, the WP frequencies that produce harmonics that coincide with the channels being used by the device are avoided, thus avoiding the generation of interfering harmonics. The WP TX unit may determine the channels being used by the device via reading the RFID of the device, by control channel communication, by frequency sweeping, and/or any other detection mechanism.

In this example, the channels being used by the device do not overlap with the WP control channel frequency bands. Thus, any channel within the WP control channel frequency band may be used for WP control channel communications.

Figure 23:
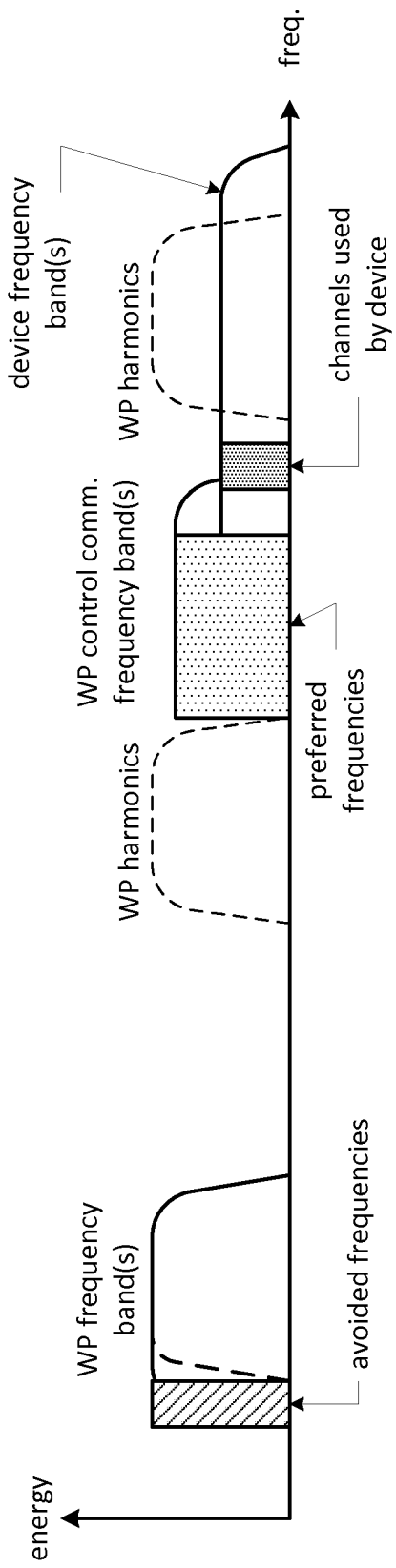
FIG. 23 is a diagram of another example of frequency planning within a wireless power system in accordance with the present invention.

FIG. 23 is a diagram of another example of frequency planning within a wireless power system to avoid harmonics of the WP frequency bands interfering with the channels being use by the device. In this example, the WP frequencies that produce harmonics that coincide with the channels being used by the device are avoided, thus avoiding the generation of interfering harmonics. The WP TX unit may determine the channels being used by the device via reading the RFID of the device, by control channel communication, by frequency sweeping, and/or any other detection mechanism.

In this example, the channels being used by the device overlap with the WP control channel frequency bands. Thus, the overlapping WP control channels are avoided and a non-overlapping channel of the WP control channel frequency band is used for WP control channel communications.

Figure 24:
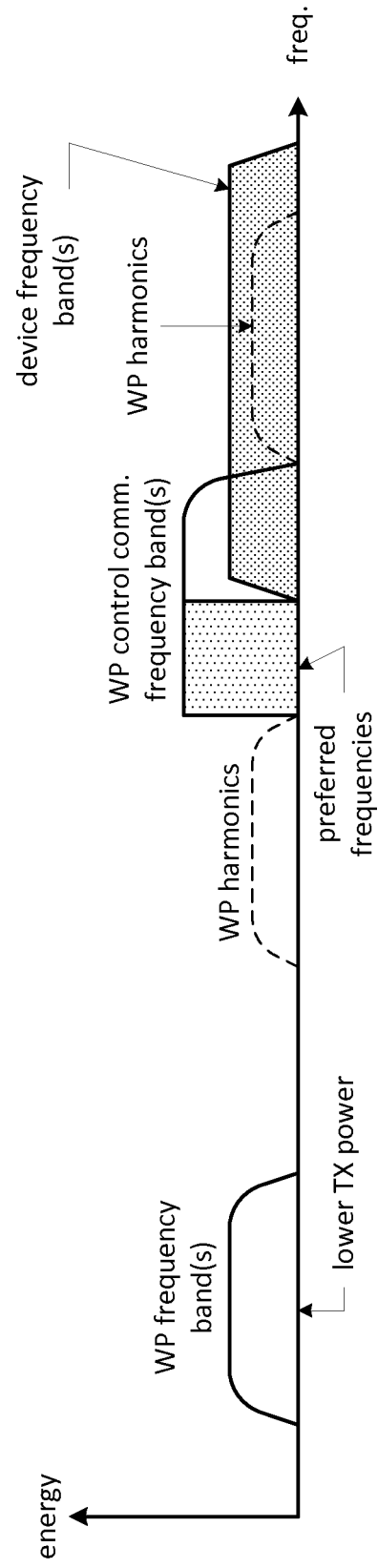
FIG. 24 is a diagram of another example of frequency planning within a wireless power system in accordance with the present invention.

FIG. 24 is a diagram of another example of frequency planning within a wireless power system to avoid harmonics of the WP frequency bands interfering with the channels being use by the device. In this example, the device uses its entire frequency spectrum (e.g., CDMA, spread spectrum, etc.) and overlap of WP frequency harmonics with the channels being used by the device cannot be avoided. In this instance, the power level of the TX signals is lowered to reduce the harmonic interference.

In this example, the channels being used by the device overlap with the WP control channel frequency bands. Thus, the overlapping WP control channels are avoided and a non-overlapping channel of the WP control channel frequency band is used for WP control channel communications.

FIG. 25 is a diagram of another example of frequency planning within a wireless power system that is supporting multiple RX power circuits by multiple TX coils (e.g., one unit with multiple coils and/or multiple WP TX units). As shown, each device uses some, but not all, of the channels in the device frequency band spectrum. This provides frequencies within the WP frequency band to avoid. From the available frequencies, one or more channels are selected for the first device and one or more channels are selected for the second device.

In this example, the channels being used by the devices do not overlap with the WP control channel frequency bands. Thus, any channel within the WP control channel frequency band may be used for WP control channel communications.

FIG. 26 is a diagram of another example of frequency planning within a wireless power system that supports multiple devices with a single TX coil. In this example, the above interference issues apply with the further processing of TDMA allocation of the TX coil to first and second devices. Note that, from the device to device, the interference avoidance techniques may vary from device to device. As such, what frequencies work to avoid interference for one device may not be the same frequencies that avoid interference for another device. Further note that multiple coils may be used, where each coil supports multiple RX units in this manner.

FIG. 27 is a diagram of another example of frequency planning within a wireless power system that supports multiple devices with a single TX coil. In this example, the above interference issues apply with the further processing of TDMA and FDMA (frequency division multiple access) allocation of the TX coil to first and second devices. Note that, from the device to device, the interference avoidance techniques may vary from device to device. As such, what frequencies work to avoid interference for one device may not be the same frequencies that avoid interference for another device. Further note that multiple coils may be used, where each coil supports multiple RX units in this manner.

Figure 28:
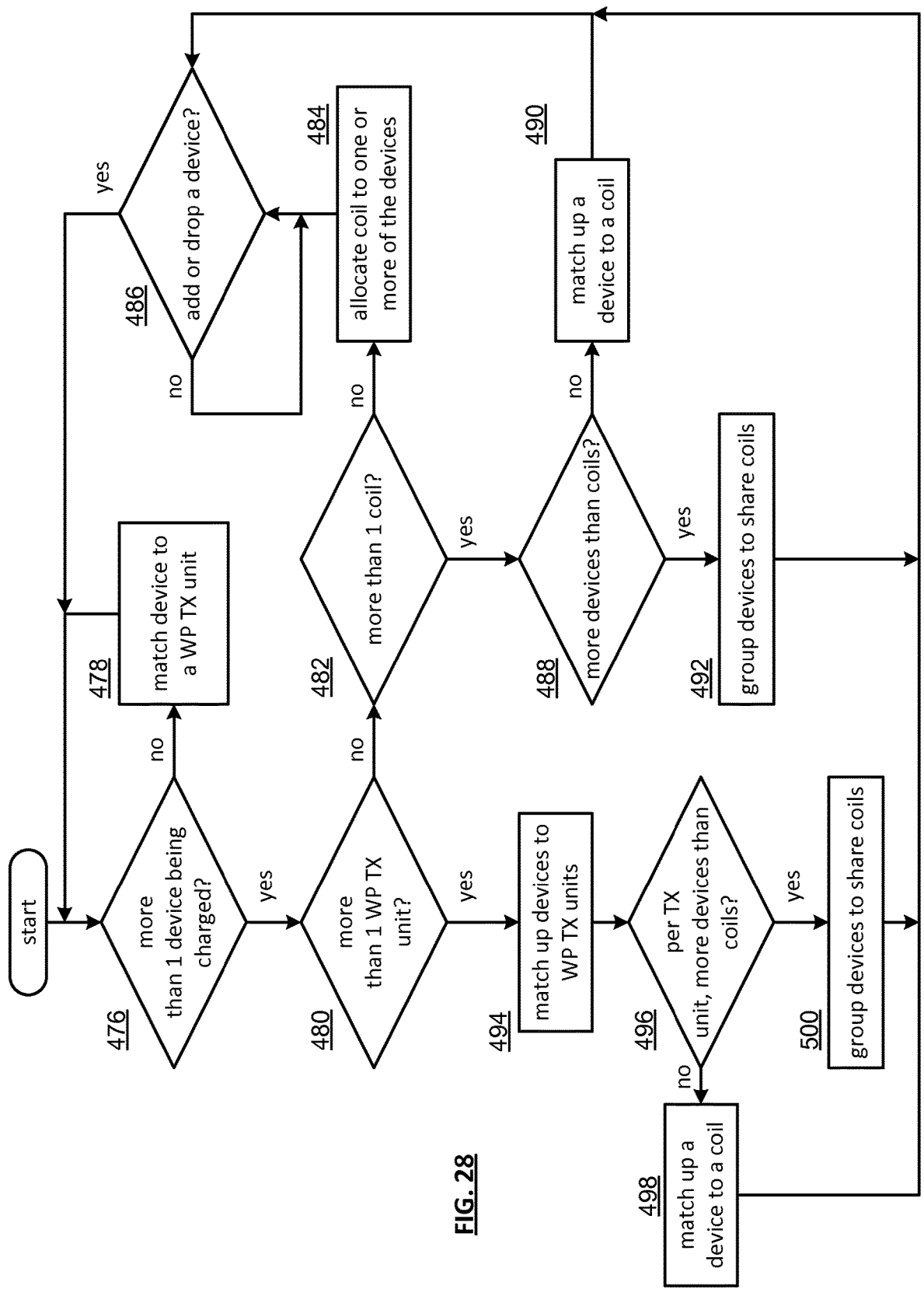
FIG. 28 is a logic diagram of an embodiment of a method for managing a wireless power system in accordance with the present invention.

FIG. 28 is a logic diagram of an embodiment of a method for managing a wireless power system that begins with the WP TX unit determining whether more than 1 device is being charged or is to be charged 476. If not, method continues with the WP TX unit matching the device with a WP TX unit in a multiple WP TX unit system or with one of a plurality of TX coils of a WP TX unit 478. The matching may be determined based on proximal location, efficiency of magnetic coupling, power requirements, etc. The method repeats from the beginning.

If there is more than 1 device to charge, the method continues with the WP TX unit determining whether there is more than 1 WP TX unit within the system 480. If not, the method continues with the WP TX unit determining whether it has more than 1 TX coil 482. If not, the method continues with the WP TX unit allocating the TX coil to one or more of the devices in a TDMA manner, a TDMA-FDMA manner, based on priority need, based on power limits, etc 484. The method continues with the WP TX unit determining whether a device has been added or dropped from the wireless power system 486 (e.g., is off, the battery is fully charged, the device has moved out of range, etc.). The method remains in this loop until a device is added or deleted from the system.

If the WP TX unit determines that it includes more than 1 TX coil, the method continues with the WP TX unit determining whether there are more devices requesting wireless power service than the number of TX coils it has 488. If not, the method continues with the WP TX unit matching devices to coils based on one or more of frequency, power, proximity, control channel communications, availability, interference avoidance, etc 490. The method then repeats at the step of adding or deleting a device from the system 486.

If the WP TX unit determines that there are more devices requesting wireless power access than it has coils, the method continues with the WP TX unit grouping the devices to share one or more of its TX coils 492. The method then repeats at the step of adding or deleting a device from the system 486.

If the WP TX unit determines that the system includes more than one WP TX unit, the method continues with the WP TX units coordinating to match the devices with one or more of the WP TX units 494. The method continues with the WP TX unit(s) determining whether, per WP TX unit, there are more devices allocated to it than it has coils 496. If not, the method continues with the WP TX unit(s) matching devices to TX coils 498. If there are more devices than coil, the method continues with the WP TX unit grouping the devices to share one or more of its TX coils 500. The method then repeats at the step of adding or deleting a device from the system 486.

Figure 29:
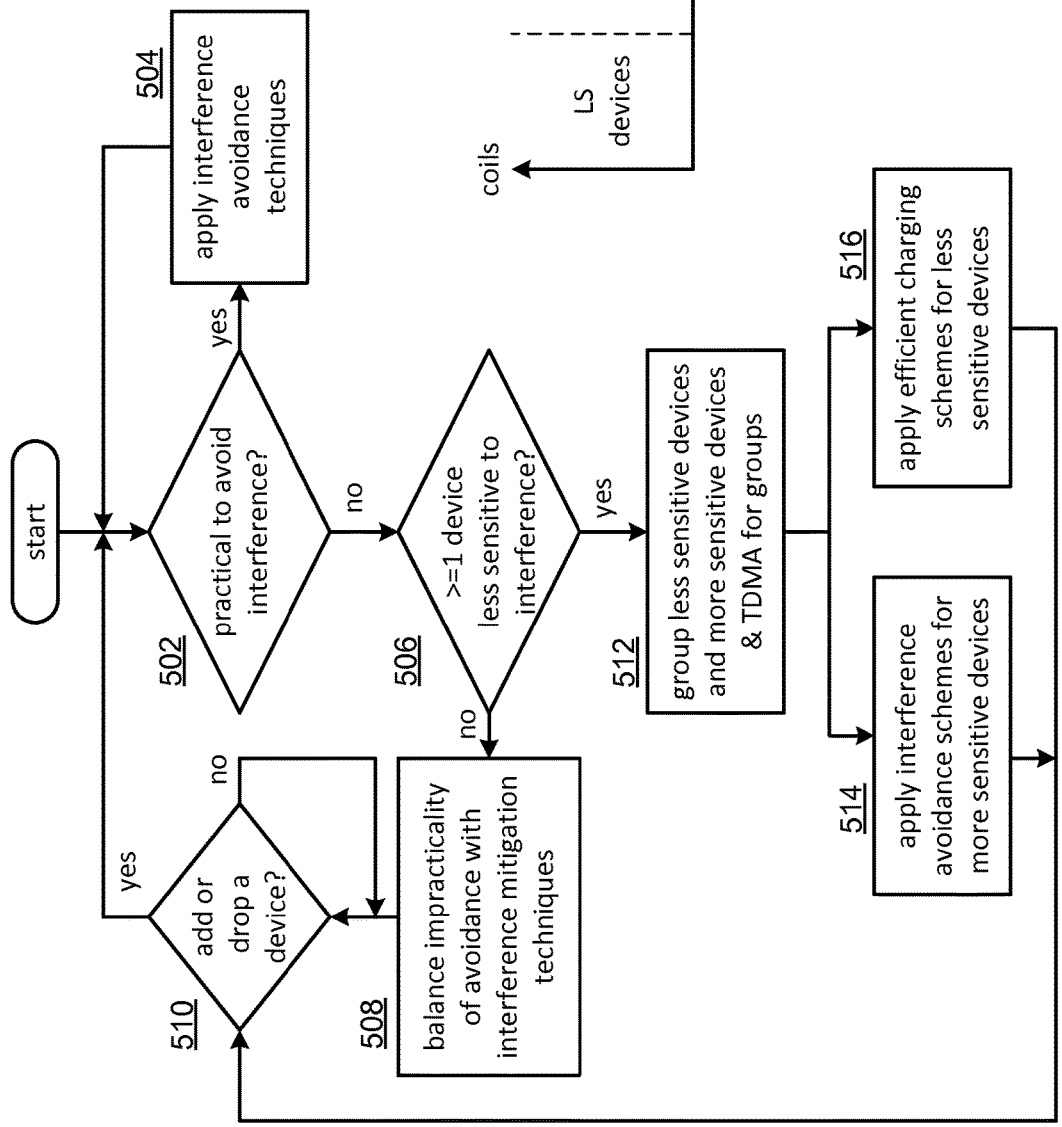
FIG. 29 is a logic diagram of another embodiment of a method for managing a wireless power system in accordance with the present invention.

FIG. 29 is a logic diagram of another embodiment of a method for managing a wireless power system that begins with the WP TX unit determining whether it is practical to avoid interference 502 (e.g., can apply one or more of the techniques previously described). If yes, the method continues with the WP TX unit applying one or more of the interference avoidance techniques 504 and the method repeats from the beginning.

If, however, it is not practical to avoid interference, the method continues with the WP TX unit determining whether there are one or more devices that are less sensitive to interference than the other devices 506. If not, the method continues with the WP TX unit balancing the impracticality of interference avoidance with the interference mitigation techniques 508. For example, the power may be reduced, charging rates may be changed to reduce power, prioritization schemes may be adjusted, etc. The method continues with the WP TX unit determining whether a device has been added to or deleted from the system 510. If not, the loop repeats until a device is added or deleted. When a device is added or deleted, the method repeats at the beginning.

If the WP TX unit determines that there is at least one less sensitive device 506, the method continues with the WP TX unit grouping the devices based on their sensitivity 512. For example, less sensitive devices are grouped together as are more sensitive devices. The method continues with the WP TX unit applying interference avoidance schemes for the more sensitive devices 514 and applying efficient charging schemes for the less sensitive devices 516.

Figure 30:
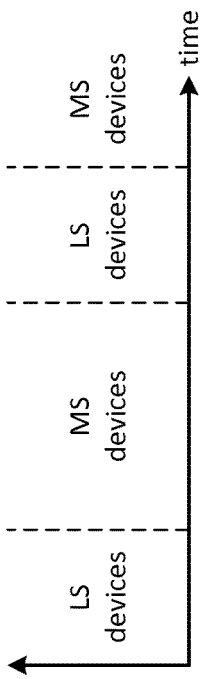
FIG. 30 is a diagram of an example of managing a wireless power system in accordance with the present invention.

FIG. 30 is a diagram of an example of managing a wireless power system where less interference sensitive devices are grouped together as are more interference sensitive devices.

Figure 31:
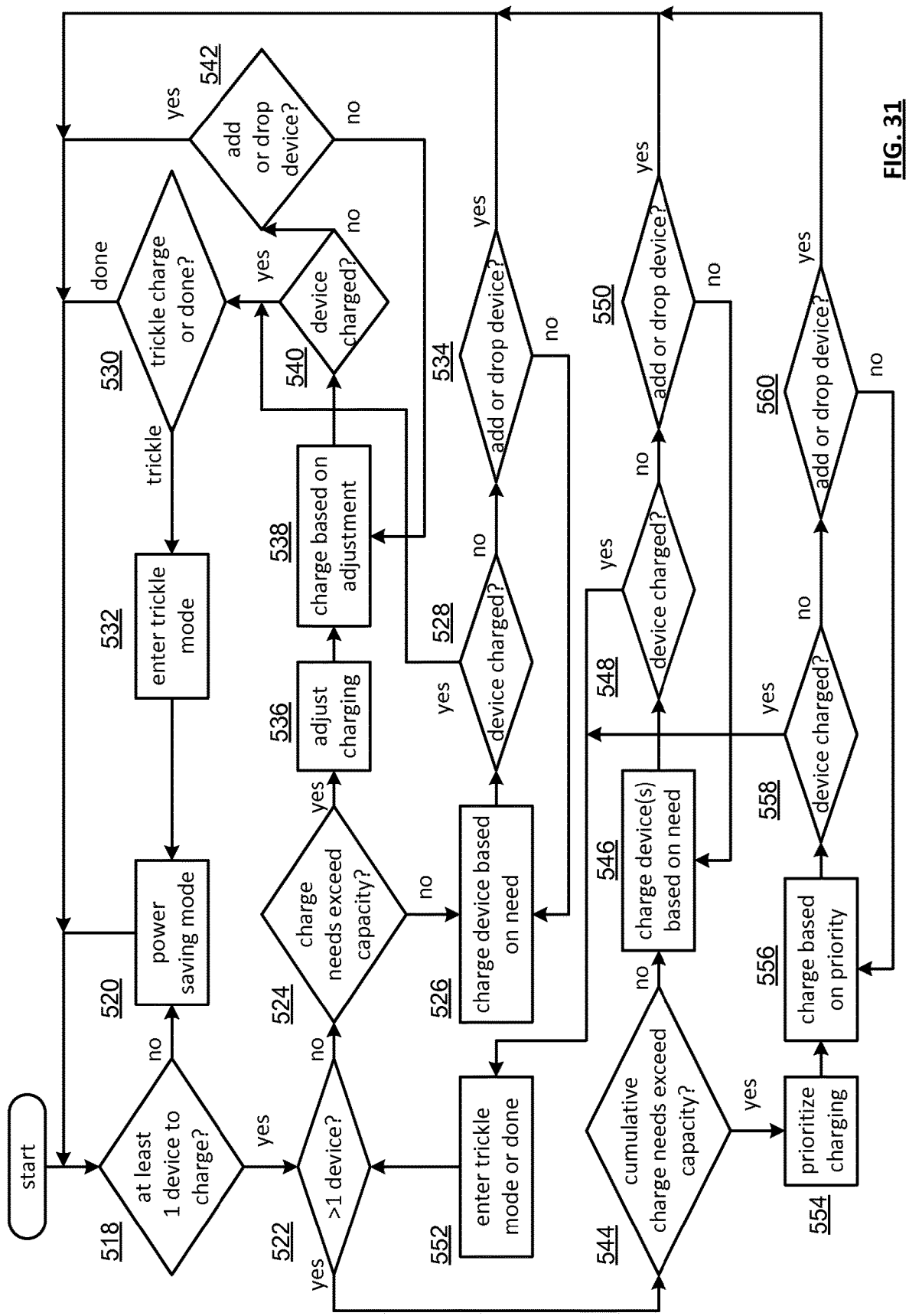
FIG. 31 is a logic diagram of another embodiment of a method for managing a wireless power system in accordance with the present invention.

FIG. 31 is a logic diagram of another embodiment of a method for managing a wireless power system that begins with the WP TX unit determining whether there is at least one device to charge and/or requesting wireless power 518. If not, the method continues with the WP TX unit entering a power savings mode 520. In this mode, the WP TX unit does not provide power to its TX coils to reduce power consumption. Also in this mode, the WP TX unit provides sufficient power to the WP transceiver such that the control channel remains active.

If there is at least one device to charge or requesting wireless power, the method continues with the WP TX unit determining whether there is more than one device to charge or requesting wireless power 522. If not, the method continues with the WP TX unit determining whether the charging and/or wireless power needs of the device exceeds the power capabilities of the WP TX unit 524. If not, the method continues with the WP TX unit providing wireless power to the device to meet its charging needs and/or wireless power needs 526.

The method continues with the WP TX unit determining whether the device is charged and/or whether the device's wireless power needs have been met 528. If yes, the method continues by determining whether the device requires a trickle charge 530. If yes, the method continues with the WP TX unit providing enough wireless power to support a trickle charge 532. The method then repeats at the power saving mode step 520. If, however, the device does not require a trickle charge, the method repeats from the beginning. If the device is not charged and/or the device's wireless power needs have not been met, the method continues with the WP TX unit determining whether a device is added or dropped from the system 534. If not, the method repeats at the charge device based on need step 526. If, however, a device is added or dropped (e.g., the present device loses connection to the WP TX unit) from the system, the method repeats from the beginning.

If the WP TX unit determines that the charging or wireless power needs of the device exceeds its power capabilities, the method continues with the WP TX unit adjusting the charging and/or wireless power needs of the device to conform with the WP TX unit capabilities 536. The method continues with the WP TX unit providing wireless power to the device to charge its battery and/or to meet is wireless power needs 538. The method continues with the WP TX unit determining whether the device is charged and/or whether the device's wireless power needs have been met based on the adjusted wireless power needs 540. If yes, the method continues by determining whether the device requires a trickle charge 530. If yes, the method continues with the WP TX unit providing enough wireless power to support a trickle charge 532. The method then repeats at the power saving mode step 520. If, however, the device does not require a trickle charge, the method repeats from the beginning. If the device is not charged and/or the device's wireless power needs have not been met in accordance with the adjusted wireless power needs, the method continues with the WP TX unit determining whether a device is added or dropped from the system 542. If not, the method repeats at the charge device based on need step 538. If, however, a device is added or dropped (e.g., the present device loses connection to the WP TX unit) from the system, the method repeats from the beginning.

If the WP TX unit determines that there is more than one device to charge and/or requesting wireless power, the method continues with the WP TX unit determining cumulative wireless power needs of the more than one devices and whether the needs exceeds the capabilities of the WP TX unit 544. If not, the method continues with the WP TX unit providing wireless power to the devices for charging and/or for their wireless power requests based on their respective needs 546. The method continues with the WP TX unit determining whether one of the devices has been charged and/or its wireless power needs have been met 548. If so, the method continues with the WP TX unit providing wireless power to the device to support a trickle charge mode 552 and the process repeats at the determining more than 1 device step 522.

If the devices are not charged and/or the devices' wireless power needs have not been met, the method continues with the WP TX unit determining whether a device is added or dropped from the system 550. If not, the method repeats at the charge devices based on wireless power needs step 546. If, however, a device is added or dropped (e.g., a device loses connection to the WP TX unit) from the system, the method repeats from the beginning.

If the WP TX unit determines that the cumulative wireless power needs exceeds its wireless power capabilities, the method continues with the WP TX unit adjusting charging and/or wireless power needs of the devices 554. This may be done unilaterally or based on communication with the devices. The method continues with the WP TX unit providing wireless power to the devices based on the adjusted wireless power needs 556. The method continues with the WP TX unit determining whether one of the devices has been charged and/or its wireless power needs have been met 558. If so, the method continues with the WP TX unit providing wireless power to the device to support a trickle charge mode 552 and the process repeats at the determining more than 1 device step 522.

If the devices are not charged and/or the devices' wireless power needs have not been met, the method continues with the WP TX unit determining whether a device is added or dropped from the system 560. If not, the method repeats at the charge devices based on wireless power needs step 556. If, however, a device is added or dropped (e.g., a device loses connection to the WP TX unit) from the system, the method repeats from the beginning.

Figure 32:
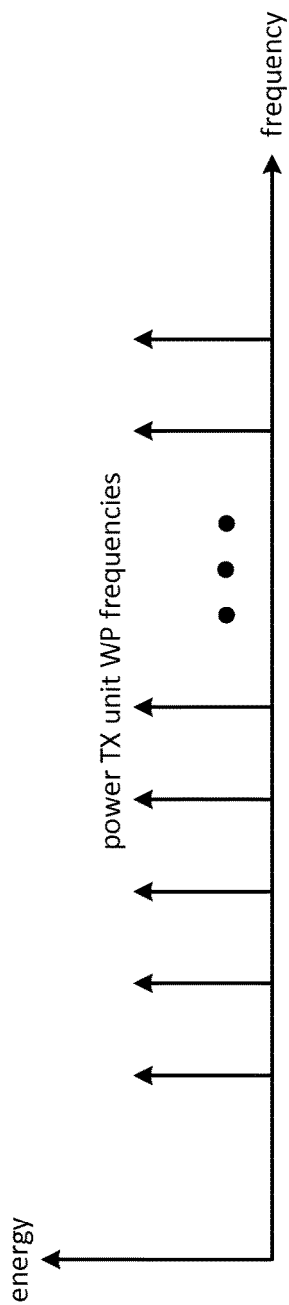
FIG. 32 is a diagram of an example of power transmit frequency spectrum for a wireless power system in accordance with the present invention.

FIG. 32 is a diagram of an example of power transmit frequency spectrum for a wireless power system. In this example, the WP TX unit frequency spectrum includes a plurality of frequencies equally spaced. The frequencies may represent a single carrier frequency or a channel (e.g., a range of frequencies). The WP TX unit may include one coil circuit that is tunable to at least some of the frequencies in its frequency spectrum or includes a plurality of TX coil circuits that are tunable to at least two frequencies in the frequency spectrum. In an embodiment, the WP TX unit may transmit its frequency spectrum pattern on the control channel and/or via an RFID message.

Figure 33:
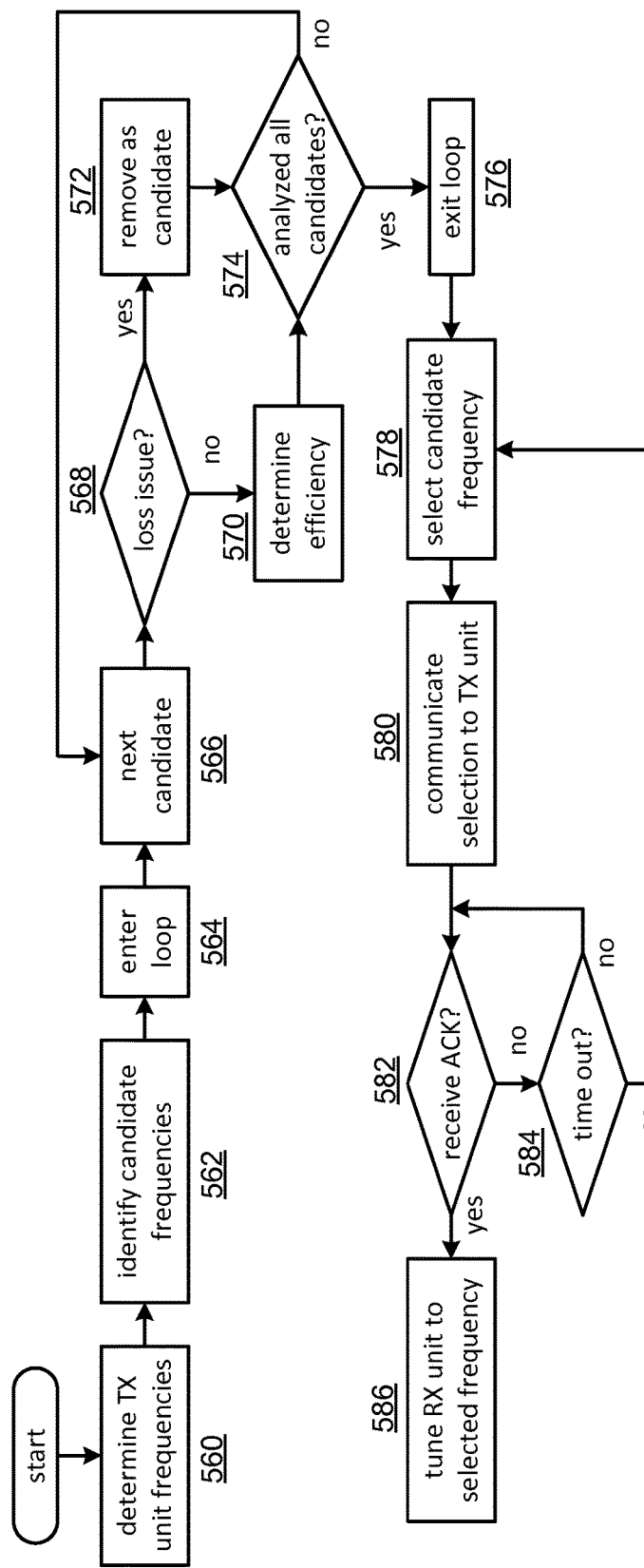
FIG. 33 is a logic diagram of another embodiment of a method for managing a wireless power system in accordance with the present invention.

FIG. 33 is a logic diagram of another embodiment of a method for managing a wireless power system that begins with the device determining the TX WP frequencies within the WP TX frequency spectrum that the WP TX unit is capable of using 560. For example, the device may receive the control channel and/or RFID message that indicates the WP TX frequencies and/or may perform a frequency scan to identify the TX WP frequencies. The method continues with the device identifying potential frequencies that it may use to meet its wireless power needs 562. The devices flag such frequencies as candidate frequencies.

The method continues with the device entering a loop 564. The loop begins with the device selecting one of the candidate frequencies from the list of candidate frequencies previously created 566. The method continues with the device determining whether there are loss issues for this candidate frequency 568. Loss issues include poor magnetic coupling, magnetic field interference, interference with operation of the device, interference with control channel communication, and/or any other factor that would result in a less than optimal magnetic coupling with the WP TX unit and/or less than optimal performance of the device.

If the device determines that the current candidate frequency does not have a loss issue, the device determines the efficiency of using the candidate frequency 570, which may include determining magnetic coupling efficiency, with tunable range of devices RX coil and impedance matching circuitry, etc. The device records this information. If, however, the device determines that there is a loss issue, the device removes this candidate frequency from the list 572. In either event, the method continues with the device determining whether it has analyzed all or a desired number of the candidate frequencies 574. If not, the loop is repeated for another candidate frequency 566. If yes, the method continues with the device exiting the loop 576.

After exiting the loop, the device selects one of the remaining candidate frequencies to use to meet its wireless power needs 578. The method continues with the device communicating its selection of a frequency to the WP TX unit 580. The method continues with the device determining whether the WP TX unit has acknowledged the use of the selected frequency 582. If not, the device determines whether a time out period has expired 584. If not, the device waits in a loop for an ACK 582 or for the time out to expire. If the time out expires, the device selects another frequency 578 and repeats the process. If the WP TX unit acknowledges the selected frequency, the method continues with the device tuning is RX power circuit to the selected frequency 586.

Figure 34:
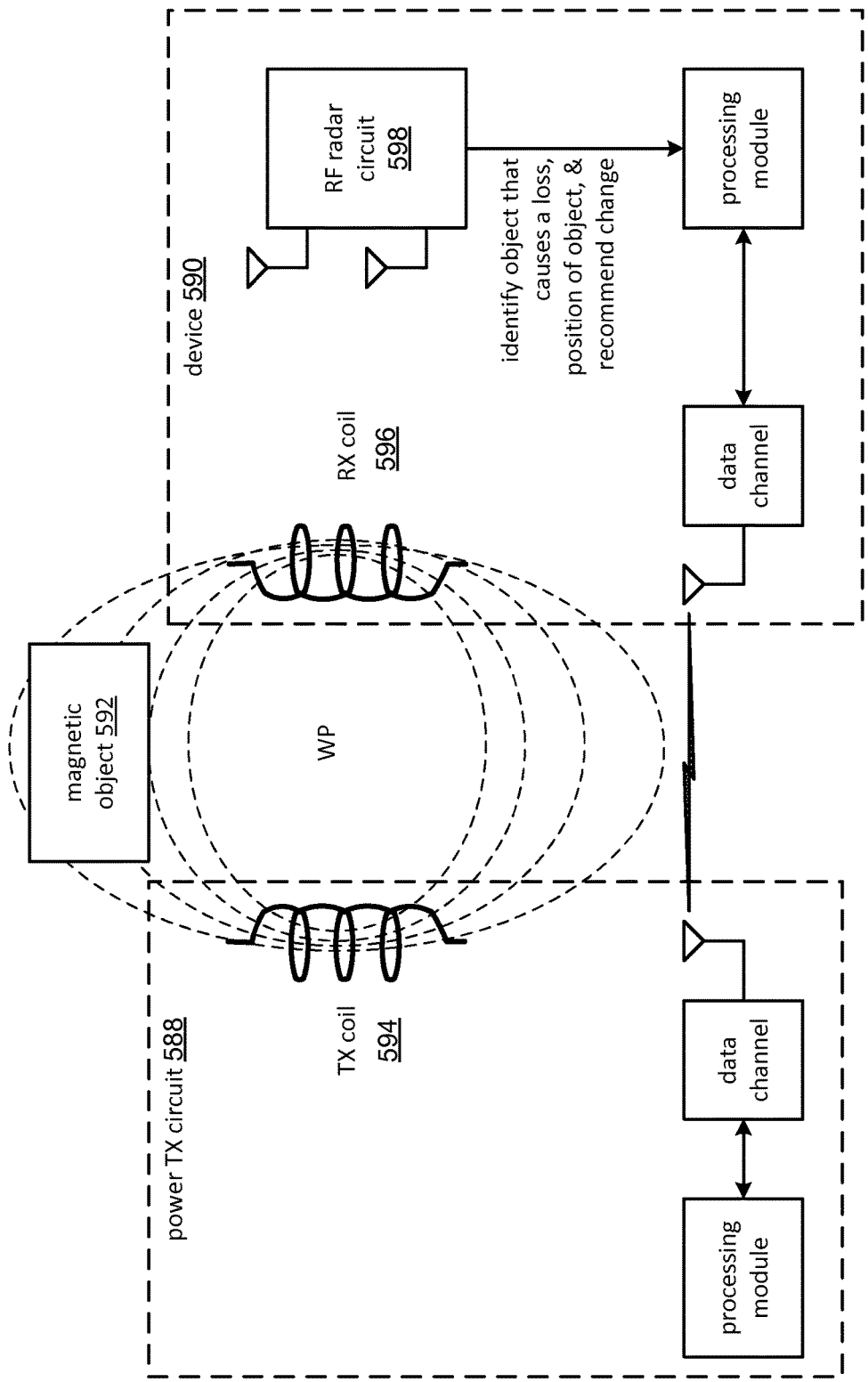
FIG. 34 is a schematic block diagram of another embodiment of a wireless power system in accordance with the present invention.

FIG. 34 is a schematic block diagram of another embodiment of a wireless power system that includes the WP TX unit 588 and the device 590. In this diagram, a magnetic object 592 (e.g., keys, magnetic, etc.) is proximal to the WP TX unit 588 and the device 590 such that it may interfere with the magnetic coupling between the TX coil 594 and the RX coil 596. When this is the situation, the WP TX unit 588 and the device 590 attempt to mitigate the adverse affects of the magnetic object 592. For example, the WP TX unit 588 and the device 590 may change the operating frequency, change the orientation of the magnetic field, issue a message indicating repositioning of the device 590, use a different TX coil, use a different RX coil, and/or increase the magnetic field to saturate the object. If no viable solution exists, issue a message on the device 590 to move the magnetic object 592 and do not enable wireless power until the interferer is moved.

The WP TX unit 588 and/or the device 590 may determine the presence of an interferer by determining that the actual magnetic coupling is noticeably less than the expected magnetic coupling. In addition or as an alternative, the device 590 includes an RF radar circuit 598 that performs an RF radar sweep of the device's 590 proximal area. The RF radar response can be used to determine the type of material of the object 592 (e.g., metal, organic, etc.) and the relative position of the object 592. For these reference points, the device 590 can calculate whether the object 592 will adversely affect the magnetic coupling between the WP TX unit 588 and the device 590.

Figure 35:
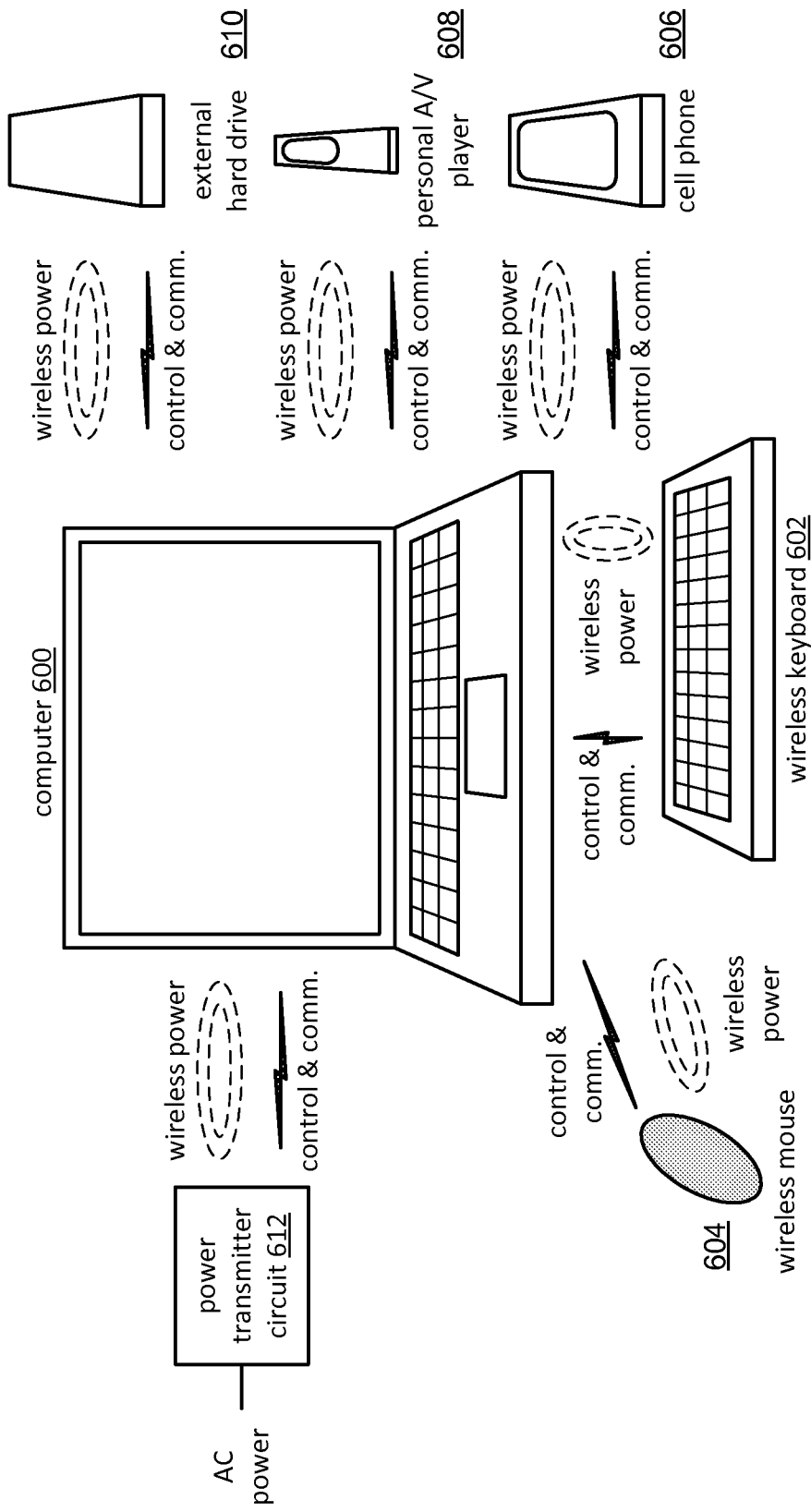
FIG. 35 is a schematic block diagram of an embodiment of a wireless power computer system in accordance with the present invention.

FIG. 35 is a schematic block diagram of an embodiment of a wireless power computer system that includes a computer 600, a wireless keyboard 602, a wireless mouse 604, a cell phone 606, a personal audio/video (A/V) player 608, an external hard drive 610, and potentially other peripheral computer devices (e.g., joy stick, touch pad, track ball, speakers, etc.). The computer 600 may be a laptop, a panel display computer (e.g., a tablet), a conventional computer, etc. and includes a wireless power module.

In this embodiment, the computer 600 is powered wirelessly via the power transmitter circuit 612 (i.e., a WP TX unit) and provides wireless power to the peripheral components (e.g., keyboard 602, mouse 604, cell phone 606, personal AV player 608, hard drive 610, etc.). The peripheral devices 602-610 may be wirelessly powered concurrently from the computer 600 and/or sequentially. Each of the peripheral devices 602-610 wirelessly communicates with the computer 600 using conventional wireless communication protocols (e.g., Bluetooth) and/or uses the WP control channel.

While FIG. 35 illustrates a computer system, the concepts apply to a more generic system. For example, a wireless power system may include a primary device (e.g., computer, television, monitor, cable set-top box, satellite set-top box, home electronic appliance, etc.) and at least one peripheral device (e.g., the peripheral devices of FIG. 35, audio and/or video entertainment components, remote controllers, etc.). The primary device includes a power conversion unit, a functional module, and a transceiver. The peripheral device includes a wireless power receiver, a peripheral unit, and a transceiver.

Within the primary device, the power conversion unit converts a power source into an electromagnetic signal. For example, the power conversion unit may include a power supply and a wireless power transmitter circuit. The power supply converts the power source (e.g., an AC voltage) into an output DC voltage. The wireless power transmitter circuit converts the output DC voltage into the electromagnetic signal. As another example, the power conversion unit includes a wireless power receiver circuit and a power conversion transmit circuit. The wireless power receiver circuit converts the power source (e.g., an input electromagnetic signal) into a supply voltage. The power conversion transmit circuit converts the supply voltage into the electromagnetic signal. In the latter example, the input electromagnetic signal may have a first frequency and the electromagnetic signal may have a second frequency to minimize interference therebetween.

The functional module of the primary device executes a function regarding peripheral information (e.g., communication protocol for the conveyance of the peripheral information, input data from the peripheral device, an input command from the peripheral device, output data for the peripheral device, and/or an output command for the peripheral device). For example, if the functional module is a central processing unit and the peripheral device is a user input device (e.g., touch screen, keypad, mouse, keyboard, etc.), the user input device may generate data and/or a command for execution by the central processing unit. As another example, if the functional module is memory and the peripheral device is a user output device, the memory provides data to the user output device for display (e.g., audible and/or visual).

The transceiver of the primary device communicates information regarding the electromagnetic signal with the transceiver of the peripheral device. The information regarding the electromagnetic signal includes control channel protocol, frequency of the electromagnetic signal, impedance matching parameters, resonant frequency tuning parameters, and/or other electromagnetic properties discussed herein.

The transceiver of the primary device also communicates the peripheral information with the transceiver of the peripheral device. In this regard, the transceivers are used for wireless power control channel communication and for peripheral device functional (e.g., data and/or commands) communication.

In addition to including a power conversion unit, a functional module, and a transceiver, the primary device may further include a battery, a battery charger, and a processing module. The battery charger utilizes the supply voltage to charge the primary battery as discussed with reference to one or more of the figures. The processing module coordinates the charging of the battery, the communicating the information regarding the electromagnetic signal, and the communicating the peripheral information.

The wireless power receiver circuit of the peripheral device converts the electromagnetic signal into a voltage as discussed with reference to one or more of the figures. The peripheral unit of the peripheral device processes the peripheral information. For example, the peripheral unit may generate input data for the primary device, wherein the peripheral information includes the input data. As another example, the peripheral unit may generate an input command for the primary device, wherein the peripheral information includes the input command. As another example, the peripheral unit may perform a function on output data from the primary device, wherein the peripheral information includes the output data. As another example, the peripheral unit may perform a function in accordance with an output command from the primary device, wherein the peripheral information includes the output command.

In addition to including a wireless power receiver, a peripheral unit, and a transceiver, the peripheral device may further include a battery, a battery charger, and a processing module. The battery charger utilizes the supply voltage to charge the peripheral battery. The processing module coordinates the charging of the battery, the communicating information regarding the electromagnetic signal, and the communicating the peripheral information.

The primary device and/or the peripheral device may include an integrated circuit (IC) to support the above-described functions. For example, an IC may include at least a portion of the wireless power receiver circuit (e.g., one or more of the coil, capacitor, and diodes of the rectifying circuit may be off-chip), at least a portion of the battery charger (e.g., one or more of the switching transistors, the output filter capacitor, the inductor may be off-chip), the transceiver, and the processing module.

Figure 36:
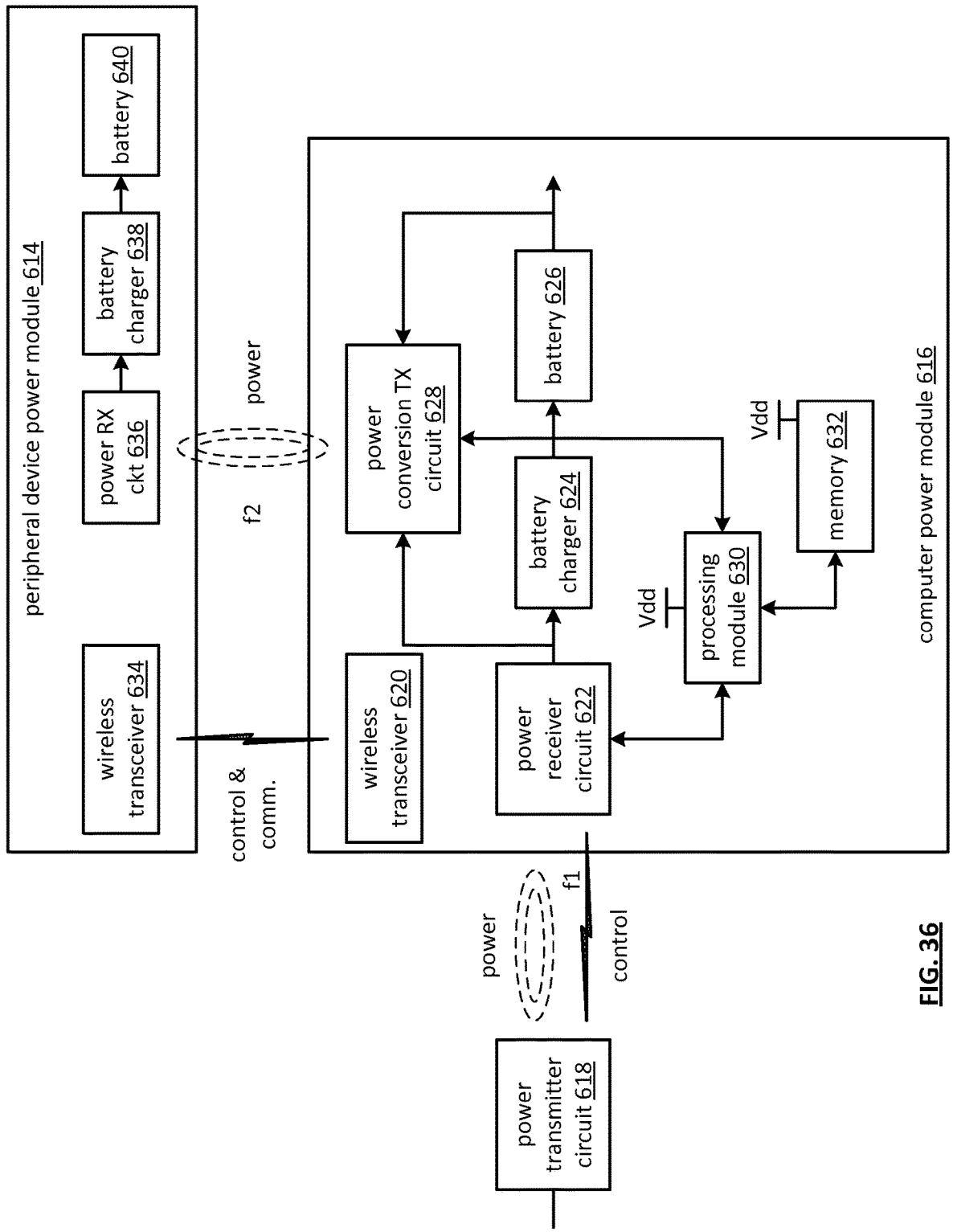
FIG. 36 is a schematic block diagram of an embodiment of power modules within a wireless power computer system in accordance with the present invention.

FIG. 36 is a schematic block diagram of an embodiment of power modules (e.g., computer power module 616 and peripheral device power module 614) within a wireless power computer system. The computer power module 616 includes a wireless transceiver 620, a power receiver circuit 622, a battery charger 624, a battery 626, a power conversion transmit (TX) circuit 628, a processing module 630, and memory 632. The peripheral device power module 614 includes a wireless transceiver 634 a power receive circuit (RX ckt) 636, a battery charger 638, and a battery 640.

In an example of operation, the power transmit circuit 618 generates a magnetic field that is received by the power receiver circuit 622 of the computer power module 616 to facilitate a wireless power transference. The power receiver circuit 622 generates a DC rail voltage in accordance with control signals provided by the processing module 630. The battery charger 624 converts the DC rail voltage into a battery charge voltage, which is supplied to the battery 626. The power conversion TX circuit 628 generates a magnetic field that is magnetically coupled to the power RX circuit 636 of the peripheral device power module 614. The power conversion TX circuit 628 may be sourced by the DC rail voltage when the computer power module 616 is proximal to the power transmitter circuit 618 or the battery 626 when the computer power module 616 is not proximal to the power transmitter circuit 618.

The power RX circuit of the peripheral device power module 636 generates a DC rail voltage from the magnetic field of the power conversion TX circuit 628. The battery charger 624 converts the DC rail voltage into a battery charger voltage, which is provided to the battery 626. The computer power module 616 communicates with the peripheral device power module 614 via the wireless transceivers 620, 634 (e.g., RF, MMW, and/or NFC) regarding wireless power matters (e.g., frequency selection, operating frequency, impedance matching settings, power levels, etc.). In addition, the wireless transceivers 620, 634 may be used to convey data between the peripheral device and the computer. For example, if the peripheral device is the wireless keyboard, the keyboard signaling may be conveyed to the computer via the wireless transceivers. Note that with multiple peripheral devices, each including a wireless transceiver, a local area network is created, which requires a network level coordinate of communications therein.

A power module (e.g., computer power module 616 and peripheral device power module 614) may include an integrated circuit (IC) to support its function. For example, the IC may include at least a portion of a wireless power receiver circuit (e.g., one or more of the coil, capacitor, and diodes of the rectifying circuit may be off-chip), at least a portion of a wireless power transmit circuit (e.g., one or more of the coil, capacitor, and the switching transistors of the DC-to-AC circuit may be off-chip), and the transceiver. The wireless power receiver circuit is operable to convert an electromagnetic signal into a voltage, wherein a wireless power transmitter unit generates the electromagnetic signal. The wireless power transmit circuit is operable to convert the voltage into a second electromagnetic signal. The transceiver communicates first information regarding the first electromagnetic signal, communicates second information regarding a second electromagnetic signal, and communicates peripheral information regarding execution of a function.

Figure 37:
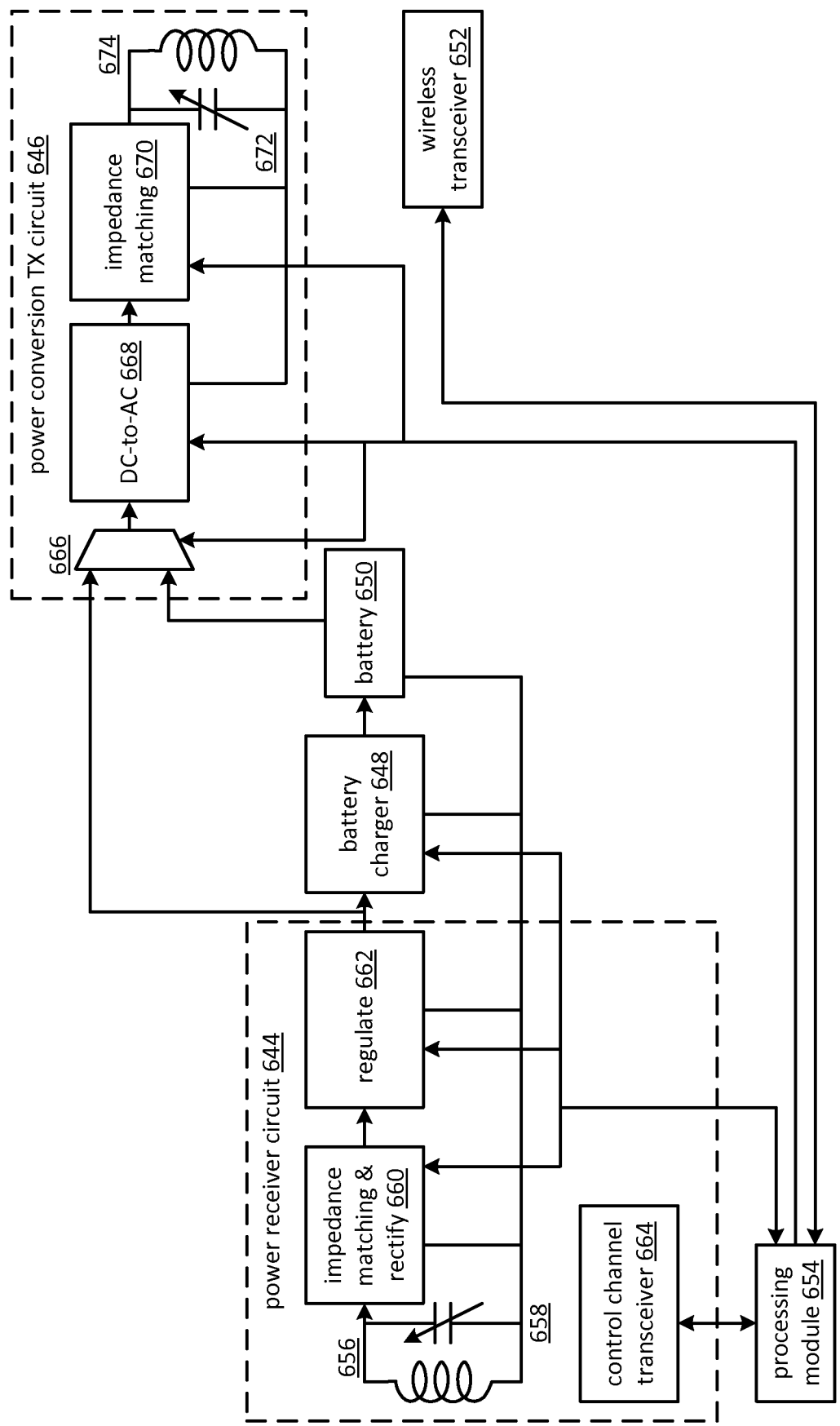
FIG. 37 is a schematic block diagram of an embodiment of a computer power module in accordance with the present invention.

FIG. 37 is a schematic block diagram of an embodiment of a computer power module 642 that includes the power receiver circuit 644, the battery charger 648, the battery 650, the power conversion TX circuit 646, the wireless transceiver 652, and the processing module 654. The power receiver circuit 644 includes the RX coil 656, an adjustable capacitor 658, the impedance matching & rectify circuit 660, the regulation circuit 662, and the control channel transceiver 664. The power conversion TX circuit 646 includes a multiplexer 666, a DC-to-AC converter 668, an impedance matching circuit 670, an adjustable capacitor 672, and a coil 674.

In an example of operation, the RX coil 656 of the power receiver circuit 644 generates an AC voltage from the magnetic field it receives from the TX coil of the WP TX unit. The impedance matching and rectify circuit 660 converts the AC voltage into a DC rail voltage that is regulated via the regulation circuit 662. The battery charger 648 uses the DC rail voltage to charge the battery 650.

The power conversion TX circuit 646 is powered by the DC rail voltage when the computer is receiving wireless power from the WP TX unit 646 and is powered by the battery 650 when the computer is in a battery operated mode (assuming the battery 650 has sufficient energy to charge peripheral devices). When in the WP mode, the DC-to-AC converter 668 converts the DC rail voltage into an AC voltage that is provided to the coil 674 via the impedance matching circuit 670. The coil 674 generates a magnetic field that is received by the RX coil of a peripheral device power module. In an embodiment, the AC voltage of the RX coil 656 of the power receiver circuit 644 of the computer power module 642 may have the same or a different frequency than the AC voltage of the TX coil 674 of the power conversion TX module 646.

When the computer is in the battery operated mode, the power conversion TX circuit 646 generates the magnetic field as described above if the battery 650 has sufficient power (e.g., a desired battery life level) to charge one or more peripheral devices. If the battery 650 does not have sufficient power, the power conversion TX circuit 646 is disabled.

Figure 38:
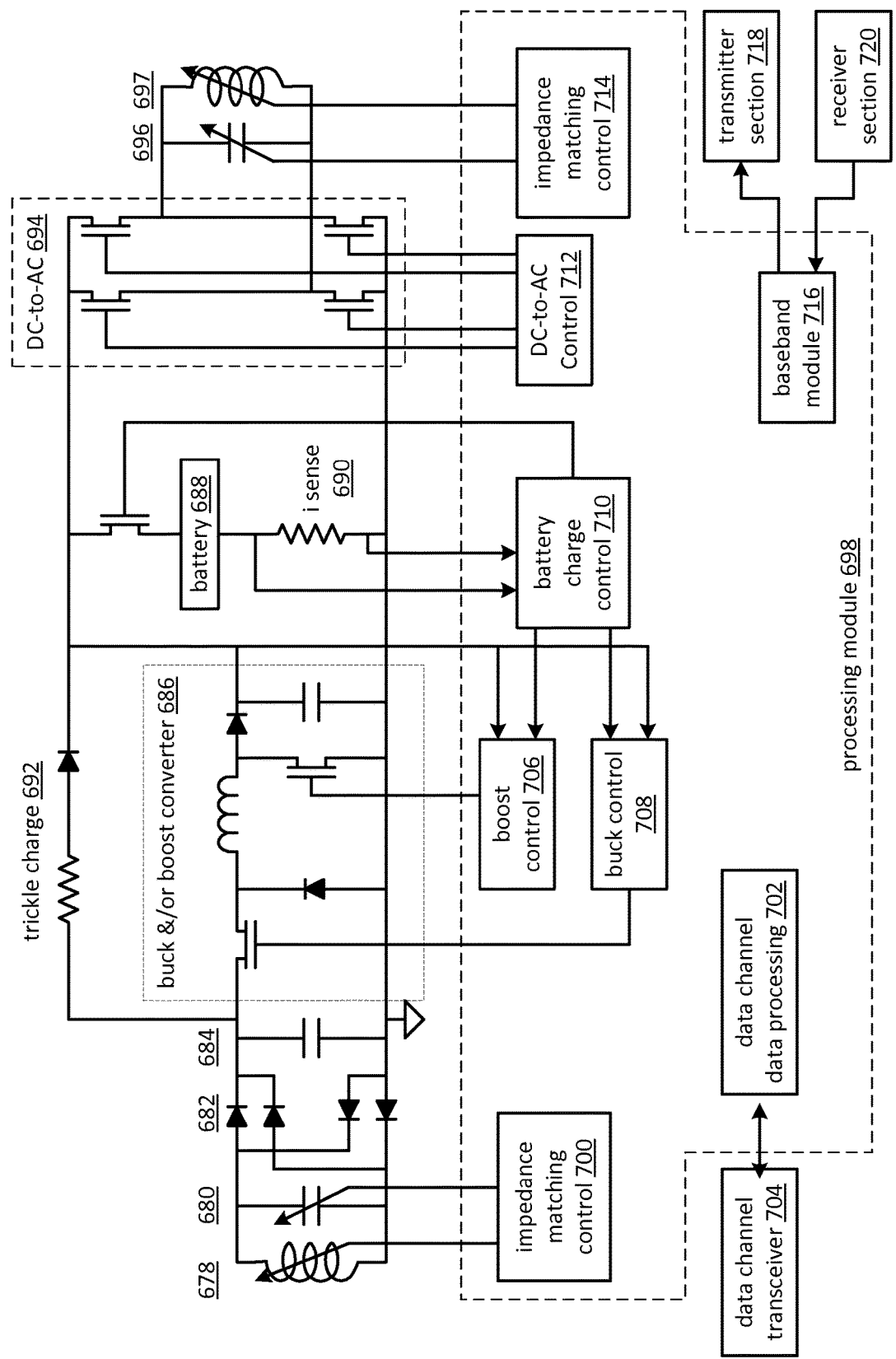
FIG. 38 is a schematic block diagram of another embodiment of a computer power module in accordance with the present invention.

FIG. 38 is a schematic block diagram of another embodiment of a computer power module 676 that includes the RX coil 678, an adjustable capacitor 680, rectifying diodes 682, a storage capacitor 684, a buck and/or boost converter 686, the battery 688, a battery current sense 690, a trickle charge circuit 692, the DC-to-AC converter 694, another adjustable capacitor 696, and the processing module 698. The processing module 698 is configured to implement an RX impedance matching control module 700, the control channel processing module 702, a boost control module 706, a buck control module 708, a battery charger control module 710, a DC-to-AC control module 712, and a TX impedance matching control module 714. In addition, the processing module 698 may implement the baseband processing 716 for the wireless transceiver. Note that the processing module 698 and one or more other components may be implemented on one or more integrated circuits.

In an example of operation of the back half of the circuit, the DC-to-AC module 694 receives the DC rail voltage produced by the buck and/or boost converter 686. The DC-to-AC module 694 includes a full bridge inverter topology to excite the coil 697. The DC-to-AC control module 712 generates the switching signals to drive the DC-to-AC module 694 at a desired frequency. The impedance matching control circuit 714 adjusts the impedance of the capacitor 696 and/or coil 697 to a desired resonance and/or quality factor. As an example, the impedance matching control circuit 714 may tune the capacitor 696 and coil 697 to resonate at the switching frequency of the DC-to-AC converter 694, to be an under-damped circuit, or an over-damped circuit. In an alternate embodiment, the DC-to-AC converter 694 may include a half bridge inverter topology. Note that the front half of the circuit operates in a similar manner as described with reference to FIG. 10.

Figure 39:
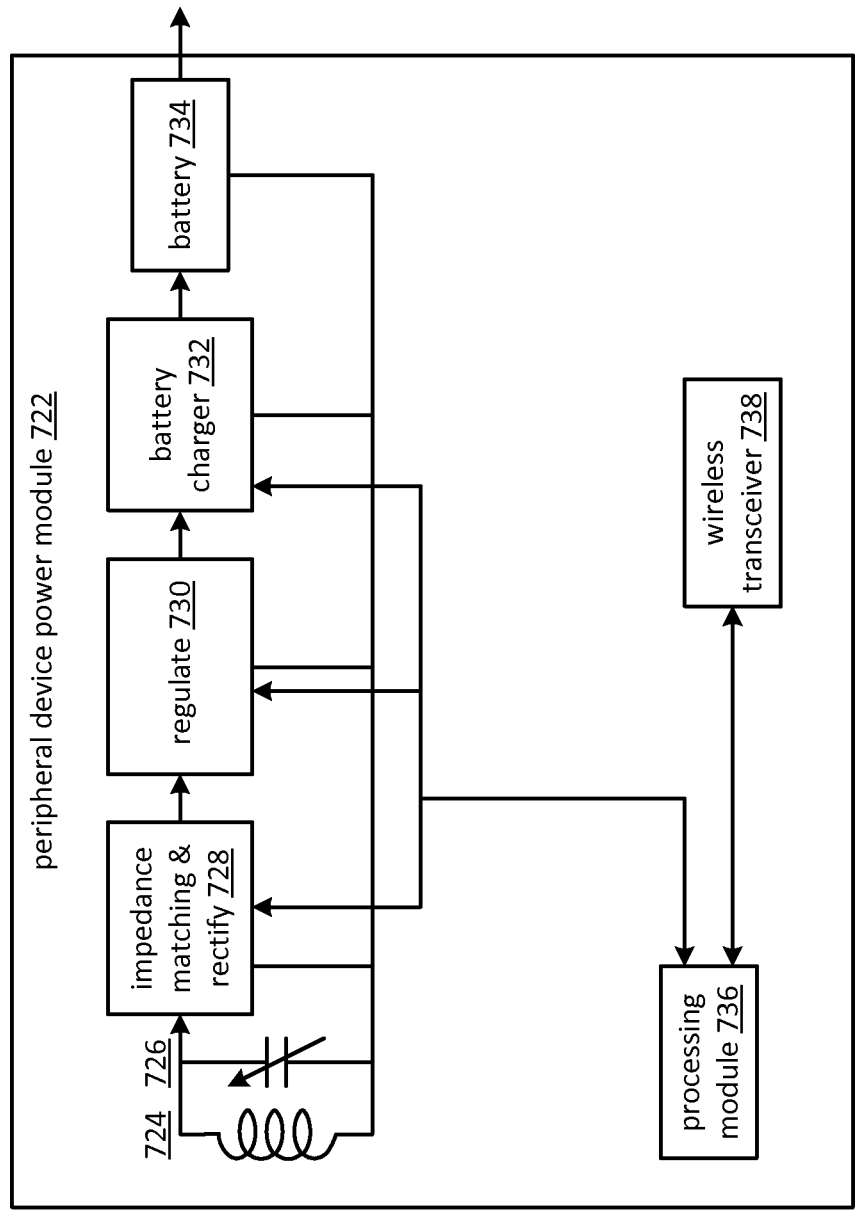
FIG. 39 is a schematic block diagram of an embodiment of a peripheral device power module in accordance with the present invention.

FIG. 39 is a schematic block diagram of an embodiment of a peripheral device power module 722 that includes the RX coil 724, an adjustable capacitor 726, the impedance matching and rectifying circuit 728, the regulation circuit 730, the battery charger 732, the battery 734, the processing module 736, and the wireless transceiver 738.

In an example of operation, the RX coil 724 generates an AC voltage from the magnetic field it receives from the TX coil of the computer power module. The impedance matching and rectify circuit 728 converts the AC voltage into a DC rail voltage that is regulated via the regulation circuit 730. The battery charger 732 uses the DC rail voltage to charge the battery 734.

Figure 40:
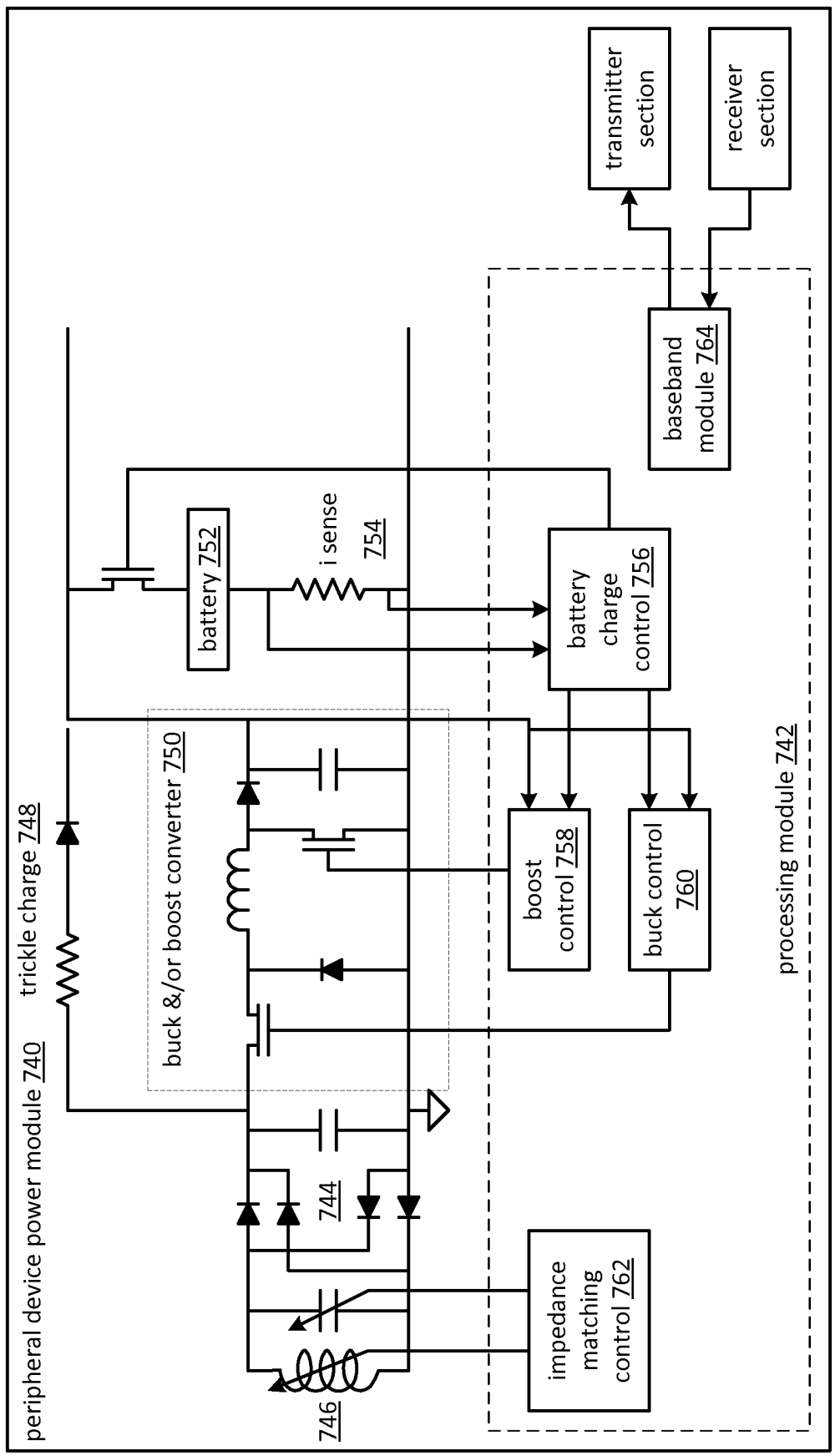
FIG. 40 is a schematic block diagram of another embodiment of a peripheral device power module in accordance with the present invention.

FIG. 40 is a schematic block diagram of another embodiment of a peripheral device power module 740 that includes the processing module 742, the rectify and impedance matching circuit 744 (e.g., capacitors and diodes), the RX coil 746, a buck &/or boost converter 750, a trickle charge circuit 748, a battery 752, and a battery current sensor 754. The processing module 742 implements a battery charger controller 756, a boost controller 758, a buck controller 760, an impedance matching circuit 762, and an RF/MMW and/or NFC baseband processing module 764. Note that the processing module 742 may be fabricated on a single integrated circuit or on a multiple integrated circuit with one or more of the components of the converter 750, the rectifier circuit 744, the trickle charge circuit 748, and/or the battery current sense 754.

In an example of operation, the RX coil 746 (which may include one or more adjustable inductors) receives a magnetic field from the computer power module and creates an AC voltage therefrom. The adjustable capacitor 744 is tuned (alone or in conjunction with the RX coil 746) to a desired resonance, impedance, and/or quality factor to facilitate the creation of the AC voltage. The full bridge rectifier 744 (e.g., the diodes) rectifies the AC voltage to produce a rectified voltage that is filtered by the capacitor 744 to produce a DC rail voltage (e.g., 3-20 volts).

The buck and/or boost converter 750 is enabled in a buck converter mode when the DC voltage rail is to be stepped down to produce battery charge voltage (and the supply voltage Vdd for the device) and is enabled in boost converter mode when the DC rail voltage is to be stepped up to produce the battery charge voltage (and the supply voltage Vdd). Note that when the buck and/or boost converter 750 is in the boost mode, the buck transistor is enabled. Further note that the buck and/or boost converter 750 may include multiple inductors, transistors, diodes, and capacitors to produce multiple supply voltages.

When the battery 752 is charging, the battery charge control module 756 monitors the battery 752 current and voltage to insure charging is in accordance with the charging requirements of the battery 752. When the battery 752 is charged, the battery 752 is disconnected from the converter 750 (which may be disable or enabled to provide Vdd) and the battery 752 may be trickle charged 748. Note that when the WP is lost, the battery 752 is coupled to provide the power for the device.

Figure 41:
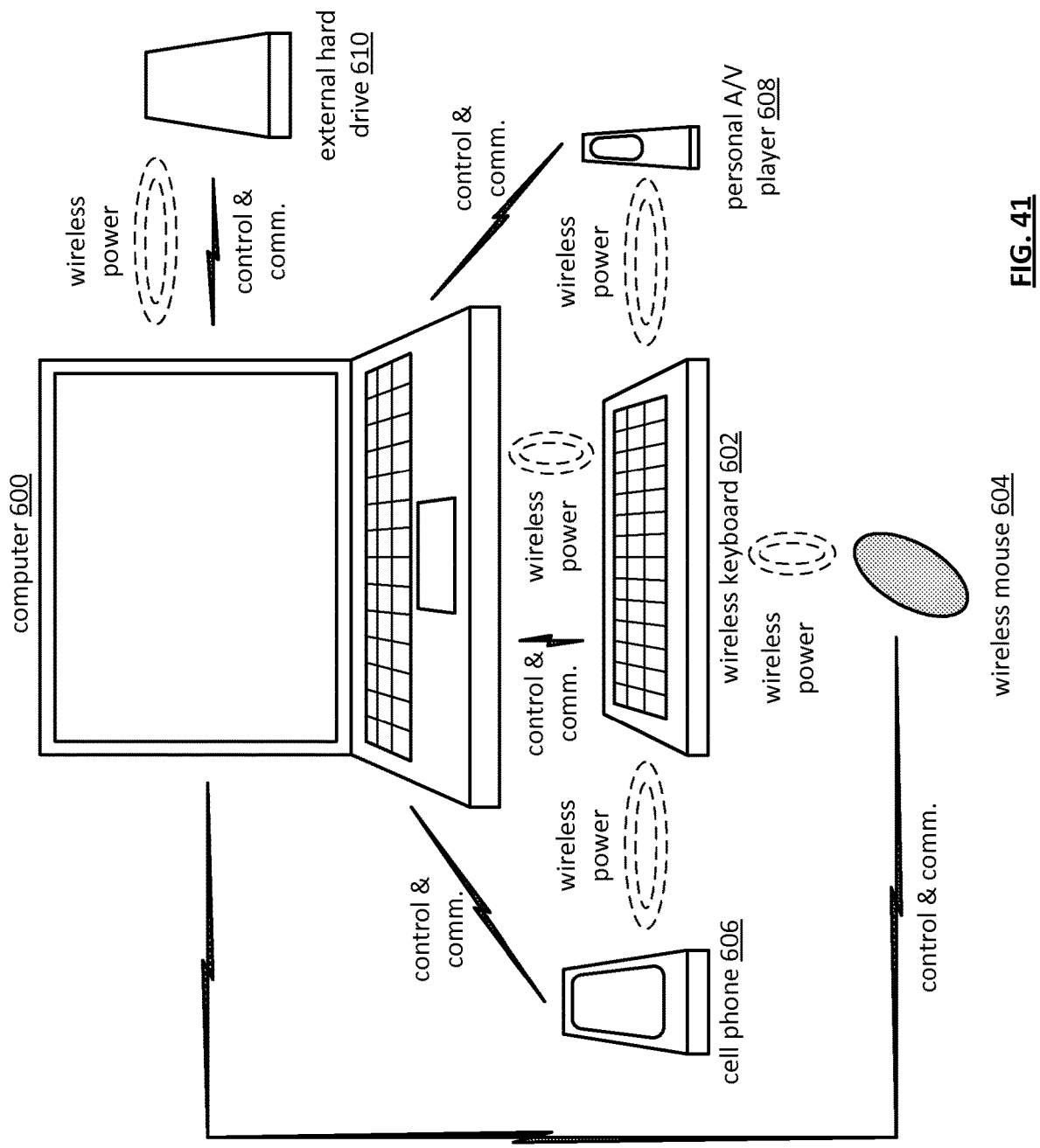
FIG. 41 is a schematic block diagram of another embodiment of a wireless power computer system in accordance with the present invention.

FIG. 41 is a schematic block diagram of another embodiment of a wireless power computer system that includes a computer 600, a wireless keyboard 602, a wireless mouse 604, a cell phone 606, a personal audio/video (A/V) player 608, an external hard drive 610, and potentially other peripheral computer devices (e.g., joy stick, touch pad, track ball, speakers, etc.). The computer 600 may be a laptop, a panel display computer, a conventional computer, etc. and includes a wireless power module.

In this embodiment, the computer 600 is powered wirelesly via the power transmitter circuit (i.e., a WP TX unit) and provides wireless power to some of the peripheral components 602-610 (e.g., keyboard, mouse, cell phone, personal AV player, hard drive, etc.). The wireless keyboard 602 provides wireless power to one or more of the remaining peripheral devices 604-610. The peripheral devices 604-610 may be wirelessly powered concurrently from the computer 600 and/or wireless keyboard 602 and/or sequentially. The peripheral devices 602-610 wirelessly communicates with the computer 600 using conventional wireless communication protocols (e.g., Bluetooth) and/or uses the WP control channel.

While FIG. 41 illustrates a computer system, the concepts apply to a more generic system. For example, a wireless power system includes a primary device (e.g., computer, television, monitor, cable set-top box, satellite set-top box, home electronic appliance, etc.), a first peripheral device (e.g., the peripheral devices of FIG. 41, audio and/or video entertainment components, remote controllers, etc.), and a second peripheral device (e.g., the peripheral devices of FIG. 41, audio and/or video entertainment components, remote controllers, etc.). The primary device includes a power conversion unit, a functional module, and a transceiver. The first peripheral device includes a wireless power receiver, a power conversion transmit circuit, a peripheral unit, and a transceiver. The second peripheral device includes a wireless power receiver, a peripheral unit, and a transceiver.

Within the primary device, the power conversion unit converts a power source into a first electromagnetic signal. For example, the power conversion unit may include a power supply and a wireless power transmitter circuit. The power supply converts the power source (e.g., an AC voltage) into an output DC voltage. The wireless power transmitter circuit converts the output DC voltage into the first electromagnetic signal. As another example, the power conversion unit includes a wireless power receiver circuit and a power conversion transmit circuit. The wireless power receiver circuit converts the power source (e.g., an input electromagnetic signal) into a supply voltage. The power conversion transmit circuit converts the supply voltage into the first electromagnetic signal.

The functional module of the primary device executes a function regarding first and/or second peripheral information (e.g., communication protocol for the conveyance of the peripheral information, input data from the first and/or second peripheral device, an input command from the first and/or second peripheral device, output data for the first and/or second peripheral device, and/or an output command for the first and/or second peripheral device). For example, if the functional module is a central processing unit and the first peripheral device is a user input device (e.g., touch screen, keyboard, etc.), the user input device may generate data and/or a command for execution by the central processing unit. As another example, if the functional module is memory and the second peripheral device is a user output device, the memory provides data to the user output device for display (e.g., audible and/or visual).

The wireless power receiver circuit of the first peripheral device converts the first electromagnetic signal into a first voltage as discussed with reference to one or more of the figures. The power conversion transmit circuit of the first peripheral device converts the voltage into the second electromagnetic signal. The wireless power receiver circuit of the second peripheral device converts the second electromagnetic signal into a second voltage, which it uses as a power source and/or to charge its battery. Note that the input electromagnetic signal may have a first frequency, the first electromagnetic signal may have a second frequency, and the second electromagnetic signal may have a third frequency.

The transceiver of the primary device communicates information regarding the first and second electromagnetic signal with the transceiver of the first and second peripheral devices, respectively. The information regarding the electromagnetic signal includes control channel protocol, frequency of the electromagnetic signal, impedance matching parameters, resonant frequency tuning parameters, and/or other electromagnetic properties discussed herein.

The transceiver of the primary device also communicates the first and second peripheral information with the transceiver of the first and second peripheral devices, respectively. In this regard, the transceivers are used for wireless power control channel communication and for peripheral device functional (e.g., data and/or commands) communication.

Figure 42:
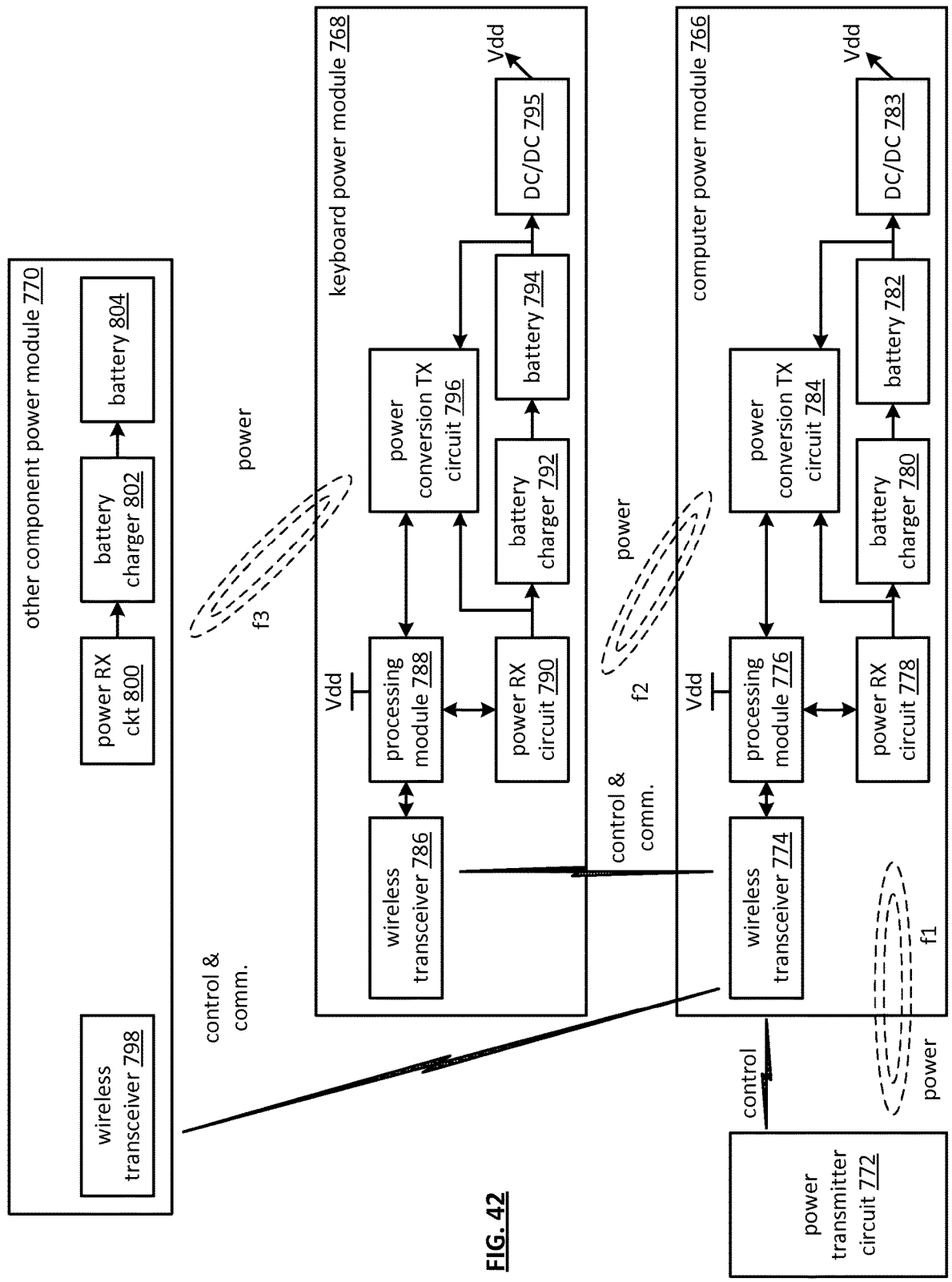
FIG. 42 is a schematic block diagram of another embodiment of power modules within a wireless power computer system in accordance with the present invention.

FIG. 42 is a schematic block diagram of another embodiment of power modules within a wireless power computer system (e.g., computer power module 766, the keyboard power module 768, and peripheral device power modules 770) within a wireless power computer system. Both the computer power module 766 and the keyboard power module 768 include a wireless transceiver 774, 786, a power receive circuit 778, 790, a battery charger 780, 792, a battery 782, 794, a power conversion transmit (TX) circuit 784, 796, a processing module 776, 788, and memory. The peripheral device power module 770 includes a wireless transceiver 798, a power receive circuit (RX ckt) 800, a battery charger 802, and a battery 804.

In an example of operation, the power transmit circuit 772 generates a magnetic field that is received by the power receiver circuit 778 of the computer power module 766 to facilitate a wireless power transference. The power receiver circuit 778 generates a DC rail voltage in accordance with control signals provided by the processing module 776. The battery charger 780 converts the DC rail voltage into a battery charge voltage, which is supplied to the battery 782. The power conversion TX circuit 784 generates a magnetic field that is magnetically coupled to the power RX circuit 790 of the keyboard power module 768. The power conversion TX circuit 784 may be sourced by the DC rail voltage 783 when the computer power module 766 is proximal to the power transmitter circuit 772 or the battery 782 when the computer power module 766 is not proximal to the power transmitter circuit 772.

The power receiver circuit 790 of the keyboard power module 768 receives the magnetic field generated by the power conversion TX circuit 784 of the computer power module 766. The power receiver circuit 790 generates a DC rail voltage in accordance with control signals provided by the processing module 788. The battery charger 792 converts the DC rail voltage into a battery charge voltage, which is supplied to the battery 794. The power conversion TX circuit 796 generates a magnetic field that is magnetically coupled to the power RX circuit 800 of the peripheral device power module 770. The power conversion TX circuit 796 may be sourced by the DC rail voltage 795 when the keyboard power module 768 is proximal to the computer or the battery 794 when the keyboard power module 768 is not proximal to the computer.

The power RX circuit 800 of the peripheral device power module 770 generates a DC rail voltage from the magnetic field of the power conversion TX circuit 796 of the keyboard power module 768. The battery charger 802 converts the DC rail voltage into a battery charger voltage, which is provided to the battery 804.

The computer power module 766 communicates with the peripheral device power module 770 and the keyboard power module 768 via the wireless transceivers 774, 786, 798 (e.g., RF, MMW, and/or NFC) regarding wireless power matters (e.g., frequency selection, operating frequency, impedance matching settings, power levels, etc.). In addition, the wireless transceivers 774, 786, 798 may be used to convey data between the peripheral device and the computer. For example, if the peripheral device is the wireless mouse, the mouse signaling may be conveyed to the computer via the wireless transceivers 774, 786, 798. Note that with multiple peripheral devices, each including a wireless transceiver, a local area network is created, which requires network level coordinate of communications therein.

Figure 43:
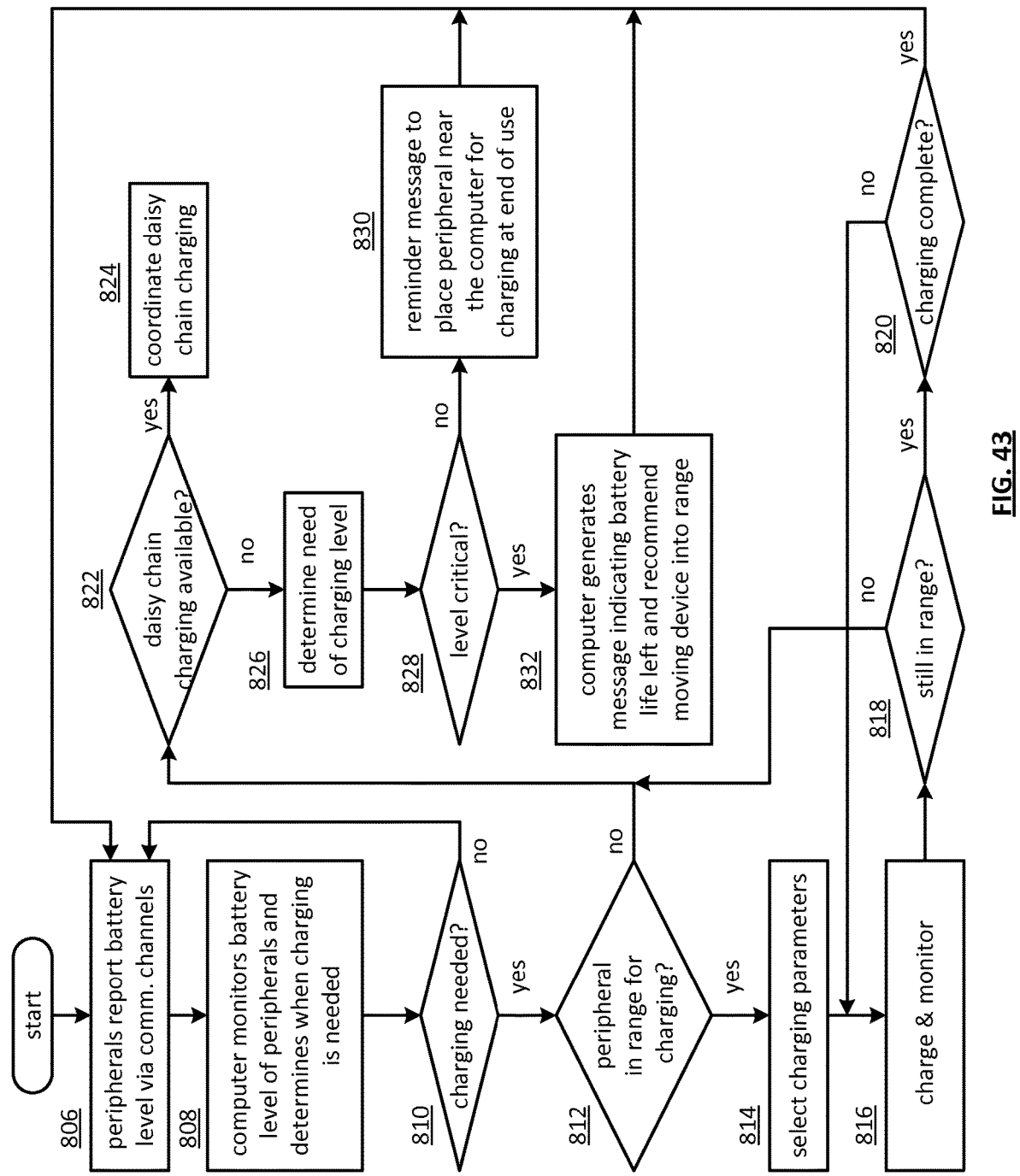
FIG. 43 is a logic diagram of an embodiment of a method for managing a wireless power computer system in accordance with the present invention.

FIG. 43 is a logic diagram of an embodiment of a method for managing a wireless power computer system that begins with the computer power module receiving battery level data from the peripheral devices via one or more communication channel 806. The battery level data includes one or more of full battery capacity, charging history (e.g., times, durations, charge voltage, charge current, trickle charge reached, etc.), current battery life, current loading, loading history, etc. The method continues with the computer power module monitors the battery levels of the peripheral devices and determines when a peripheral device's battery needs charging 808. Such a determination may be based on one or more of the following—estimated remaining battery life, whether the battery is at full charge, the type of battery, the charging requirements of the battery, charging being currently supported by the computer power module, etc. The method branches depending on whether a peripheral device's battery needs charging 810. If not, the method repeats from the beginning.

If charging is needed, the method continues with the computer power module determining whether the peripheral device is in range for charging 812. Note that if the computer system uses an RF and/or MMW communication protocol, the range of communication can be up to 10 meters while the range for charging will typically be less than a meter. If the peripheral device is in charging range, the method continues with the computer power module selecting charging parameters (e.g., coil selection, power levels, frequency, impedance matching settings, etc.) for the peripheral device 814.

The method continues with the computer power module initiating charging and monitoring the charging 816. The method continues with the computer power monitor determining whether the peripheral device is still in range 818. If yes, the method continues with the computer power module determining whether charging is complete 820. If yes, the method repeats.

If the peripheral device is out of charging range 812, the method continues with the computer power module determining whether the peripheral device's battery can be charged via daisy chain charging 822 (e.g., via the keyboard power module as shown in FIGS. 41 & 42). If yes, the method continues with the computer power module coordinating the daisy chain charging 824, which will be described in greater detail with reference to FIG. 44.

If daisy chain charging is not available, the method continues with the computer power module determining the level of need for charging 826 (e.g., how much battery life is left, the loading requirements, the type of peripheral device, the type of battery, etc.). The method continues with the computer power module determining whether the need for charging is at a critical point 828. For example, the battery cannot support the current loading (e.g., current power consumption) for much longer (e.g., less than an hour, 10 minutes, 5 minutes). When the charging need is not critical, the method continues with the computer power module generating a reminder message and displaying on the computer and/or the peripheral device indicating that the peripheral device needs charging and should be placed near the computer for charging 830. This message may be sent periodically during computer and/or peripheral device use or at the end of use (e.g., end of the day, detecting shutting down applications, placing the device in a sleep mode, etc.).

When the charging need is critical, the method continues with the computer power module generating a message and displaying on the computer and/or the peripheral device indicating that the peripheral device needs charging very soon and should be placed near the computer for charging 832. This message may also indicate the remaining battery life and other warnings if the battery was fully drained.

Figure 44:
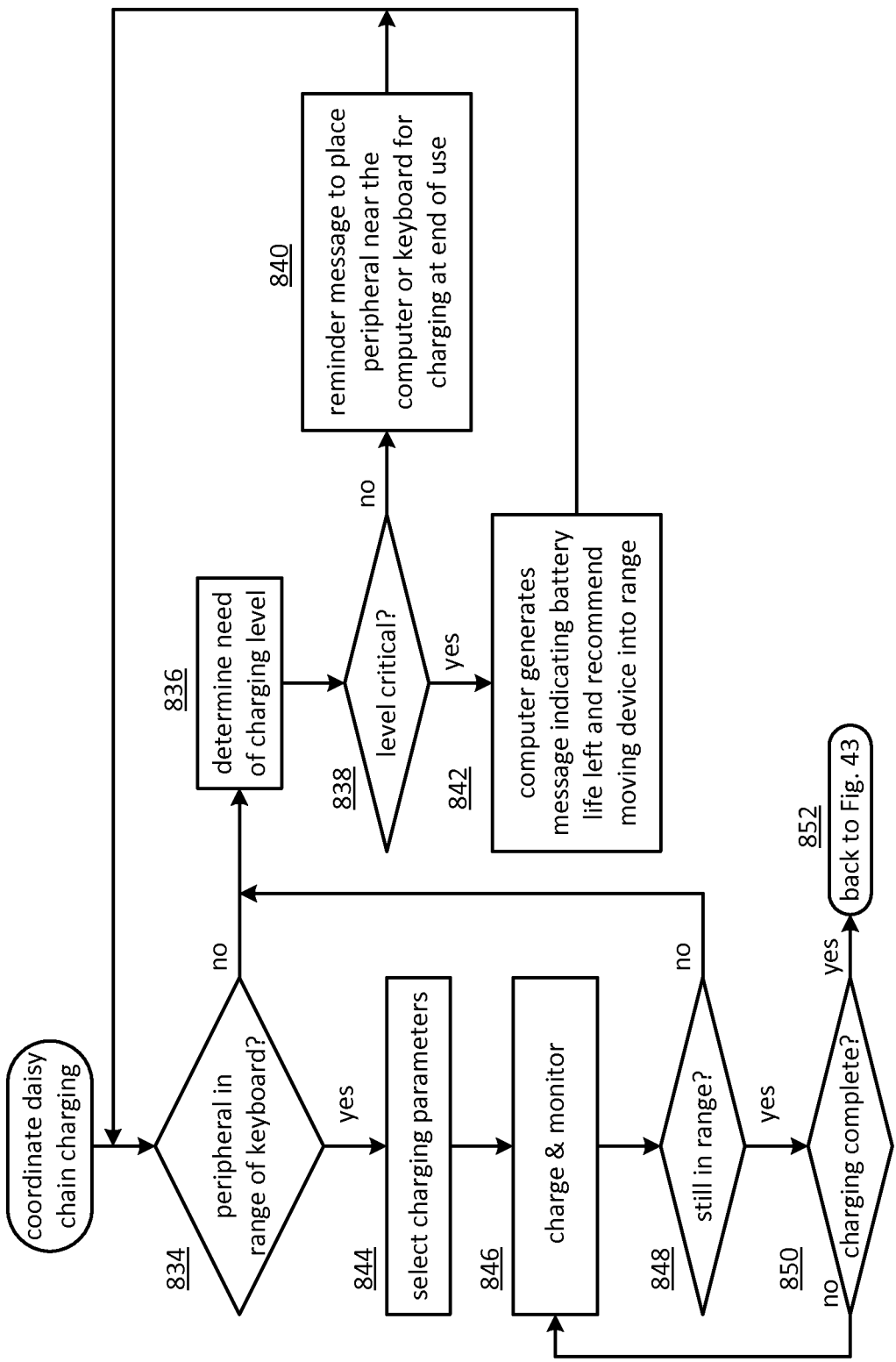
FIG. 44 is a logic diagram of another embodiment of a method for managing a wireless power computer system in accordance with the present invention.

FIG. 44 is a logic diagram of another embodiment of a method for managing daisy chain charging in a wireless power computer system. The method begins with the computer power module determining whether the peripheral device is in charging range of the keyboard 834. If not, the method continues with the computer power module determining the level of need for charging 836. The method continues with the computer power module determining whether the need for charging is at a critical point 838. When the charging need is not critical, the method continues with the computer power module generating a reminder message and displaying on the computer and/or the peripheral device indicating that the peripheral device needs charging and should be placed near the computer for charging 840. When the charging need is critical, the method continues with the computer power module generating a message and displaying on the computer and/or the peripheral device indicating that the peripheral device needs charging very soon and should be placed near the computer for charging 842. This message may also indicate the remaining battery life and other warnings if the battery was fully drained.

When the peripheral device is in charging range of the keyboard 834, the method continues with the computer power module selecting charging parameters 844. Alternatively, this may be done by the keyboard power module and communicated to the computer power module. The method continues with the computer power module initiating charging and monitoring the charging 846. The method continues with the computer power monitor determining whether the peripheral device is still in range of the keyboard 848. If yes, the method continues with the computer power module determining whether charging is complete 850. If yes, the method returns to the method of FIG. 43 852. If the peripheral device is out of charging range of the keyboard 848, the method continues at the determine need of charging step 836.

Figure 45:
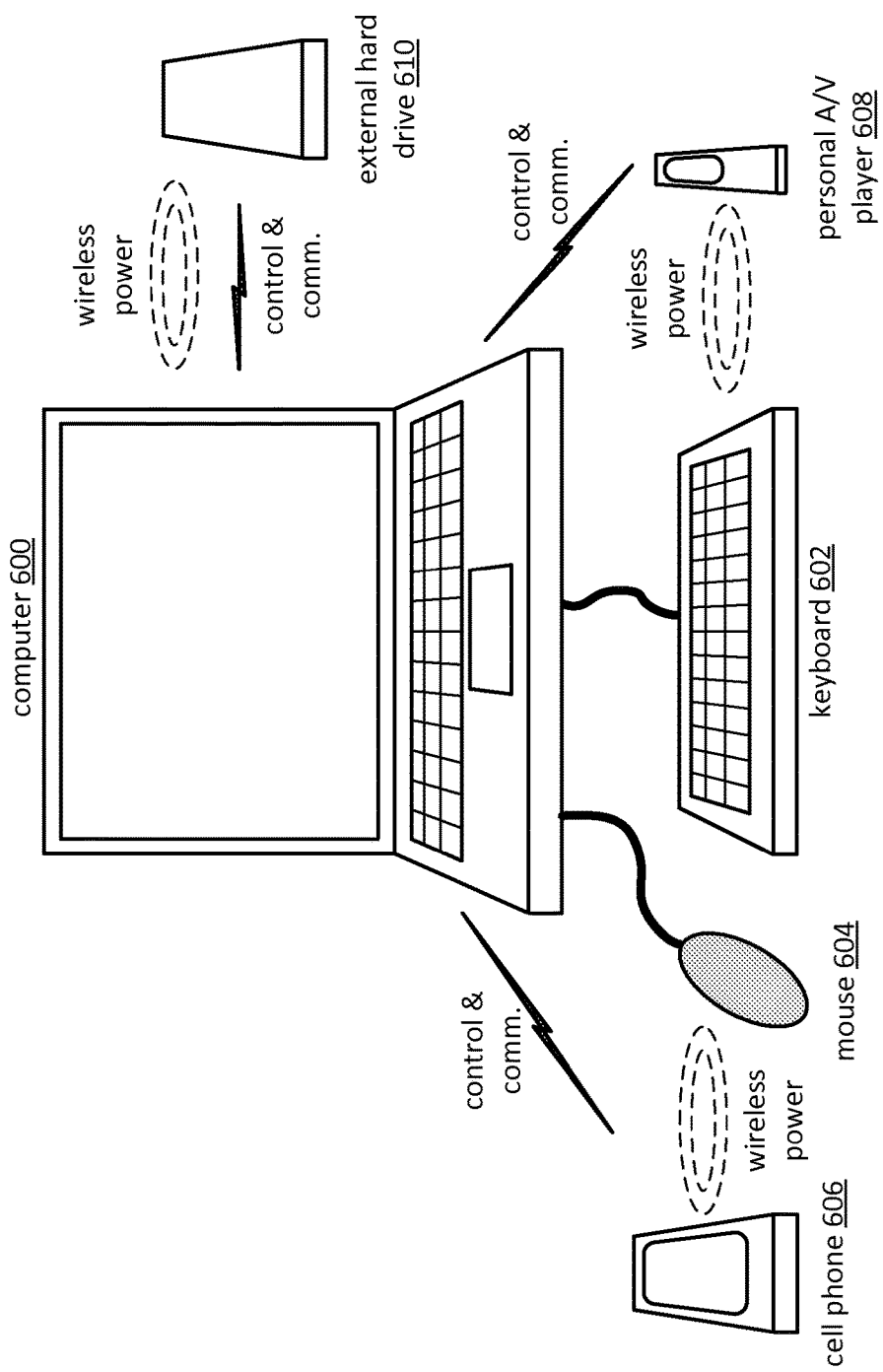
FIG. 45 is a schematic block diagram of another embodiment of a wireless power computer system in accordance with the present invention.

FIG. 45 is a schematic block diagram of another embodiment of a wireless power computer system that includes a computer 600, a keyboard 602, a mouse 604, a cell phone 606, a personal audio/video (A/V) player 608, an external hard drive 610, and potentially other peripheral computer devices (e.g., joy stick, touch pad, track ball, speakers, etc.). The computer 600 may be a laptop, a panel display computer, a conventional computer, etc. and includes a wireless power module.

In this embodiment, the computer 600 is powered wirelesly via the power transmitter circuit (i.e., a WP TX unit) and provides wireless power to the peripheral components 606-610 (e.g., cell phone, personal AV player, hard drive, etc.) and provides power and communication with the mouse 604 and keyboard 602 through a wired connection. The peripheral devices 606-610 may be wirelessly powered concurrently from the computer 600 and/or sequentially. The peripheral devices 606-610 wirelessly communicate with the computer 600 using conventional wireless communication protocols (e.g., Bluetooth) and/or use the WP control channel.

In addition, the mouse 604 and keyboard 602 may each include a WP TX unit to wirelessly charge one or more of the peripheral devices 606-610. As such, some of the peripheral devices 606-610 may be wirelessly charged by the computer 600 and others by the mouse 604 and/or keyboard 602.

Figure 46:
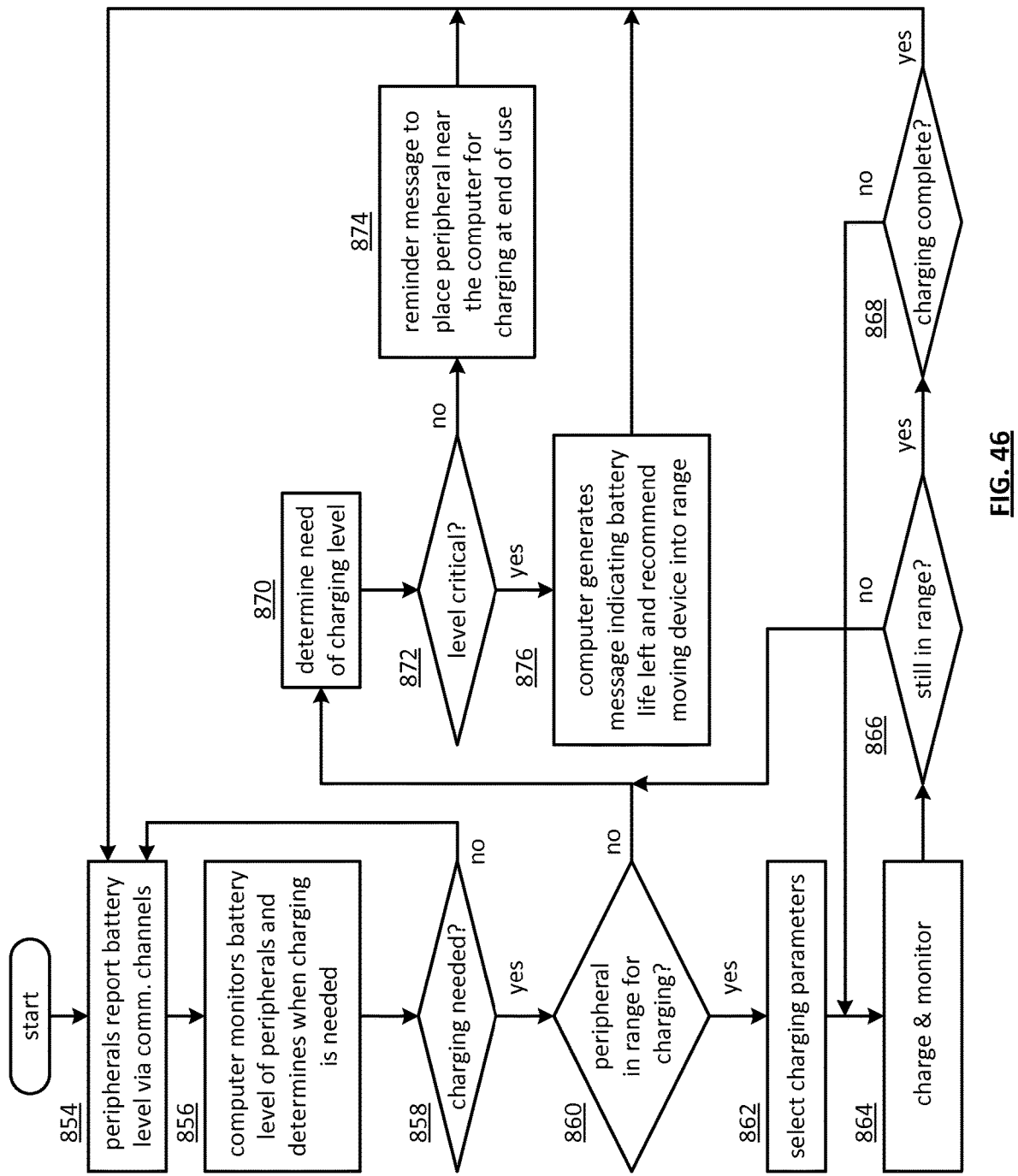
FIG. 46 is a logic diagram of another embodiment of a method for managing a wireless power computer system in accordance with the present invention.

FIG. 46 is a logic diagram of another embodiment of a method for managing a wireless power computer system that begins with the computer power module receiving battery level data from the peripheral devices via one or more communication channel 854. The battery level data includes one or more of full battery capacity, charging history (e.g., times, durations, charge voltage, charge current, trickle charge reached, etc.), current battery life, current loading, loading history, etc. The method continues with the computer power module monitoring the battery levels of the peripheral devices and determining when a peripheral device's battery needs charging 856. Such a determination may be based on one or more of estimated remaining battery life, whether the battery is at full charge, the type of battery, the charging requirements of the battery, charging being currently supported by the computer power module, etc. The method branches depending on whether a peripheral device's battery needs charging 858. If not, the method repeats from the beginning.

If charging is needed, the method continues with the computer power module determining whether the peripheral device is in range of the computer, of the mouse, or of the keyboard for charging 860. If the peripheral device is in charging range of the computer, the method continues with the computer power module selecting charging parameters 862 (e.g., coil selection, power levels, frequency, impedance matching settings, etc.) for the peripheral device. If the peripheral device is in charging range of the mouse, the method continues with the computer power module selecting charging parameters for the mouse and the peripheral device 862. If the peripheral device is in charging range of the keyboard, the method continues with the computer power module selecting charging parameters for the keyboard and the peripheral device 862.

The method continues with the computer power module initiating charging and monitoring the charging 864. Note that the mouse or keyboard may perform the monitoring and report the monitoring to the computer. The method continues with the computer power monitor determining whether the peripheral device is still in range 866. If yes, the method continues with the computer power module determining whether charging is complete 868. If yes, the method repeats.

If the peripheral device is out of charging range of the computer 860, the method continues with the computer power module determining whether the peripheral device is in charging range of the mouse or the keyboard. If yes, the computer power monitor hand-offs the wireless charging to the mouse or keyboard. Similarly, if the peripheral device is out of charging range of the mouse or keyboard, the computer power module determines whether the wireless charging can be handed off to the computer or the other of the mouse or keyboard.

When the hand off cannot be done, the method continues with the compute power module determining the level of need for charging 870. The method continues with the computer power module determining whether the need for charging is at a critical point 872. When the charging need is not critical, the method continues with the computer power module generating a reminder message and displaying on the computer and/or the peripheral device indicating that the peripheral device needs charging and should be placed near the computer for charging 874. When the charging need is critical, the method continues with the computer power module generating a message and displaying on the computer and/or the peripheral device indicating that the peripheral device needs charging very soon and should be placed near the computer for charging 876. This message may also indicate the remaining battery life and other warnings if the battery was fully drained.

Figure 47:
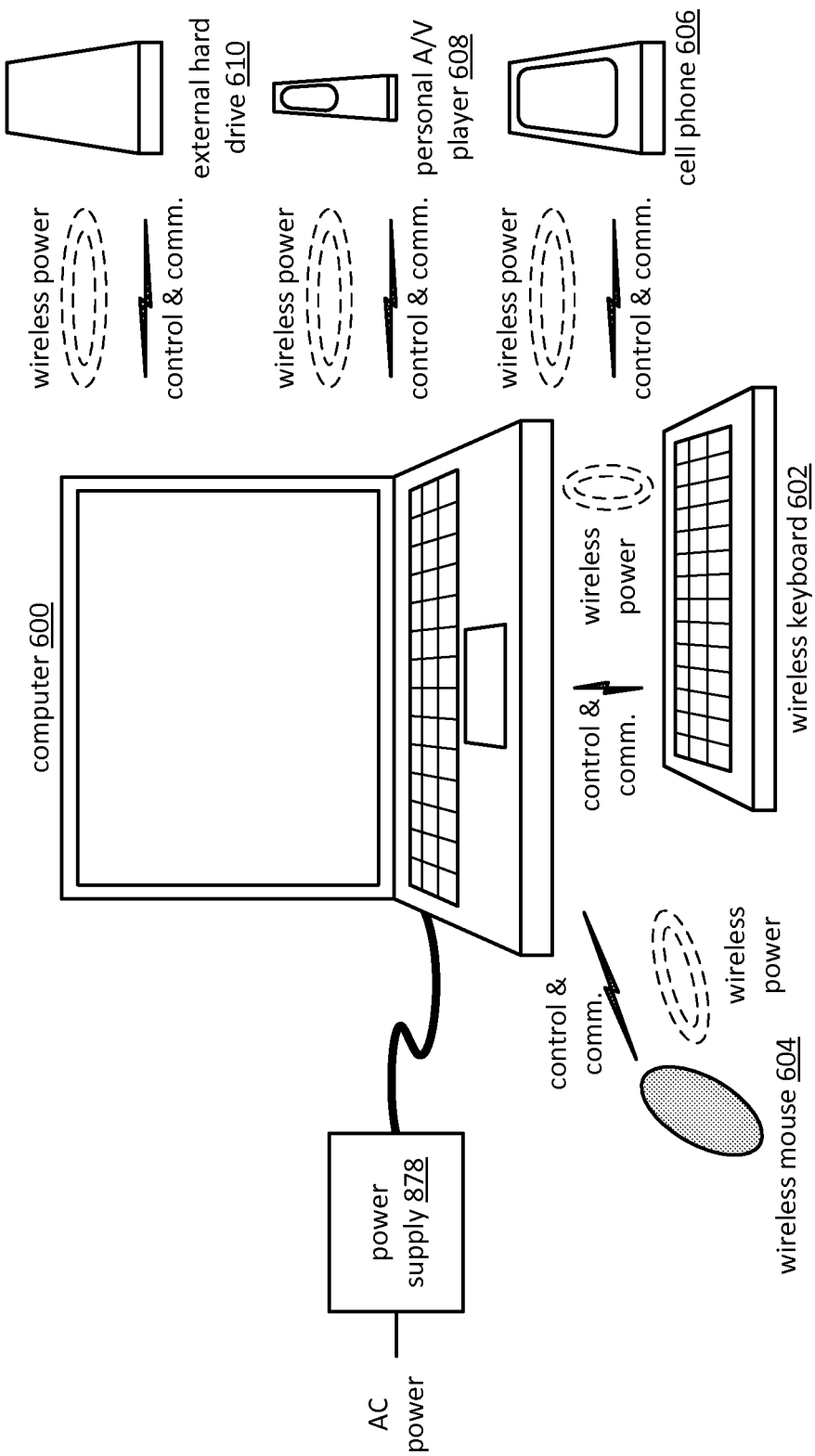
FIG. 47 is a schematic block diagram of another embodiment of a wireless power computer system in accordance with the present invention.

FIG. 47 is a schematic block diagram of another embodiment of a wireless power computer system that includes a computer 600, a wireless keyboard 602, a wireless mouse 604, a cell phone 606, a personal audio/video (A/V) player 608, an external hard drive 610, and potentially other peripheral computer devices (e.g., joy stick, touch pad, track ball, speakers, etc.). The computer 600 may be a laptop, a panel display computer, a conventional computer, etc. and includes a wireless power module.

In this embodiment, the computer is powered by a conventional power supply 878, but provides wireless power to the peripheral components 604-610 (e.g., keyboard, mouse, cell phone, personal AV player, hard drive, etc.). The peripheral devices 604-610 may be wirelessly powered concurrently from the computer 600 and/or sequentially. The peripheral devices 604-610 wirelessly communicate with the computer 600 using conventional wireless communication protocols (e.g., Bluetooth) and/or uses the WP control channel.

Figure 48:
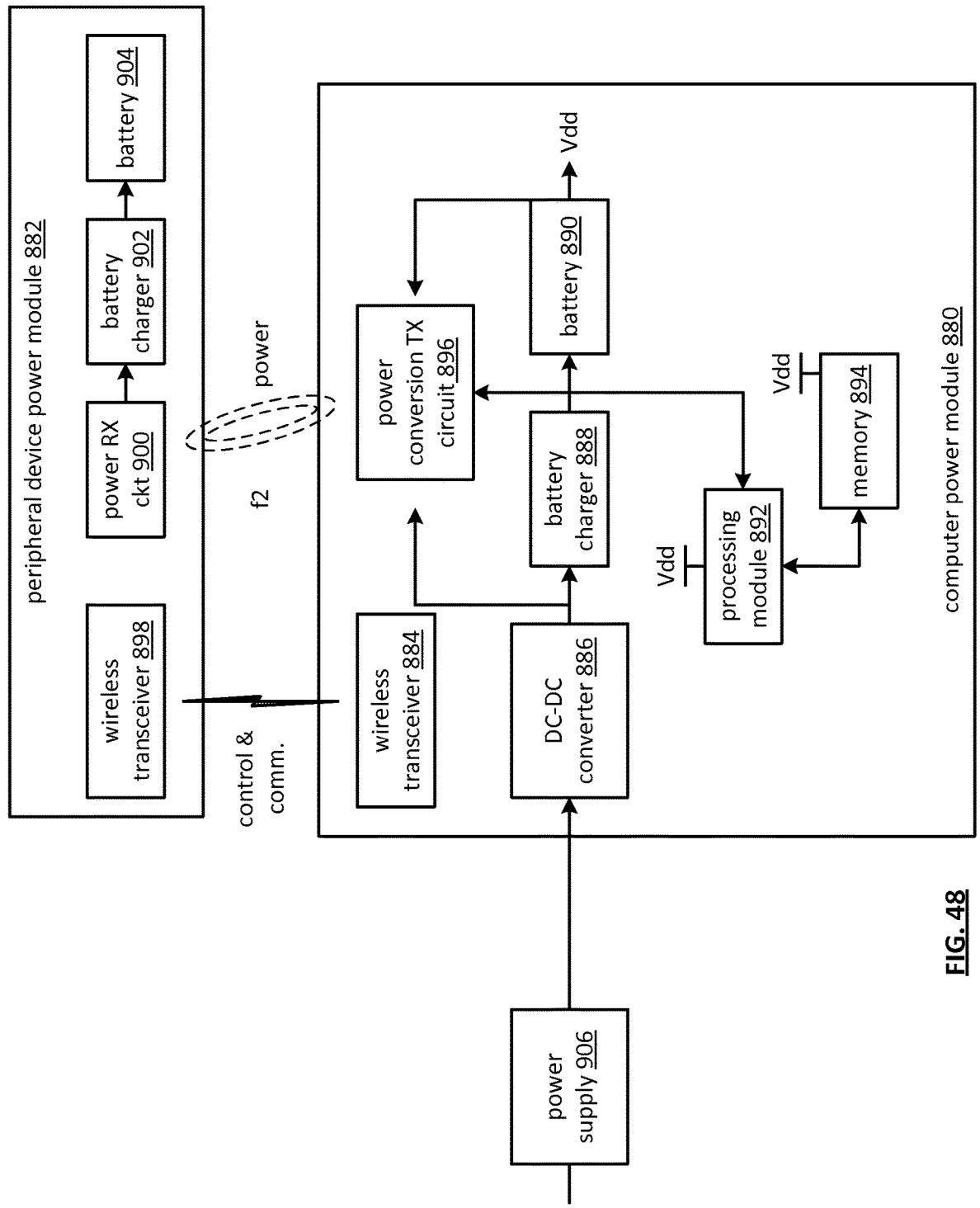
FIG. 48 is a schematic block diagram of another embodiment of power modules within a wireless power computer system in accordance with the present invention.

FIG. 48 is a schematic block diagram of another embodiment of power modules (e.g., computer power module 880 and peripheral device power module 882) within a wireless power computer system. The computer power module 880 includes a wireless transceiver 884, a DC-DC converter 886, a battery charger 888, a battery 890, a power conversion transmit (TX) circuit 896, a processing module 892, and memory 894. The peripheral device power module 882 includes a wireless transceiver 898 a power receive circuit (RX ckt) 900, a battery charger 902, and a battery 904.

In an example of operation, the DC-DC converter 886 generates a DC voltage in accordance with control signals provided by the processing module 892. The battery charger 888 uses the DC voltage as a battery charge voltage to charge the battery 890. The power conversion TX circuit 896 generates a magnetic field that is magnetically coupled to the power RX circuit 900 of the peripheral device power module 882. The power conversion TX circuit 896 may be sourced by the DC voltage when the computer power module 880 is proximal to the power transmitter circuit 906 or the battery 890 when the computer power module 880 is not proximal to the power transmitter circuit 906.

The power RX circuit 900 of the peripheral device power module 882 generates a DC rail voltage from the magnetic field of the power conversion TX circuit 896. The battery charger 902 converts the DC rail voltage into a battery charger voltage, which is provided to the battery 904. The computer power module 880 communicates with the peripheral device power module 882 via the wireless transceivers 884, 898 (e.g., RF, MMW, and/or NFC) regarding wireless power matters (e.g., frequency selection, operating frequency, impedance matching settings, power levels, etc.). In addition, the wireless transceivers 884, 989 may be used to convey data between the peripheral device and the computer. For example, if the peripheral device is the wireless keyboard, the keyboard signaling may be conveyed to the computer via the wireless transceivers 884, 898. Note that with multiple peripheral devices, each including a wireless transceiver 898, a local area network is created, which requires network level coordinate of communications therein.

Figure 49:
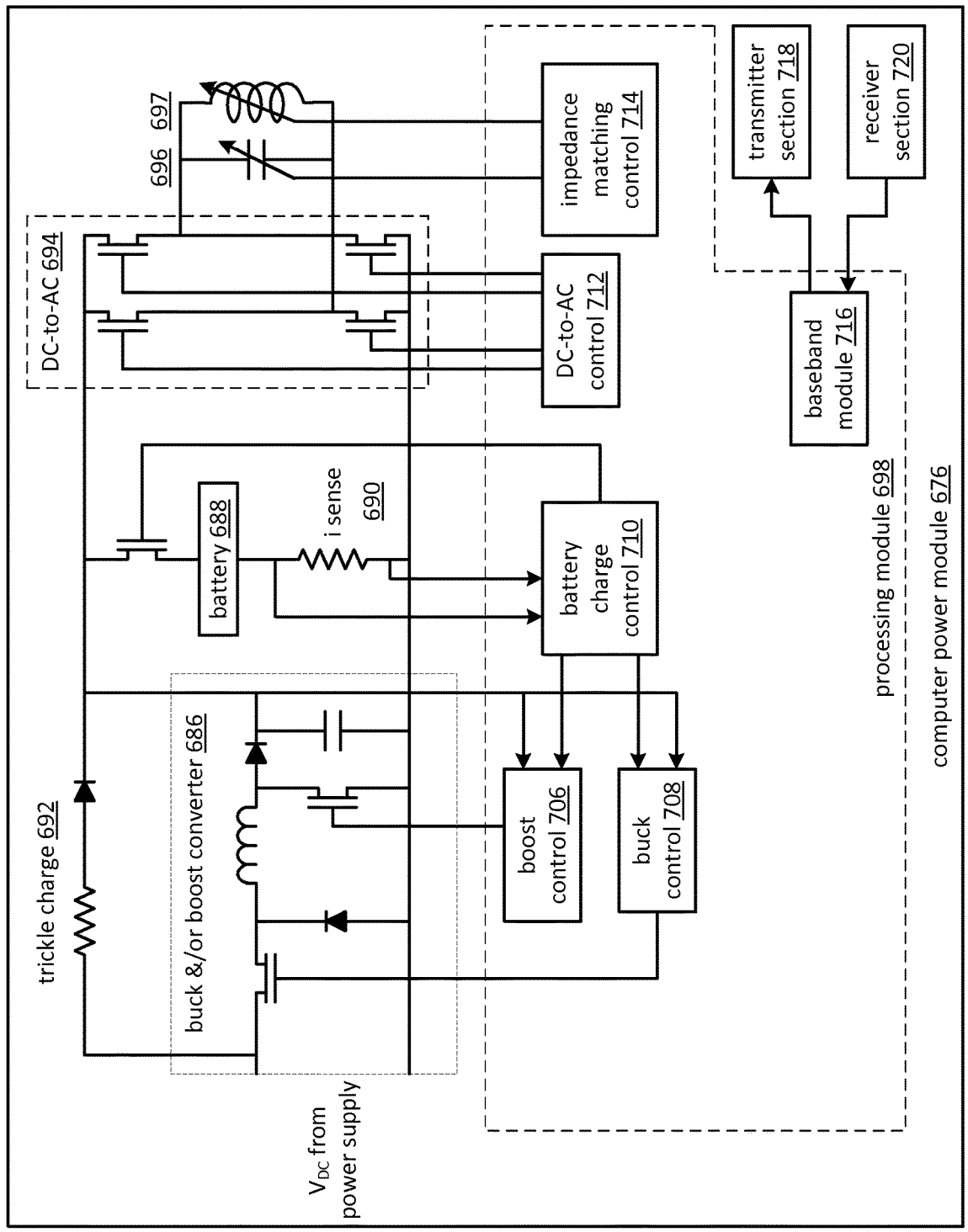
FIG. 49 is a schematic block diagram of another embodiment of a computer power module in accordance with the present invention.

FIG. 49 is a schematic block diagram of another embodiment of a computer power module 676 that includes a buck and/or boost converter 686, the battery 688, a battery current sense 690, a trickle charge circuit 692, the DC-to-AC converter 694, an adjustable capacitor 696, and the processing module 698. The processing module 698 implements a battery charger controller 710, a boost controller 706, a buck controller 708, an impedance matching circuit 714, and an RF/MMW and/or NFC data processing module. The processing module 698 may further implement the power management unit. Note that the processing module 698 may be fabricated on a single integrated circuit or multiple integrated circuit with one or more of the components of the converter 686, the rectifier circuit, the trickle charge circuit 692, and/or the battery current sense 690.

In an example of operation, the buck and/or boost converter 686 is enabled in a buck converter mode when the DC voltage from the power supply is to be stepped down to produce battery charge voltage (and the supply voltage Vdd for the device) and is enabled in boost converter mode when the DC voltage from the power supply is to be stepped up to produce the battery charge voltage (and the supply voltage Vdd). Note that when the buck and/or boost converter 686 is in the boost mode, the buck transistor is enabled. Further note that the buck and/or boost converter 686 may include multiple inductors, transistors, diodes, and capacitors to produce multiple supply voltages.

When the battery 688 is charging, the battery charge control module 710 monitors the battery current 690 and voltage to insure charging is in accordance with the charging requirements of the battery 688. When the battery 688 is charged, the battery 688 is disconnected from the converter 686 (which may be disable or enabled to provide Vdd) and the battery 688 may be trickle charged. Note that when the WP is lost, the battery 688 is coupled to provide the power for the device.

In a further example of operation, the DC-to-AC module 694 receives the DC rail voltage produced by the buck and/or boost converter 686. The DC-to-AC module 694 includes a full bridge inverter topology to excite the coil 697. The DC-to-AC control module 712 generates the switching signals to drive the DC-to-AC module 694 at a desired frequency. The impedance matching control circuit a 714 adjusts the impedance of the capacitor 696 and/or coil 697 to a desired resonance and/or quality factor. As an example, the impedance matching control circuit 714 may tune the capacitor 696 and coil 697 to resonant at the switching frequency of the DC-to-AC converter 694, to be an under-damped circuit, or an over-damped circuit. In an alternate embodiment, the DC-to-AC converter 694 may include a half bridge inverter topology.

Figure 50:
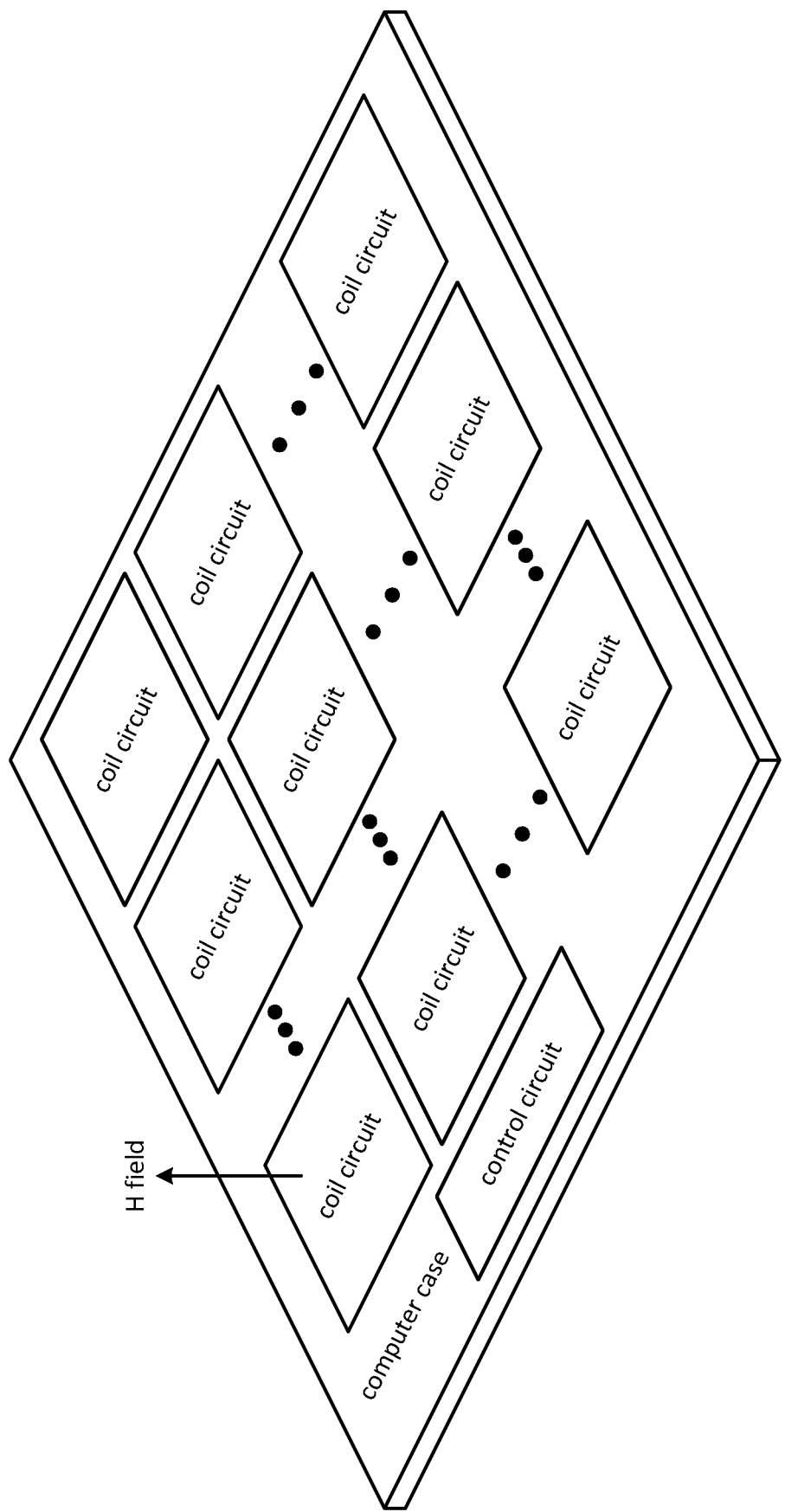
FIG. 50 is a diagram of an example of a coil grid of a computer in accordance with the present invention.

FIG. 50 is a diagram of an example of a coil grid of a computer. The coil grid is selectively enabled to charge one or more peripheral devices that are proximal to the coil grid (e.g., in charging range). The grid of coil includes a plurality of coil circuits and may be located in the case of the computer (e.g., the top, bottom, and/or sides of the computer housing). Alternatively or in addition to, the plurality of coil circuits may be in the computer stand, may be in a monitor stand, or other flat, concaved, or convex surface associated with a computer.

In this illustration, the coil circuits are planer and parallel to the computer case, thus producing a magnetic field that is perpendicular to the plane of the computer case surface. In various embodiments of the coil grid, the coils of the coil circuits may or may not be planer with the surface of the computer case. When the coils are not planer, the magnetic field will not be planer to the surface. As such, by having coils are various angles to the plane of the surface, different angled magnetic fields can be created to enable better magnetic couple to RX coils of peripheral devices that are not parallel to the plane of the surface.

Figure 51:
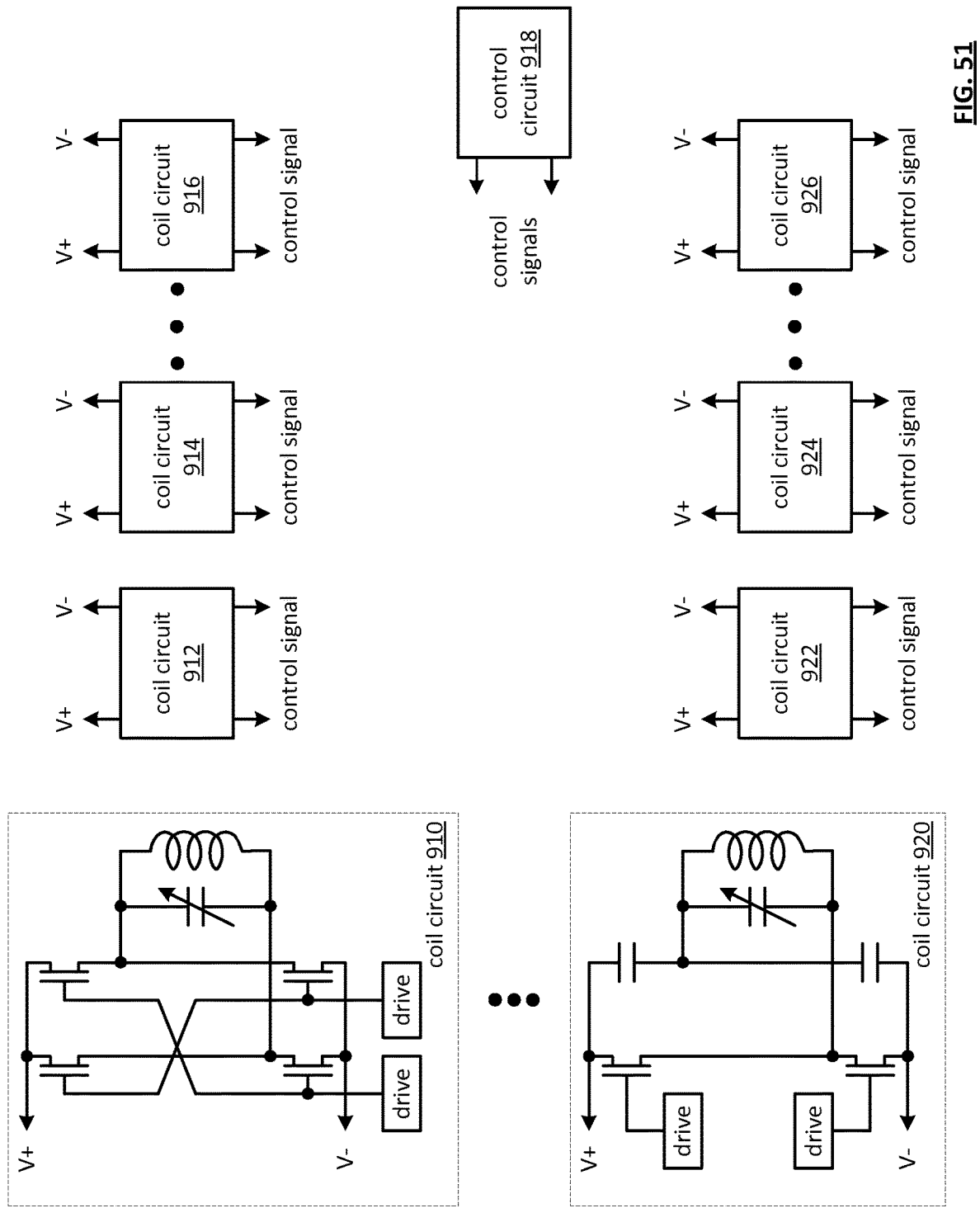
FIG. 51 is a schematic block diagram of an embodiment of a coil grid of a computer in accordance with the present invention.

FIG. 51 is a schematic block diagram of an embodiment of a coil grid of a computer that includes a plurality of coil circuits 910-916, 920-926 and a control circuit 918. Each of the coil circuits 910-916, 920-926 may have one of many different topologies. For example, one or more of the coil circuits 910-916 may include a full bridge inverter configuration that includes two pairs of transistors, two drive circuits, a tunable capacitor, and a tunable inductor. The pairs of transistors are alternately driven (based on control signals from the control circuit 918) to couple the inductor to the DC rail voltage (e.g., V+ and V−) at a given frequency. Note that the capacitor and inductor may be tuned to resonate at the given frequency, may be tuned to be under-damped at the given frequency, may be tuned to be over-damped at the given frequency, may be tuned to a desired quality factor, may be tuned to a desired impedance, etc.

In an alternate embodiment, the coil circuit 920-926 may include a half bridge inverter configuration that includes two transistors, two capacitors, two drive circuits, a tunable capacitor, and a tunable inductor. The two transistors are alternatively driven (based on control signals from the control circuit 918) to couple one end of the inductor to the DC rail voltage (e.g., V+ and V−) at a given frequency with the other end of the inductor coupled to the center node of the two capacitors. Note that the capacitor and inductor may be tuned to resonate at the given frequency, may be tuned to be under-damped at the given frequency, may be tuned to be over-damped at the given frequency, may be tuned to a desired quality factor, may be tuned to a desired impedance, etc. Further note that the two capacitors of the half bridge inverter may be sized to provide a voltage divider at the given frequency or may be sized to resonant with the tunable inductor and tunable capacitor.

The control circuit 918 determines which coil circuits 910-916, 920-926 are to be enabled, which may be done based on data provided by the processing module, by scanning through the coil circuits 910-916, 920-926 to identify one or more circuits 910-916, 920-926 that has a desired level of magnetic coupling with the RX coil of the peripheral device.

When more than one peripheral device is within wireless power range of the coil grid, the control circuit 918 coordinates the power distribution to the devices, the frequency planning, interference avoidance, etc. as previously discussed.

In an example of use, when a peripheral device is place proximal to the computer, the computer and device communicate to determine the device's wireless power needs. For example, a cell phone may be place proximal to the computer (e.g., set on or near the stand for the computer, on or near the housing of the computer, etc.). In addition to determining the devices wireless power needs (e.g., charging and/or operating in a wireless power mode), the computer and device communicate to exchange data. For example, the computer and cell phone may synchronize files (e.g., audio, contact lists, videos, email, book marked web pages, etc.), the computer may inform the cell phone of software updates, etc.

Figure 53:
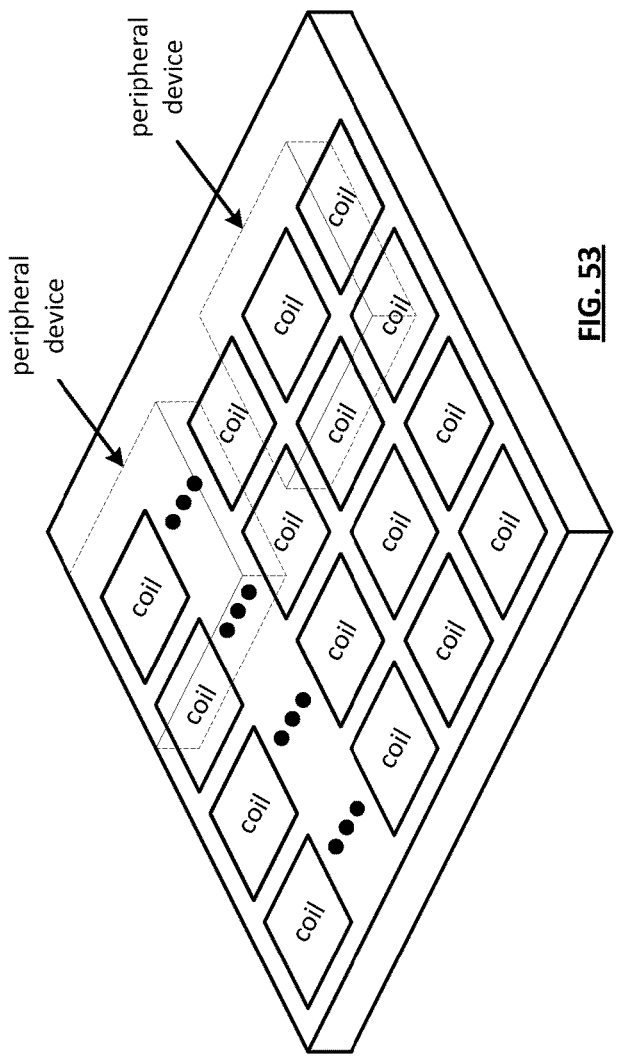
FIG. 53 is a diagram of another example of a coil grid of a computer in accordance with the present invention.
Figure 52:
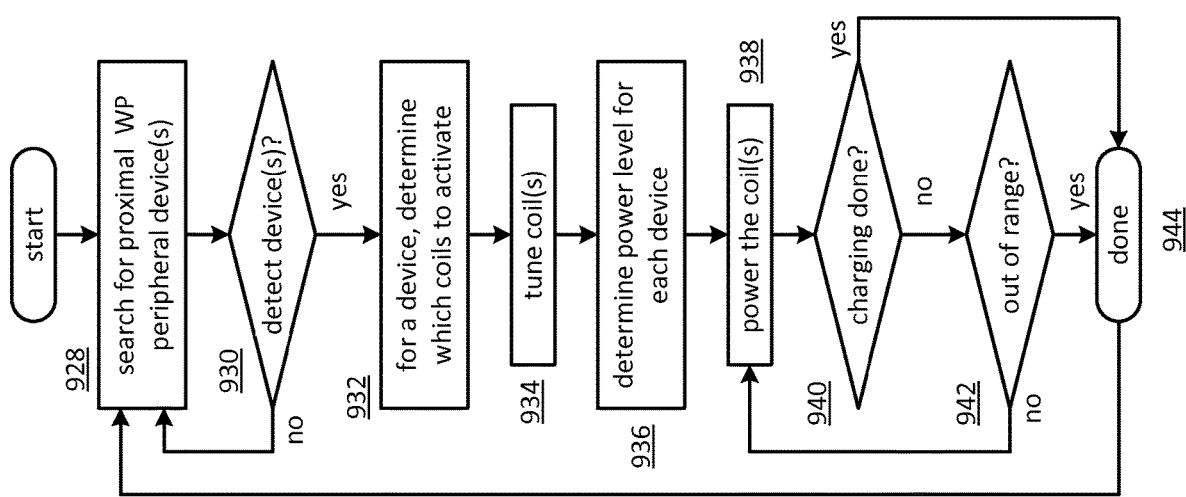
FIG. 52 is a logic diagram of a method for utilizing a coil grid in accordance with the present invention.

FIG. 52 is a logic diagram of a method for utilizing a coil grid that begins with the control circuit and/or processing module searching for physically proximal wireles sly powered peripheral devices 928. When the control circuit and/or processing module detect one or more WP peripheral devices 930, the method continues with the control circuit and/or processing module determining which coils to active for a given device 932. For example and with reference to FIG. 53, the control circuit and/or processing module detects the presence of two peripheral devices. The control circuit and/or processing module determines which coils provide an optimal magnetic coupling with the peripheral devices. From the illustration of FIG. 53, the peripheral device on the left, overlays four coils. As such, the control circuit and/or processing module may active one or more of the four coils to provide wireless power to the peripheral device.

Returning to the logic diagram of FIG. 52, the method continues with the control circuit and/or processing module determining wireless power parameters, which include one or more of impedance matching, frequency adjustment, operating frequency, etc., all of which may require the coil or coils to be tuned 934. The method continues with the control circuit and/or processing module determining the desired power level for each of the peripheral devices 936. The method continues with the control circuit and/or processing module enabling powering of the coils to provide the wireless power to the peripheral devices 938. The enabling may be done concurrently or in an alternating fashion.

The method continues with the control circuit and/or processing module determining whether the battery charging is done and/or the need for wireless power is done 940. If so, the method is complete 944 for a peripheral device and repeats for other peripheral devices. If the charging and/or need for wireless power is not done, the method continues with the control circuit and/or processing module determining whether the peripheral device is out of wireless power range 942. If yes, the method is complete for this peripheral device 944. If the peripheral device is not out of range, the method repeats at the powering the coils step 938.

Figure 54:
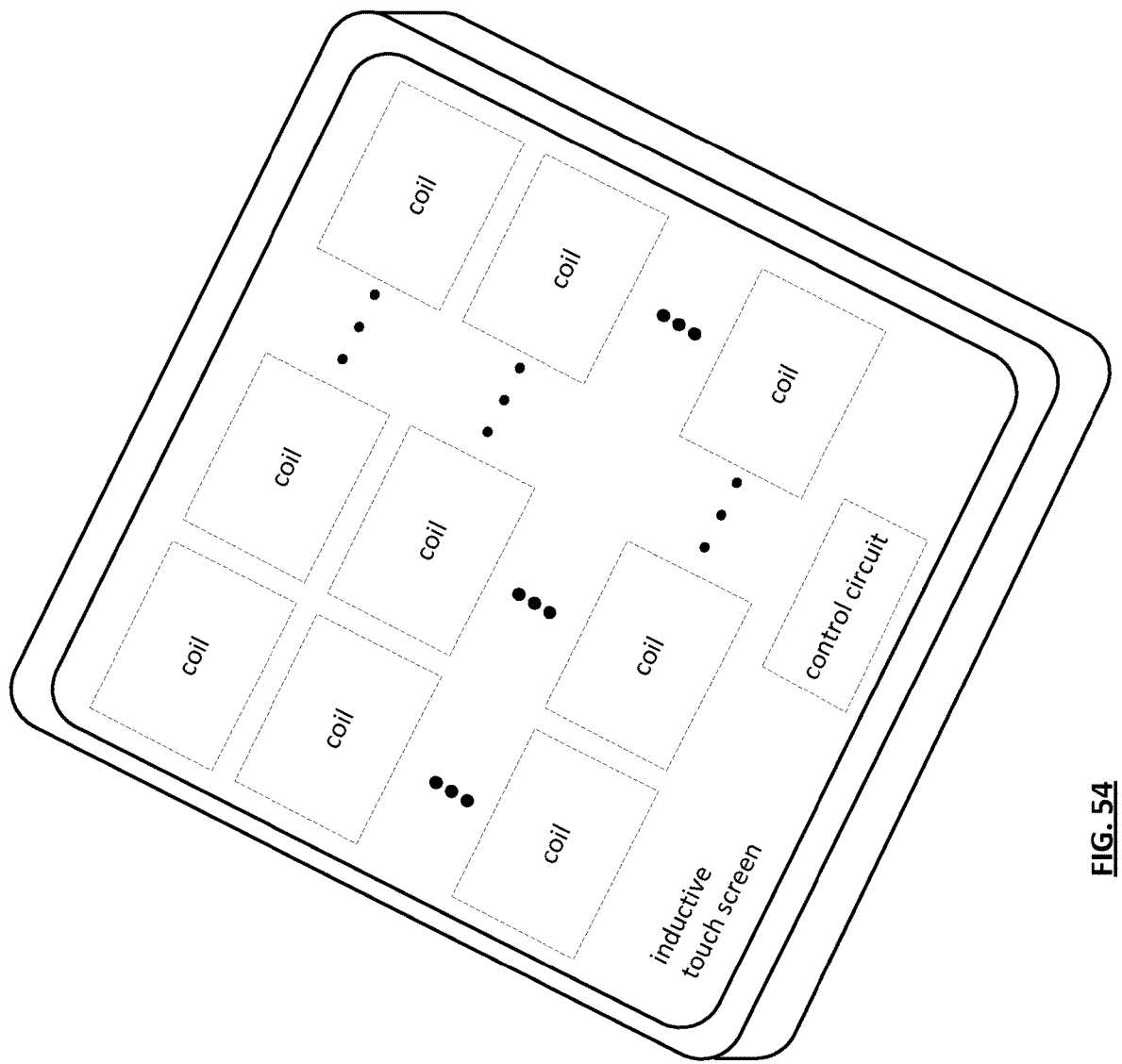
FIG. 54 is a diagram of another example of a coil grid of an inductive touch screen in accordance with the present invention.

FIG. 54 is a diagram of another example of a coil grid of an inductive touch screen. The inductive touch screen may be incorporated into a touch panel computer, laptop, or other type of computer. In an embodiment, the coils of the coil circuits provide multiple functions. For example, the coils are used for wireless power as described herein. As another example, the coils are used for the inductive touch screen of the computer. As another example, the coils may be used as an antenna and/or antenna array to provide wireless communications.

In an example of operation, when a user is using the computer, it is in a normal operational mode where the coils are used for the inductive touch screen and/or as an antenna(s) for wireless communications. In this mode, the wireless power function is disabled. When the computer is no longer in use, it is placed in a wireless power module, where peripheral devices are placed proximal to the inductive touch screen for charging. In another embodiment, wireless power can be provided during use of the computer.

Figure 55:
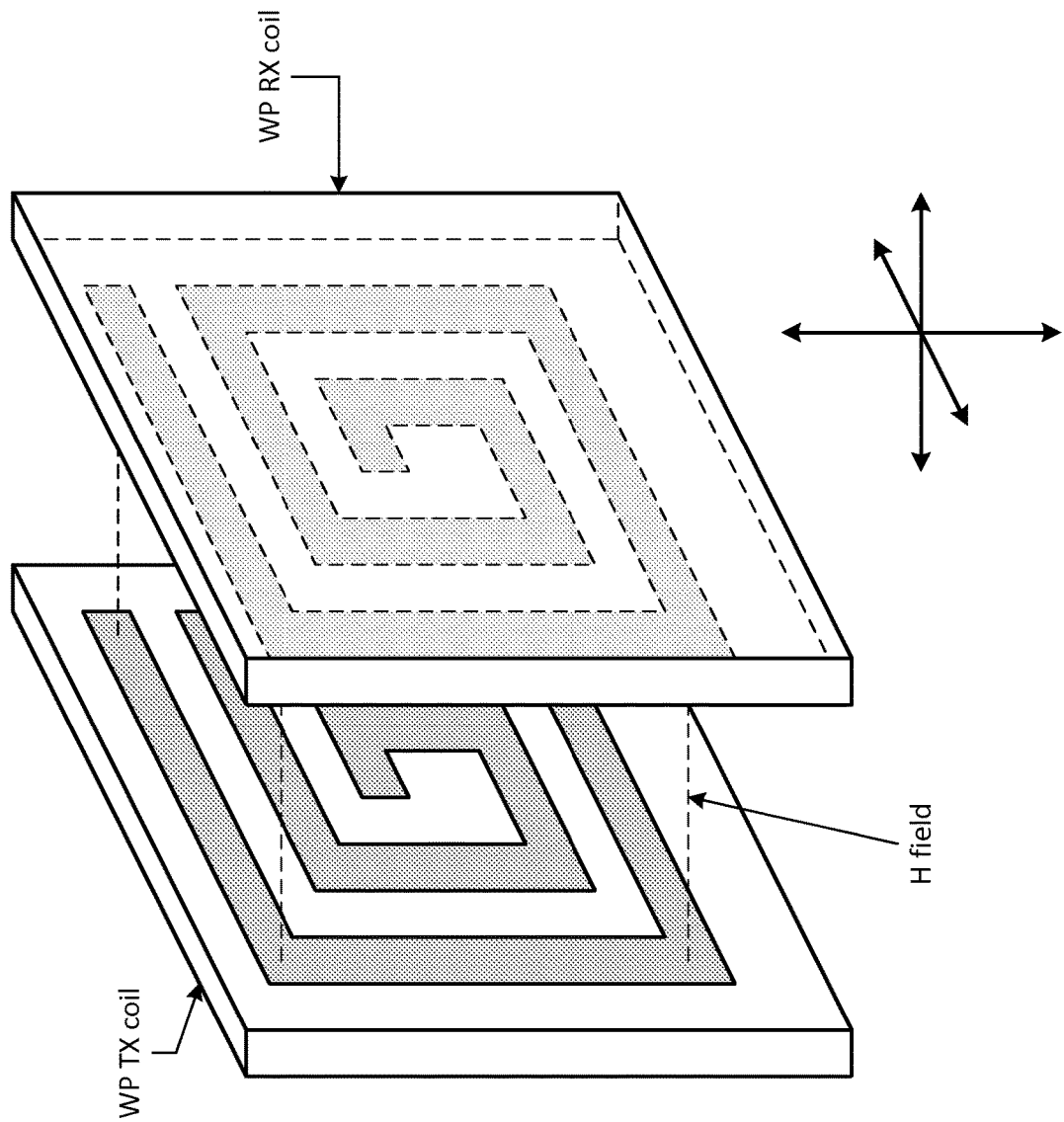
FIG. 55 is a diagram of an example of a wireless power (WP) transmit coil and a wireless power receive coil in accordance with the present invention.

FIG. 55 is a diagram of an example of a wireless power (WP) transmit coil and a wireless power receive coil. In this example, the WP TX coil and/or of the WP RX coil is incorporated in a mechanism that is may be rotated in three-dimensional space to achieve a better magnetic coupling between the coils. For example, the WP TX coil may be incorporated in the housing of the computer and the WP RX coil is implemented in the housing of a wireless keyboard. The coil in the wireless keyboard may be incorporated in a movable extension to better align the RX coil with the TX coil. The alignment may be manual or automated.

As another example, the TX coil of the computer may be incorporated in a movable extension structure that can be rotated in three-dimensional space to achieve a better alignment with the RX coil. The alignment may be manual or automated.

Figure 56:
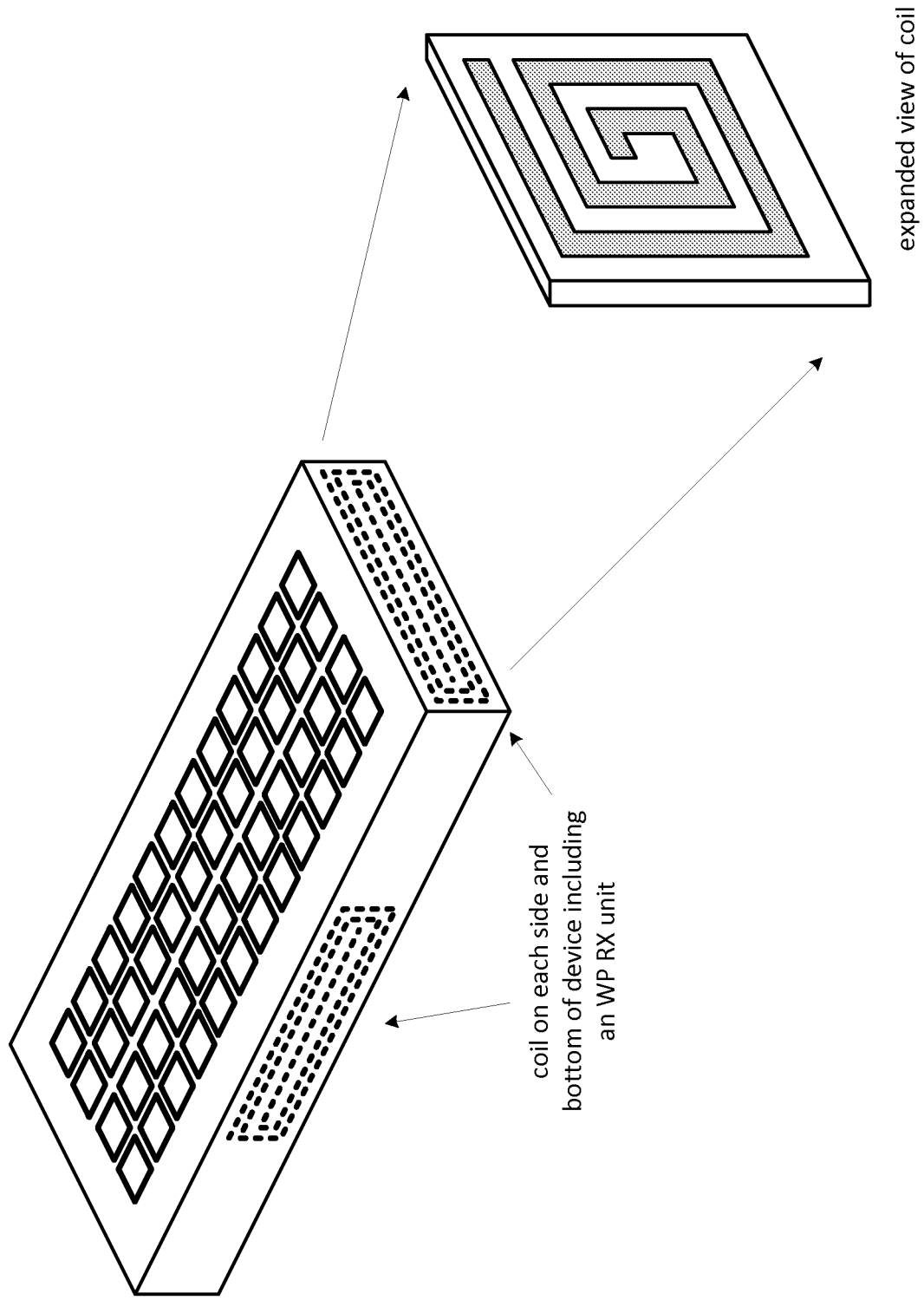
FIG. 56 is a diagram of an example of a computer peripheral devices that includes one or more wireless power (WP) transmit coils and/or one more wireless power receive coils in accordance with the present invention.

FIG. 56 is a diagram of an example of a computer peripheral device (e.g., keyboard, cell phone, personal AV player, etc.) that includes one or more wireless power (WP) transmit coils and/or one more wireless power receive coils. As shown, coils may be on each side, on the bottom, and/or on the top of the device. Depending on the functionality of the device, each side may include only RX coils, only TX coils, or a combination of RX and TX coils.

Figure 57:
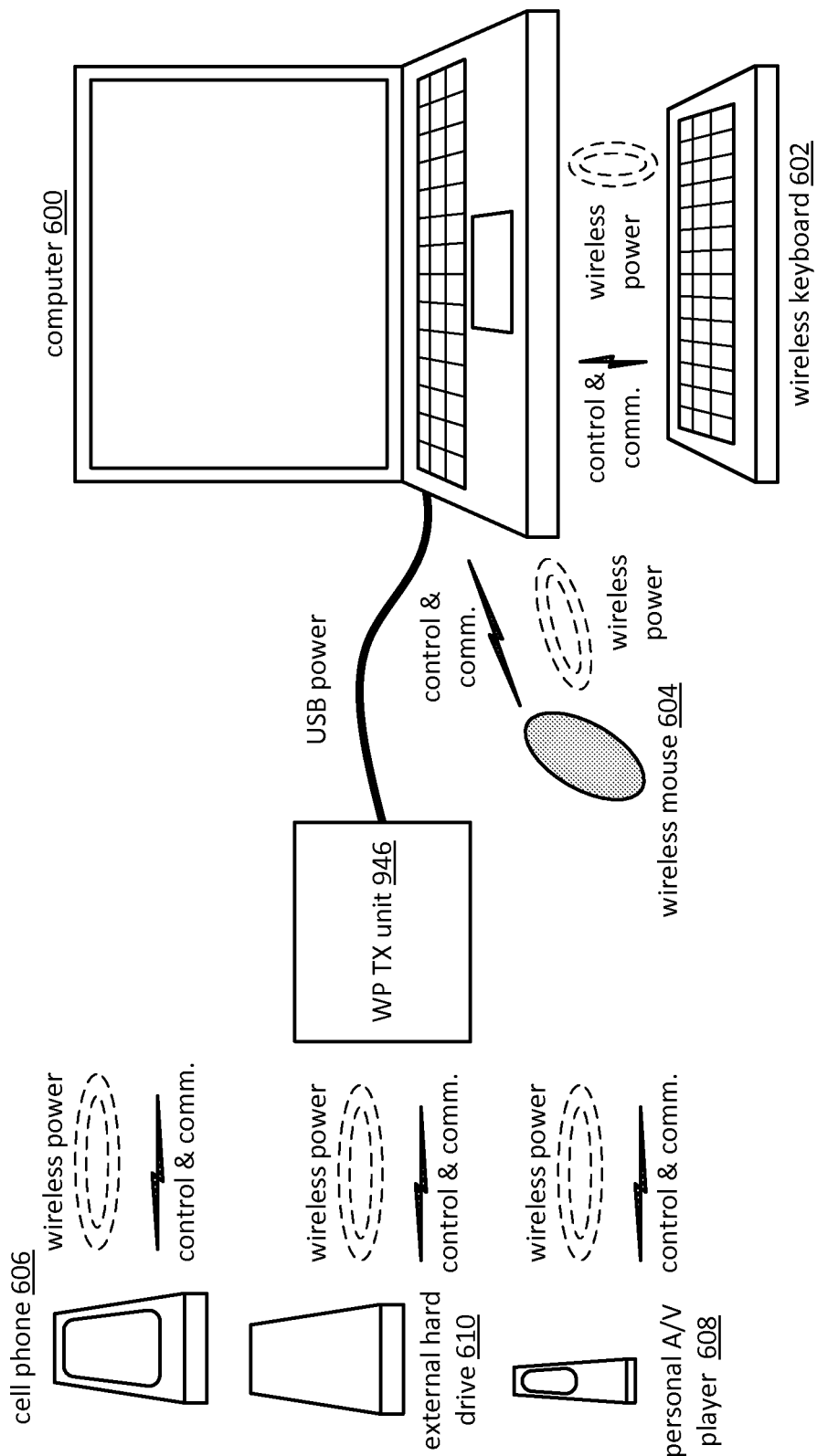
FIG. 57 is a schematic block diagram of another embodiment of a wireless power computer system in accordance with the present invention.

FIG. 57 is a schematic block diagram of another embodiment of a wireless power computer system that includes a computer 600, a wireless keyboard 602, a wireless mouse 604, a cell phone 606, a personal audio/video (A/V) player 608, an external hard drive 610, a wireless power TX unit 946, and potentially other peripheral computer devices (e.g., joy stick, touch pad, track ball, speakers, etc.). The computer 600 may be a laptop, a panel display computer, a conventional computer, etc. and includes a wireless power module.

In this embodiment, the computer 600 is powered wireles sly via the power transmitter circuit or via a power supply. The computer 600 may also provide wireless power to one or more of the peripheral device 602-610 (e.g., keyboard, mouse, cell phone, personal AV player, hard drive, etc.). The peripheral devices 602-610 may be wirelessly powered concurrently from the computer 600 and/or sequentially. The peripheral devices 602-610 wirelessly communicate with the computer 600 using conventional wireless communication protocols (e.g., Bluetooth) and/or uses the WP control channel.

The WP TX unit 946 is powered via a USB connection to the computer 600 and provides wireless power to one or more of the peripheral devices 602-610. The peripheral devices 602-610 wirelessly powered via the WP TX unit 946 communicate with the computer 600 directly using conventional wireless communication protocols (e.g., Bluetooth) and/or uses the WP control channel. Alternatively, the peripheral devices 602-610 are wirelessly powered via the WP TX unit 946 may communicate with the computer 600 indirectly via the WP TX unit 946.

Figure 58:
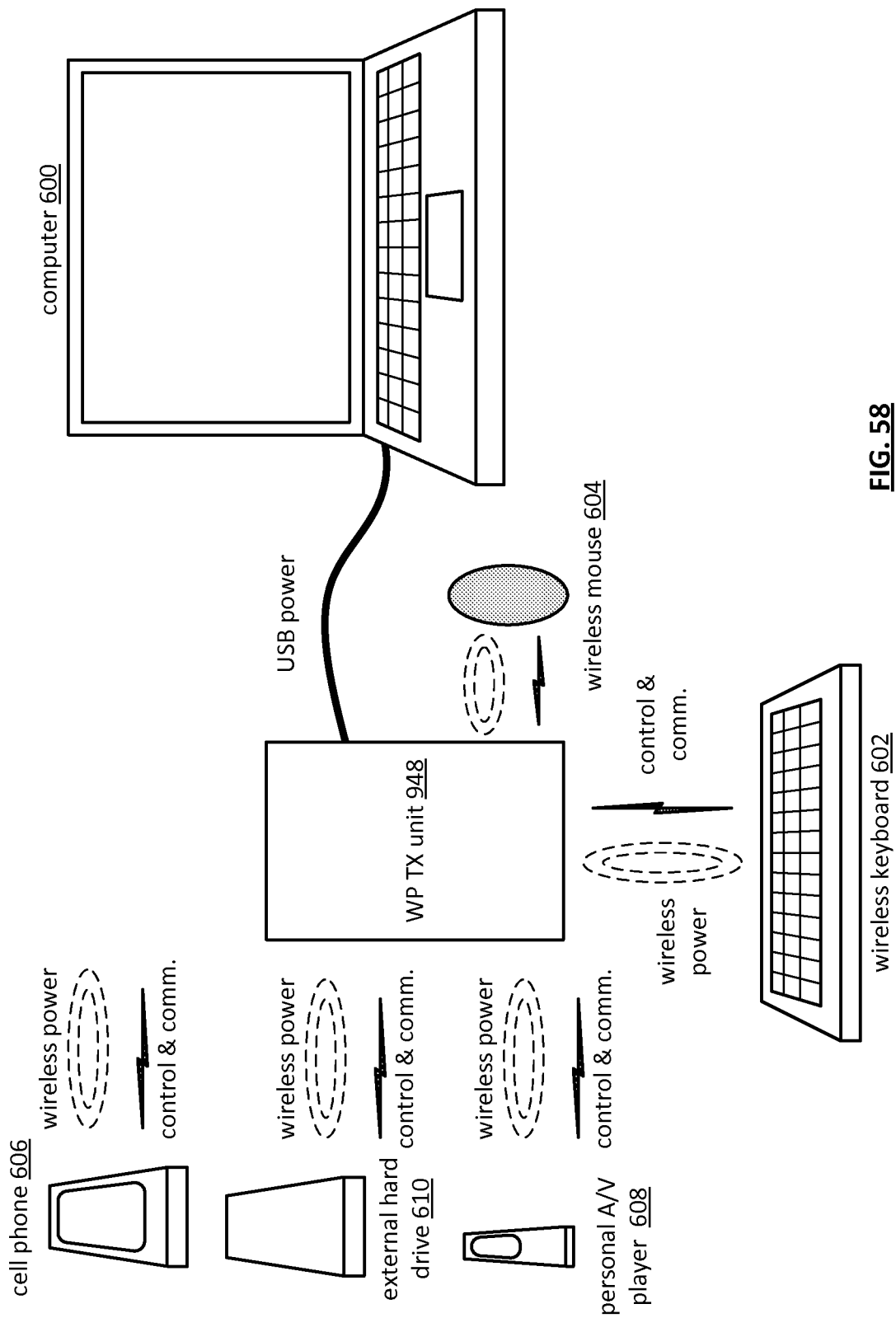
FIG. 58 is a schematic block diagram of another embodiment of a wireless power computer system in accordance with the present invention.

FIG. 58 is a schematic block diagram of another embodiment of a wireless power computer system that includes a computer 600, a wireless keyboard 602, a wireless mouse 604, a cell phone 606, a personal audio/video (A/V) player 608, an external hard drive 610, a wireless power TX unit 948, and potentially other peripheral computer devices (e.g., joy stick, touch pad, track ball, speakers, etc.). The computer 600 may be a laptop, a panel display computer, a conventional computer, etc. and includes a wireless power module.

In this embodiment, the WP TX unit 948 is powered via a USB connection to the computer 600 and provides wireless power to one or more of the peripheral devices 602-610. The peripheral devices 602-610 wirelessly powered via the WP TX unit 948 communicate with the computer 600 indirectly via the WP TX unit 948.

Figure 59:
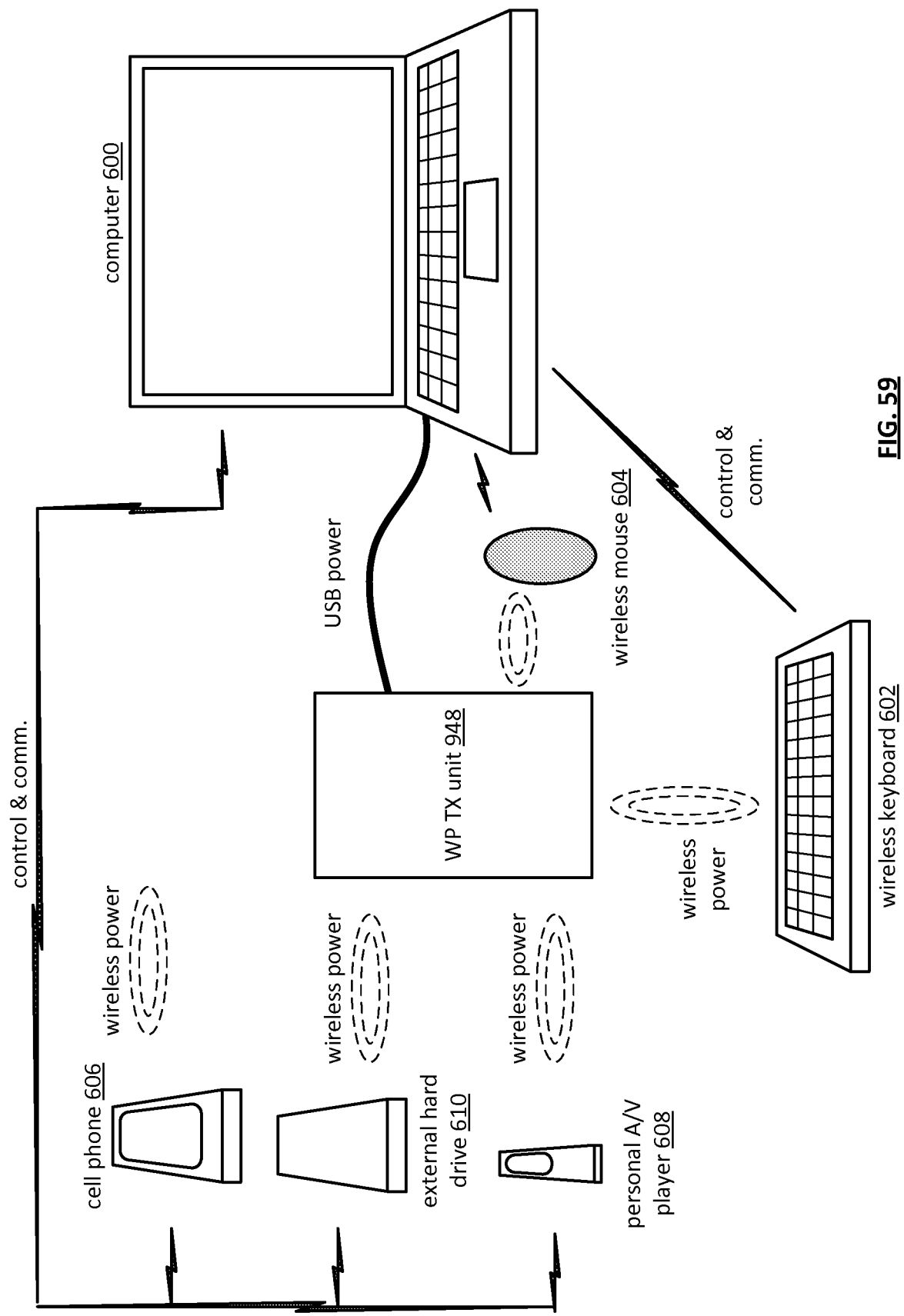
FIG. 59 is a schematic block diagram of another embodiment of a wireless power computer system in accordance with the present invention.

FIG. 59 is a schematic block diagram of another embodiment of a wireless power computer system that includes a computer 600, a wireless keyboard 602, a wireless mouse 604, a cell phone 606, a personal audio/video (A/V) player

608, an external hard drive 610, a wireless power TX unit 948, and potentially other peripheral computer devices (e.g., joy stick, touch pad, track ball, speakers, etc.). The computer 600 may be a laptop, a panel display computer, a conventional computer, etc. and includes a wireless power module.

In this embodiment, the WP TX unit 948 is powered via a USB connection to the computer 600 and provides wireless power to one or more of the peripheral devices 602-610. The peripheral devices 602-610 wirelessly powered via the WP TX unit 948 communicate with the computer 600 directly using conventional wireless communication protocols (e.g., Bluetooth) and/or uses the WP control channel. Note that the computer 600 systems of FIGS. 57-59 may each include a plurality of WP TX units 948.

Figure 60:
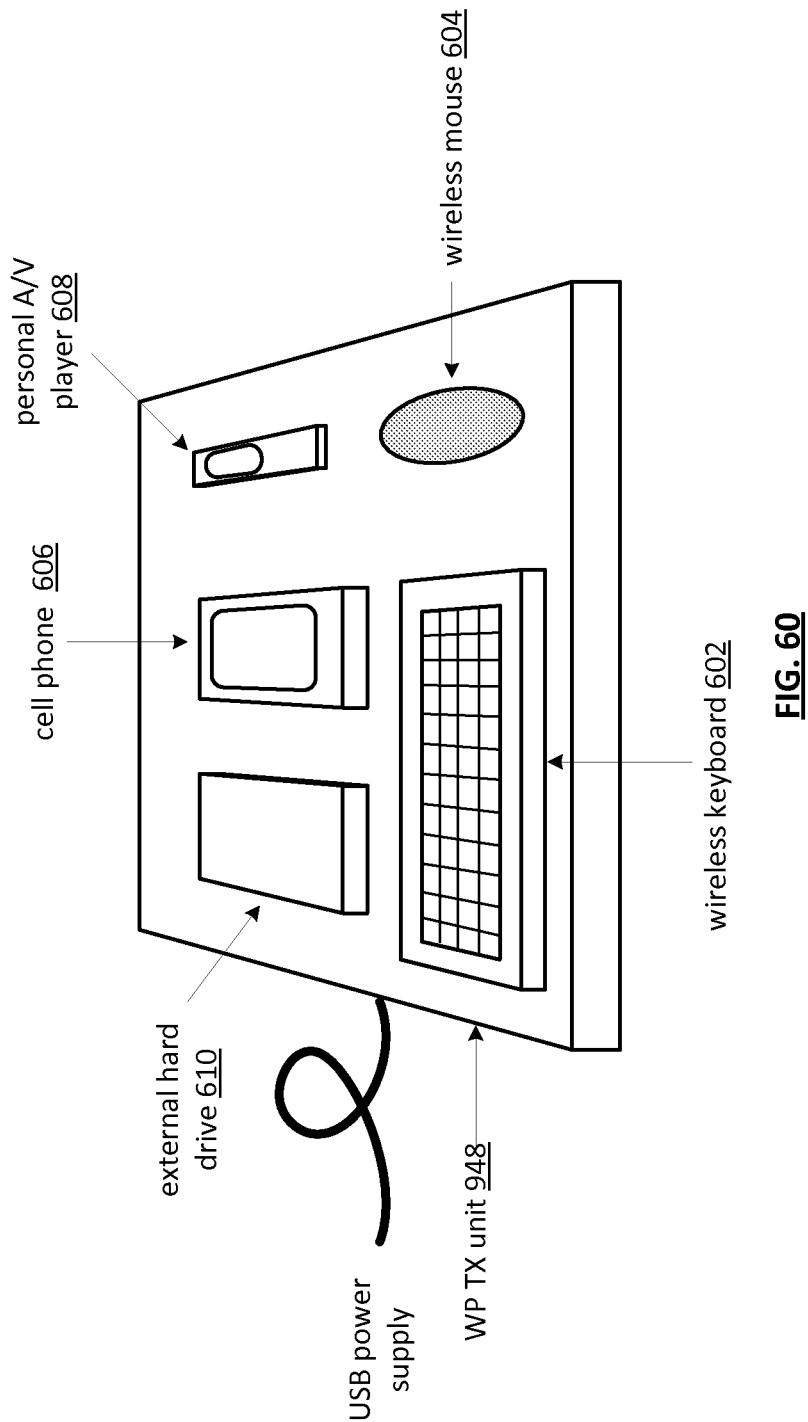
FIG. 60 is a schematic block diagram of an embodiment of a wireless power transmit unit of a wireless power computer system in accordance with the present invention.

FIG. 60 is a schematic block diagram of an embodiment of a wireless power transmit unit of a wireless power computer system that may sit on a desk top or rest on a user's lap.

Figure 61:
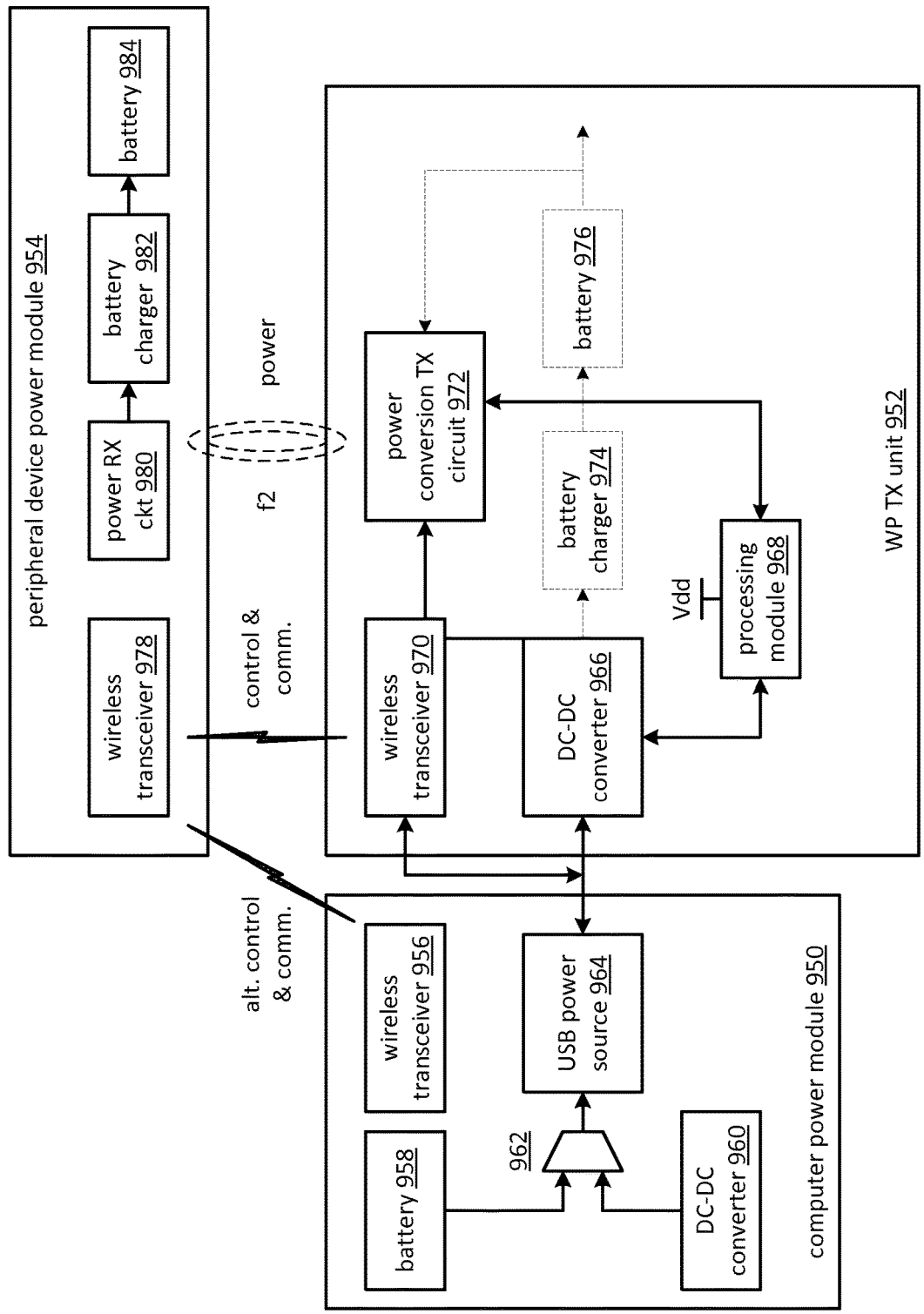
FIG. 61 is a schematic block diagram of another embodiment of power modules within a wireless power computer system in accordance with the present invention.

FIG. 61 is a schematic block diagram of another embodiment of power modules (e.g., computer power module 950, the WP TX unit 952, and peripheral device power module 954) within a wireless power computer system. The computer power module 950 includes a wireless transceiver 956, a battery 958, a DC-DC converter 960, a multiplexer 962, and a USB power source 964. The WP TX unit 952 includes a DC-DC converter 966, a processing module 968, a wireless transceiver 970, and a power conversion TX circuit 972. The WP TX unit 952 may also include a battery charger 974 and a battery 976. The peripheral device power module 954 includes a wireless transceiver 978 a power receive circuit 980 (RX ckt), a battery charger 982, and a battery 984.

In an example of operation, USB power source 964 of the computer power module 950 generates a USB power supply voltage (e.g., 5 Volts) from the computer battery 958 or from a computer DC-DC converter 960. The DC-DC converter 966 of the WP TX unit 952 generates a DC rail voltage (e.g., 10-50 volts) from the USB power supply voltage. The power conversion TX circuit 972 generates a magnetic field that is magnetically coupled to the power RX circuit 980 of the peripheral device power module 954. The power conversion TX circuit 972 may be sourced by the DC rail voltage when the WP TX unit 952 is receiving the USB supply voltage or by the battery 976 when the WP TX unit 952 is disconnected from the USB supply voltage.

The power RX circuit 980 of the peripheral device power module 954 generates a DC rail voltage from the magnetic field of the power conversion TX circuit 972. The battery charger 982 converts the DC rail voltage into a battery charger voltage, which is provided to the battery 984. The computer power module 950 communicates with the peripheral device power module 954 and the WP TX unit 952 via the wireless transceivers 956, 970, 978 (e.g., RF, MMW, and/or NFC) regarding wireless power matters (e.g., frequency selection, operating frequency, impedance matching settings, power levels, etc.). In addition, the wireless transceivers 956, 970, 978 may be used to convey data between the peripheral device and the computer. For example, if the peripheral device is the wireless keyboard, the keyboard signaling may be conveyed to the computer via the wireless transceivers 956, 970, 978. Note that with multiple peripheral devices, each including a wireless transceiver, a local area network is created, which requires network level coordinate of communications therein. Further note that the computer may communicate with the WP TX unit 952 via the USB connection.

Figure 62:
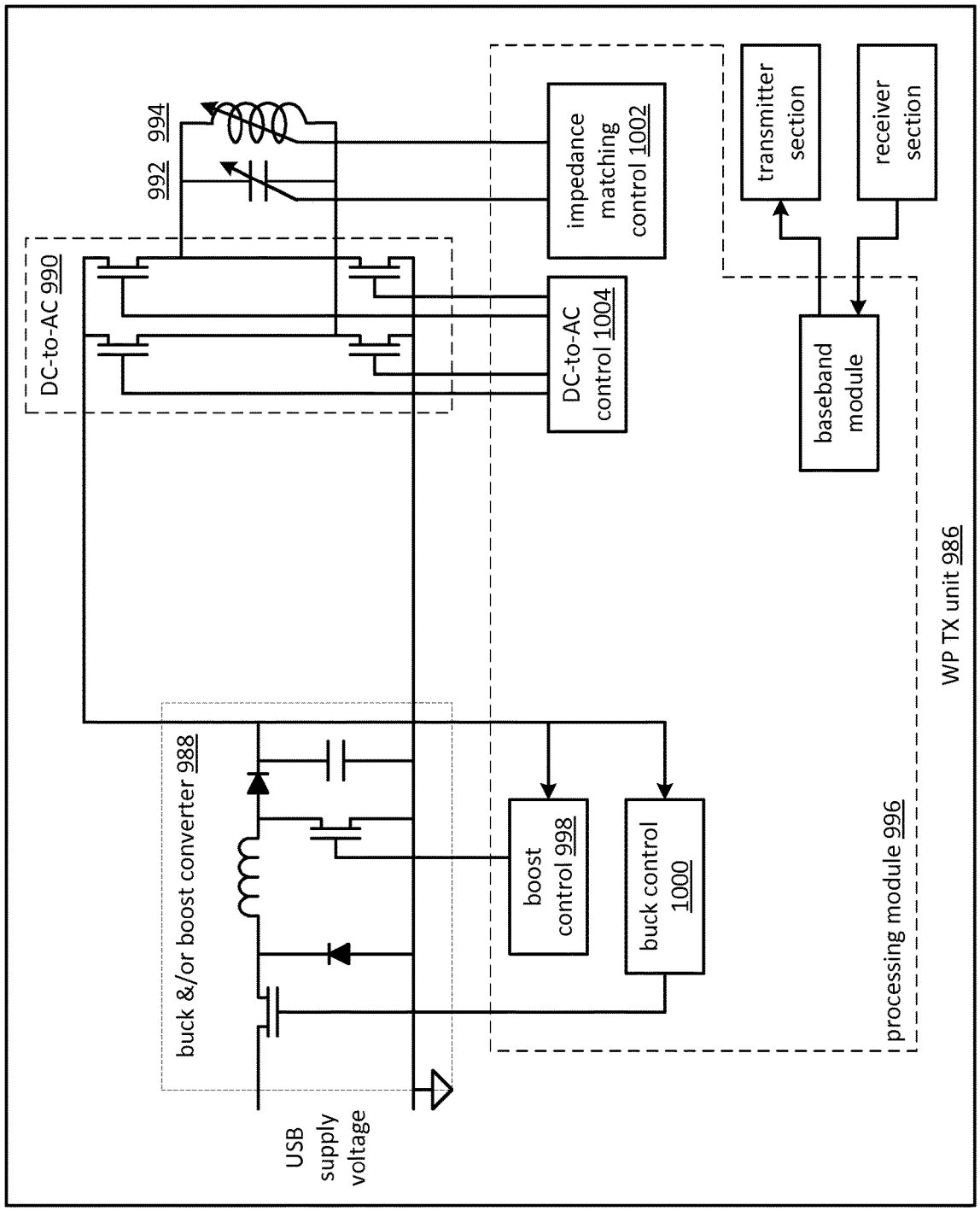
FIG. 62 is a schematic block diagram of another embodiment of a wireless power transmit unit in accordance with the present invention.

FIG. 62 is a schematic block diagram of another embodiment of a wireless power transmit unit 986 that includes a buck and/or boost converter 988, the DC-to-AC converter 990, an adjustable capacitor 992, and the processing module 996 and may further include an optional battery, an optional battery current sense, and an optional trickle charge circuit). The processing module 996 implements a boost controller 998, a buck controller 1000, an impedance matching circuit 1002, and an RF/MMW and/or NFC data processing module. The processing module 996 may further implement the power management unit and optionally a battery charger controller. Note that the processing module 996 may be fabricated on a single integrated circuit or multiple integrated circuit with one or more of the components of the converter 988, the rectifier circuit, the trickle charge circuit, and/or the battery current sense.

In an example of operation, the buck and/or boost converter 988 is enabled in a buck converter mode when the USB power supply voltage is to be stepped down to produce the supply voltage Vdd for the device and is enabled in boost converter mode when the USB power supply voltage is to be stepped up to produce the supply voltage Vdd. Note that when the buck and/or boost converter 988 is in the boost mode, the buck transistor is enabled. Further note that the buck and/or boost converter 988 may include multiple inductors, transistors, diodes, and capacitors to produce multiple supply voltages.

In a further example of operation, the DC-to-AC module 990 receives the DC rail voltage (e.g., Vdd) produced by the buck and/or boost converter 988. The DC-to-AC module 990 includes a full bridge inverter topology to excite the coil 994. The DC-to-AC control module 1004 generates the switching signals to drive the DC-to-AC module 990 at a desired frequency. The impedance matching control circuit 1002 adjusts the impedance of the capacitor 992 and/or coil 994 to a desired resonance and/or quality factor. As an example, the impedance matching control circuit 1002 may tune the capacitor 992 and coil 994 to resonant at the switching frequency of the DC-to-AC converter 990, to be an under-damped circuit, or an over-damped circuit. In an alternate embodiment, the DC-to-AC converter 990 may include a half bridge inverter topology.

Figure 63:
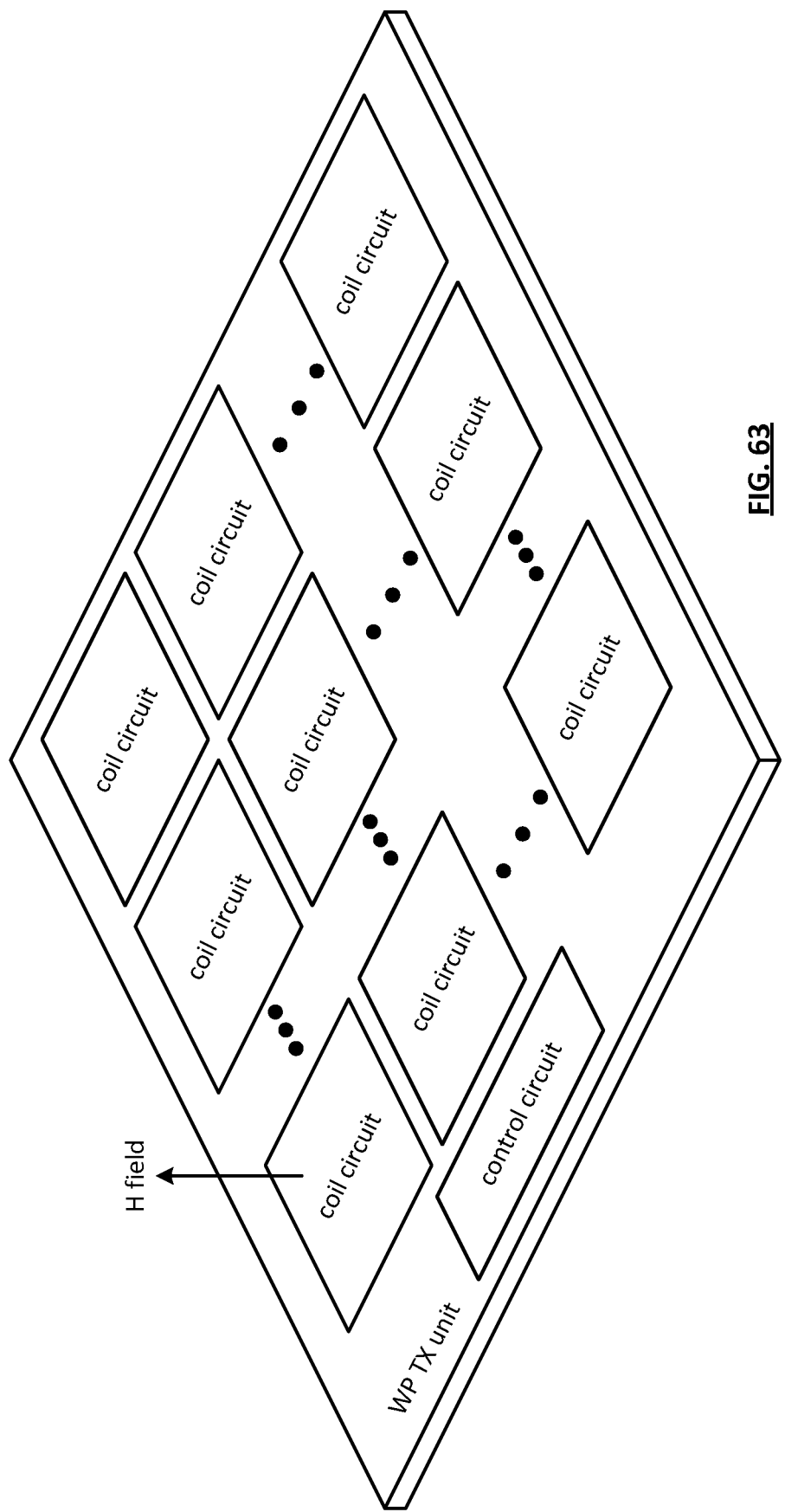
FIG. 63 is a diagram of an example of a coil grid of a wireless power transmit unit in accordance with the present invention.

FIG. 63 is a diagram of an example of a coil grid of a wireless power transmit unit. The coil grid is selectively enabled to charge one or more peripheral devices that are proximal to the coil grid (e.g., in charging range). The grid of coil includes a plurality of coil circuits and may be located in the laptop desk and/or a desk pad.

In this illustration, the coil circuits are planer and parallel to the surface of the laptop desk and/or desk pad, thus producing a magnetic field that is perpendicular to the plane of the surface. In various embodiments of the coil grid, the coils of the coil circuits may or may not be planer with the surface. When the coils are not planer, the magnetic field will not be planer to the surface. As such, by having coils are various angles to the plane of the surface, different angled magnetic fields can be created to enable better magnetic couple to RX coils of peripheral devices that are not parallel to the plane of the surface.

Figure 64:
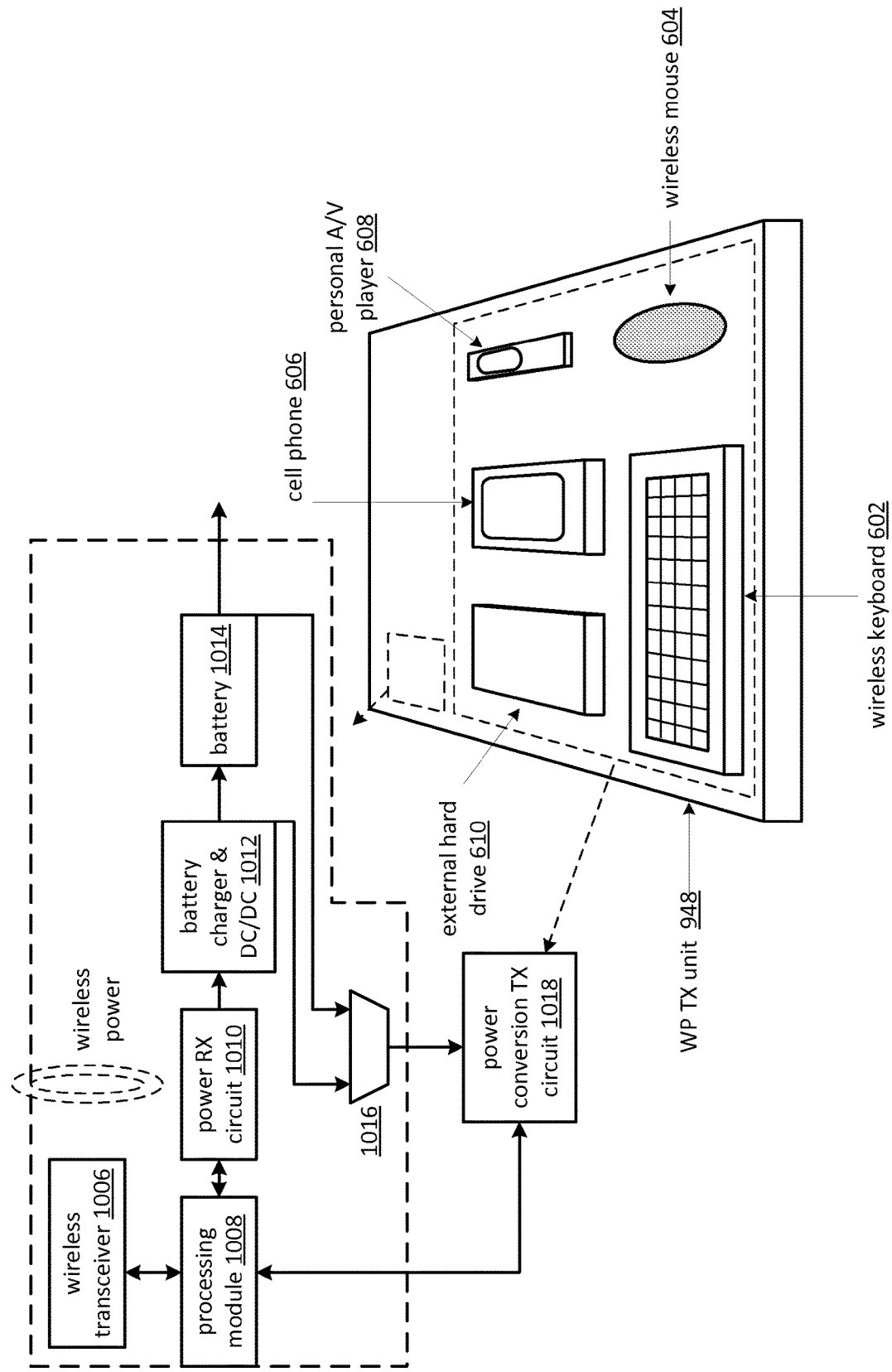
FIG. 64 is a schematic block diagram of another embodiment of a wireless power transmit unit in accordance with the present invention.

FIG. 64 is a schematic block diagram of another embodiment of a wireless power transmit unit 948 that includes a wireless transceiver 1006, a processing module 1008, a power RX circuit 1010, a battery charger 1012 and/or DC-DC converter, a battery 1014, a multiplexer 1016 and a power conversion TX circuit 1018.

In an example of operation, the power transmit circuit (not shown) generates a magnetic field that is received by the power receiver circuit 1010 of the WP TX unit 948 to facilitate a wireless power transfer. The power receiver circuit 1010 generates a DC rail voltage in accordance with control signals provided by the processing module 1008. The battery charger/DC-DC converter 1012 converts the DC rail voltage into a battery charge voltage, which is supplied to the battery 1014. Alternatively, the power RX circuit 1010 may be replaced with a power supply, which may also replace the battery charger and DC-DC converter 1012.

The power conversion TX circuit 1018 generates a magnetic field that is magnetically coupled to the power RX circuit of the peripheral device power module via one or more of a plurality of coils. The power conversion TX circuit 1018 may be sourced by the DC rail voltage when the WP TX unit 948 is proximal to the power transmitter circuit or the battery 1014 when the WP TX unit 948 is not proximal to the power transmitter circuit.

The WP TX unit 948 communicates with the peripheral device power module via the wireless transceivers 1006 (e.g., RF, MMW, and/or NFC) regarding wireless power matters (e.g., frequency selection, operating frequency, impedance matching settings, power levels, etc.). In addition, the wireless transceivers 1006 may be used to convey data between the peripheral device and the computer, via the WP TX Unit 1018. For example, if the peripheral device is the wireless keyboard 602, the keyboard 602 signaling may be conveyed to the computer via the wireless transceivers 1006. Note that with multiple peripheral devices 602-610, each including a wireless transceiver, a local area network is created, which requires network level coordinate of communications therein.

Figure 65:
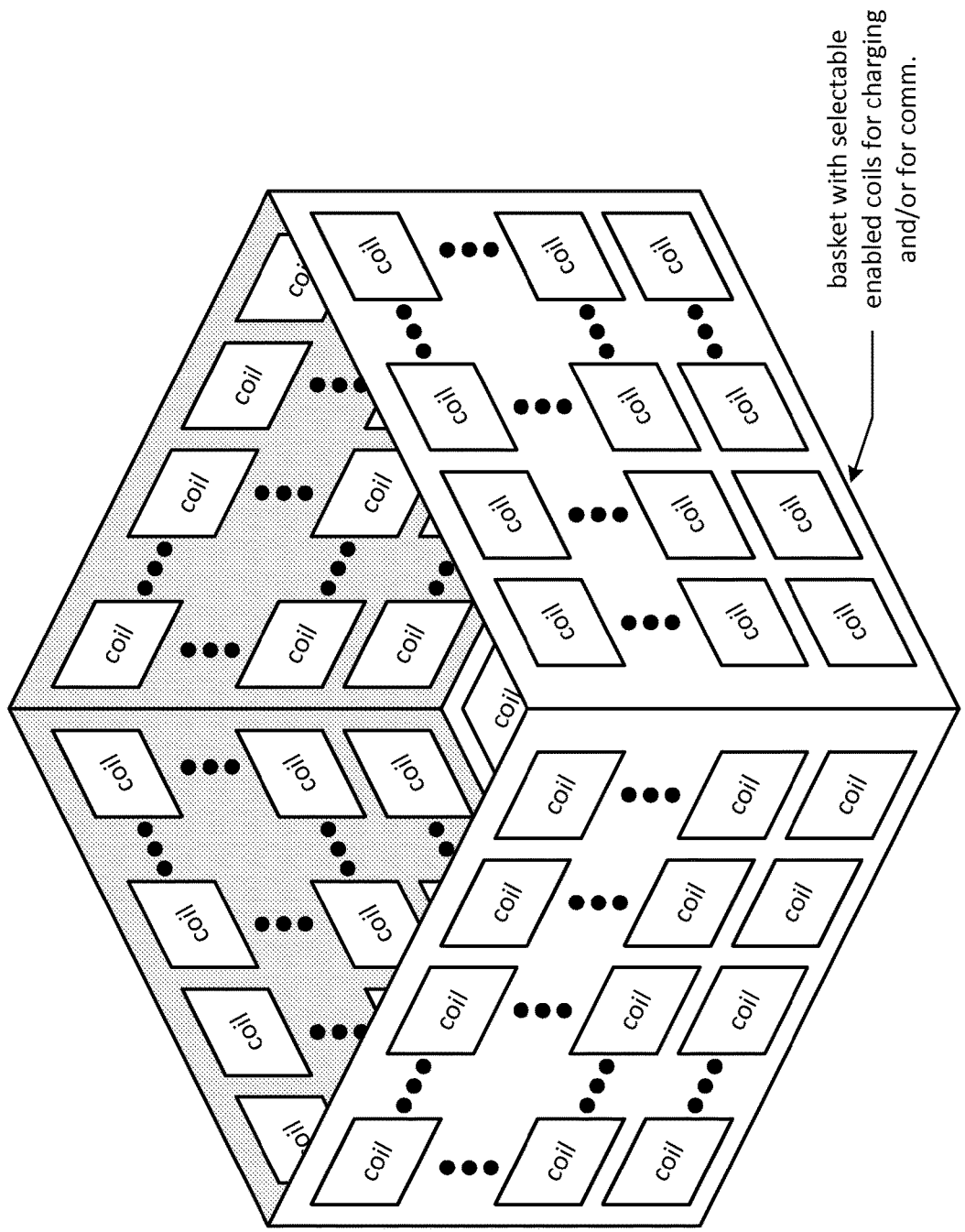
FIG. 65 is a diagram of an example of a coil grid of a wireless charging basket in accordance with the present invention.

FIG. 65 is a diagram of an example of a wireless charging basket that includes a plurality of coil circuits. In this embodiment, each side and the bottom of the basket includes a plurality of coils. The basket may be powered by an AC voltage, which is converted into a DC voltage or powered by wireless power. In such a configuration, one or more devices (e.g., cell phones, personal AV players, etc.) may be placed in the basket and charged. Examples are provided with reference to FIGS. 66 & 67.

Figure 66:
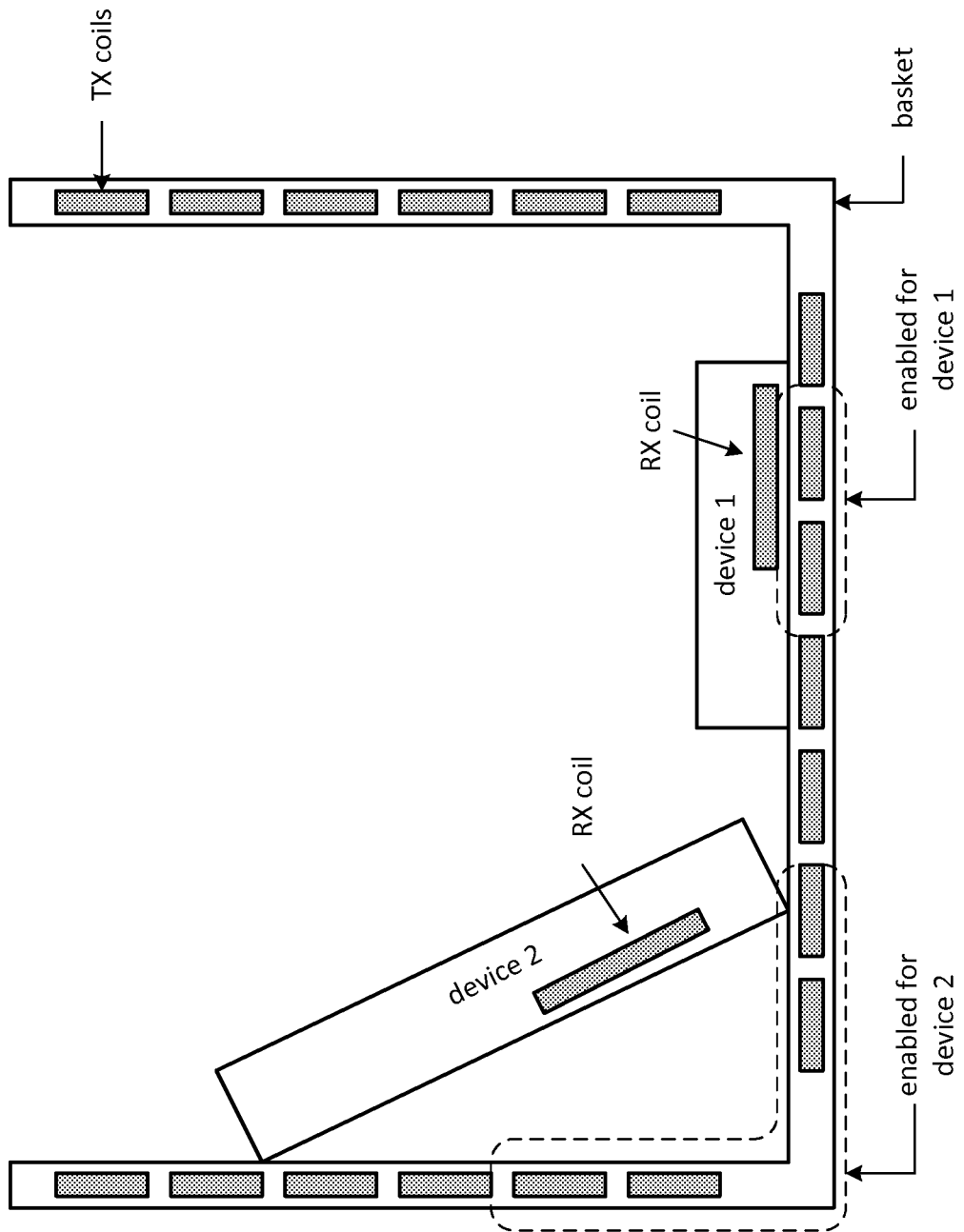
FIG. 66 is a diagram of another example of a coil grid of a wireless charging basket in accordance with the present invention.

FIG. 66 is a diagram of another example of a wireless charging basket that has two devices placed therein. As shown, device 1 is laying parallel to the bottom of the basket and the second device is leaning against one of the walls. The RX coil of each device is also shown. In this example, a few coils in the bottom of the basket are enabled to wirelessly power the first device.

Coils in the bottom and the side are enabled to provide wireless power to the second device. The coils in the bottom and side may be concurrently enabled or alternatively enabled (e.g., the coils in the side then the coils in the bottom). While the second device is not parallel to a side or the bottom, enable multiple coils in different planes enhances the magnetic coupling to the coil. In this example, the coils enabled to wirelessly power the second device may be enabled at a different frequency and the coils enabled to power the first device.

Figure 67:
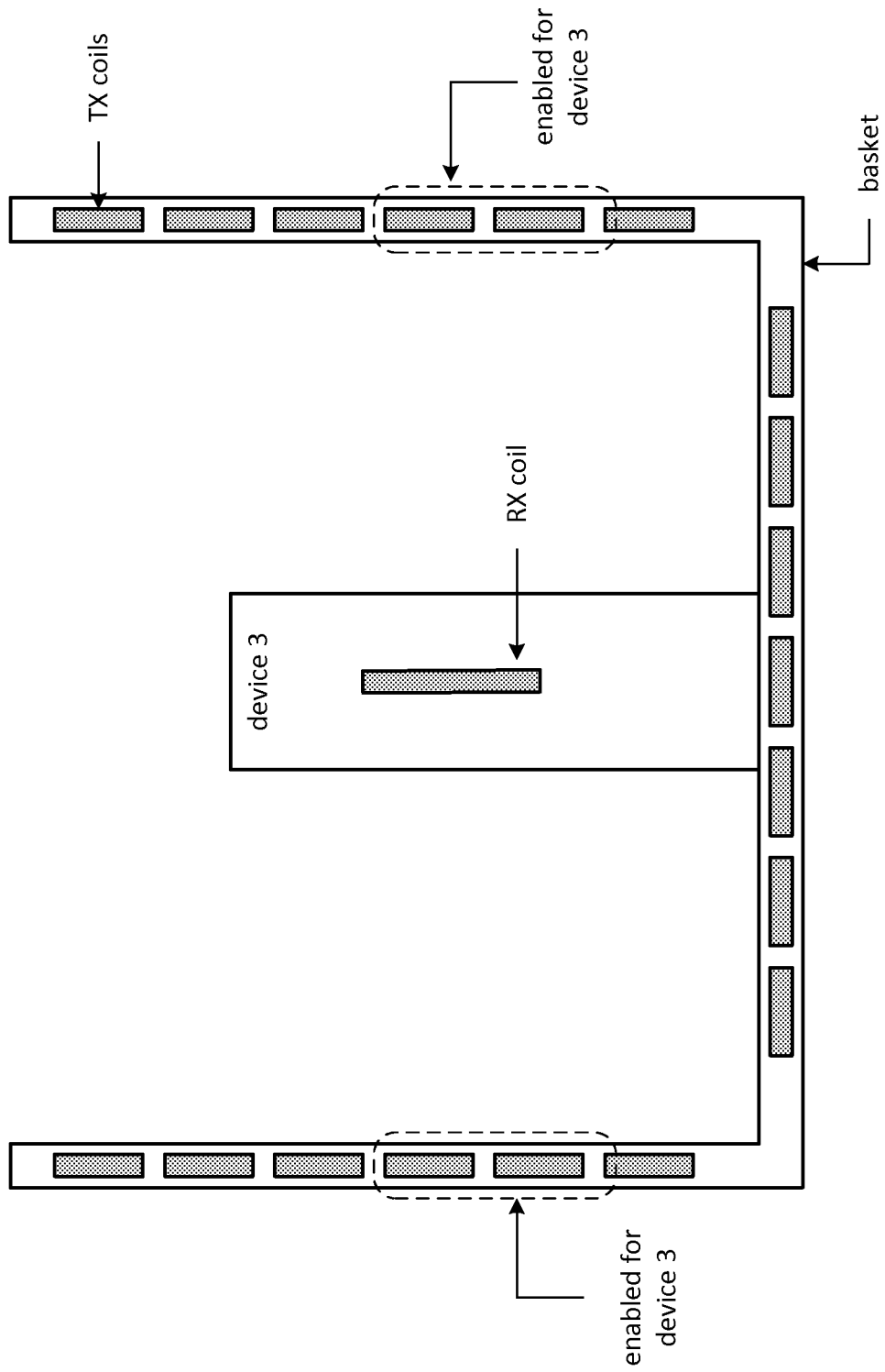
FIG. 67 is a diagram of another example of a coil grid of a wireless charging basket in accordance with the present invention.

FIG. 67 is a diagram of another example of a wireless charging basket that has a device located in the center of the basket and substantially parallel to the sides. In this example, coils on both sides may be enabled to wirelessly power the device. The coils on one side may be enabled uses the same frequency or a different frequency than the coils on the other side.

Figure 68:
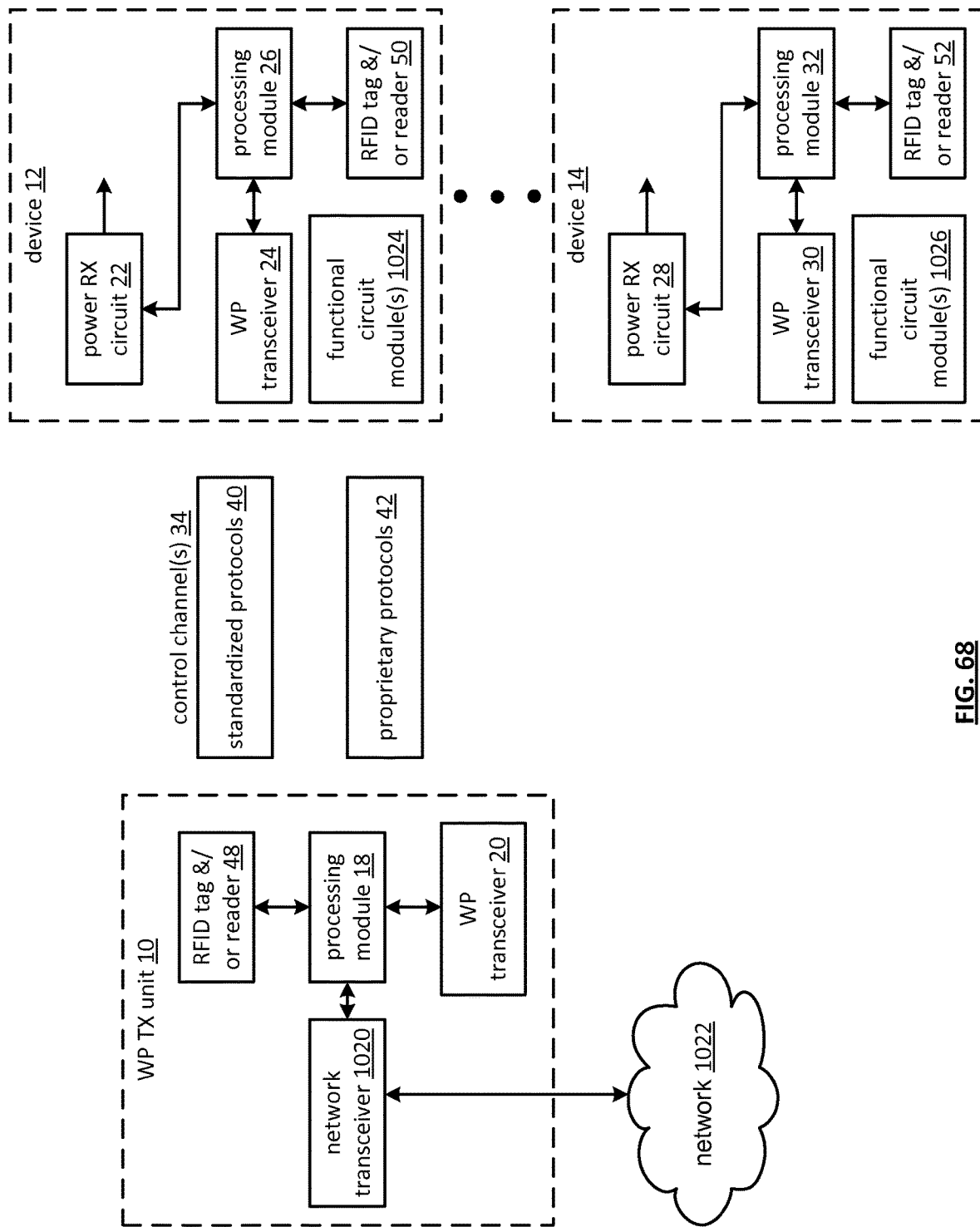
FIG. 68 is a schematic block diagram of another embodiment of a wireless power system in accordance with the present invention.

FIG. 68 is a schematic block diagram of another embodiment of a wireless power system that includes a WP TX unit 10 and a plurality of devices 12-14 (e.g., cell phone, personal AV player, laptop computer, touch panel computer, video game unit, etc.). The WP TX unit 10 includes a processing module 18, the WP transceiver 20, an RFID tag and/or reader 48, a network transceiver 1020, and a power TX circuit (not shown in figure). The network transceiver 1020 may provide a wired or a wireless network connection to a network 1022 (e.g., LAN, WAN, internet, cell telephone network, etc.). As such, the WP TX unit 10 may function as a router for communications between a device 12-14 and the network 1022. The WP TX unit 10 may be incorporated in a network device 12-14 such as a computer, access point, router, modem, etc. The other aspects of the devices 12-14 and the WP TX unit 10 function as previously described.

Figure 69:
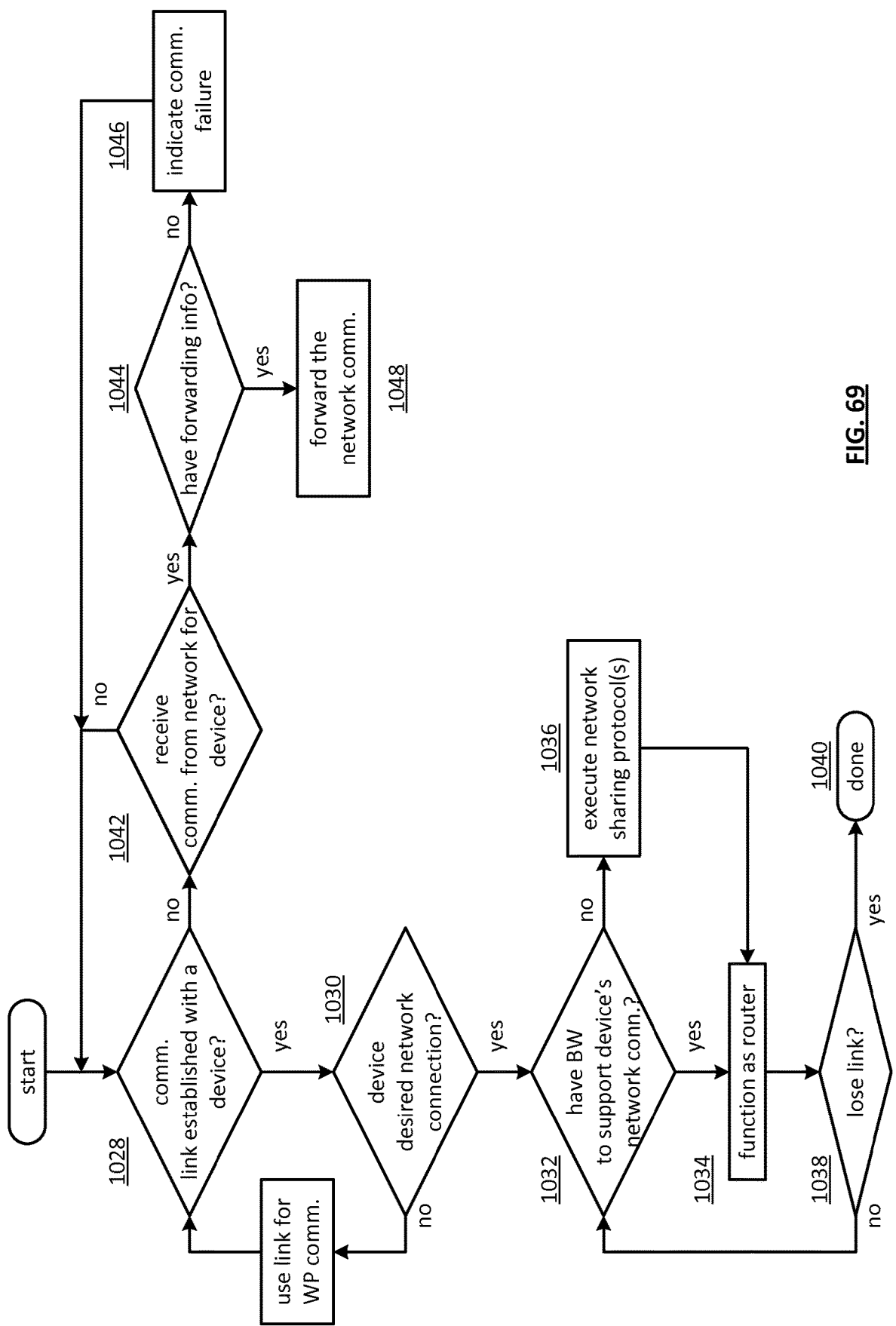
FIG. 69 is a logic diagram of an embodiment of a method for managing communication in a wireless power computer system in accordance with the present invention.

FIG. 69 is a logic diagram of an embodiment of a method for managing communication in a wireless power computer system that begins with the WP TX unit determining whether it has established a communication link with one or more of the devices 1028. If yes, the method continues with the WP TX unit determining whether the device desires access to the network via the WP TX unit 1030. If not, the method repeats from the beginning.

If the device desires network access via the WP TX unit, the method continues with the WP TX unit determining whether it has the bandwidth (BW) to support the device's network access request, which includes a requested data rate 1032. In this instance, the WP TX unit is determining whether it can accommodate the requested data rate in light of its capabilities and the data rates of the other devices it is currently supporting. When the WP TX unit has sufficient bandwidth, the method continues with the WP TX unit functioning as a wireless router for the device with respect to the network 1034.

If the WP TX unit does not have sufficient bandwidth to support the device's request, the method continues with the WP TX unit executing one or more network access sharing protocols 1036. Such protocols may include CSMA, CSMA with collision avoidance, CSMA with collision detection, a token passing scheme, a ring scheme, a priority scheme, etc. The method continues with the WP TX unit functioning as a router for the device with respect to access to the network 1034. The method continues with the WP TX unit determining whether it has lost the communication link with the device 1038. If not, the method repeats at the determine bandwidth step 1032. If yes, the method is complete for this device, but continues for other devices 1040.

If the WP TX unit does not have a communication link established with the device, the method continues with the WP TX unit determining whether it has received a communication from the network for the device 1042. If not, the method repeats from the beginning. If yes, the method continues with the WP TX unit determining whether it can forward the information to the device or provides forwarding information to the network 1044. If not, the method continues with the WP TX unit indicating a communication failure and the method repeats at the beginning 1046. If it does have the forwarding information, the method continues with the WP TX unit forwarding the communication or providing the forwarding information to the network 1048.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A primary device comprising:
    a wireless power receiver circuit that receives a first electromagnetic signal;
    a first power conversion circuit that transforms the first electromagnetic signal into a first power, wherein the first power is arranged to power the primary device;
    a second power conversion circuit that transforms at least a portion of the first power into a second electromagnetic signal;
    a wireless power transmitter circuit that transmits the second electromagnetic signal;
        wherein the first electromagnetic signal has a first frequency,
        wherein the second electromagnetic signal has a second frequency,
        wherein the first frequency is different from the second frequency; and
    a transceiver,
    wherein the second electromagnetic signal is configured to provide second power to a peripheral device,
    wherein the peripheral device is configured to perform an input or output function of user data under the control of the primary device,
    wherein the transceiver exchanges first information comprising the user data,
    wherein the transceiver exchanges second information comprising electromagnetic field configuration information, and wherein the peripheral device is configured to receive the second electromagnetic signal based on the electromagnetic field configuration information,
    wherein the first information is communicated utilizing a third frequency that is different than the first frequency and the second frequency,
    wherein the third frequency is selected to avoid interference with harmonics of the first frequency and the second frequency.

2. The primary device of claim 1, wherein the first power conversion circuit transforms the first electromagnetic signal into a DC voltage, and wherein the second power conversion circuit transforms at least a part of the DC voltage into the second electromagnetic signal.

3. The primary device of claim 1, wherein the primary device transmits the second electromagnetic signal contemporaneously with the primary device receiving the first electromagnetic signal.

4. The primary device of claim 1, wherein the device comprises:
    a battery;
    a battery charger; and
    a processing circuit;
    wherein the battery charger receives the first power,
    wherein the battery charger charges the battery using the first power;
    wherein the processing circuit controls the battery charger's charging of the battery,
    wherein the processing circuit controls the transceiver's exchange of the first information,
    wherein the processing circuit controls the transceiver's exchange of the second information.

5. The primary device of claim 1,
    wherein the primary device comprises a computer; and
    wherein the peripheral device is selected from the group consisting of a keyboard, a mouse, a track ball, a game controller, a cell phone, a hard drive, a memory device, a digital camera, and a personal A/V player.

6. The primary device of claim 1, wherein the second information comprises one or more of control channel protocol, a frequency of the second electromagnetic signal, an impedance matching parameter, and a resonant frequency tuning parameter.

7. The primary device of claim 1, wherein the transceiver exchanges first information related to at least one of receiving input data from the peripheral device and transmitting output data to the peripheral device.

8. The primary device of claim 1, wherein first information comprises one or more of input data, an input command, output data, and an output command.

9. A circuit comprising:
at least a part of a wireless power receiver circuit that receives a first electromagnetic signal;
at least a part of a first power conversion circuit that transforms the first electromagnetic signal into a first power, wherein the first power is arranged to power a primary device that includes the circuit;
at least a part of a second power conversion circuit that transforms at least a portion of the first power into a second electromagnetic signal;
wherein the first electromagnetic signal has a first frequency,
wherein the second electromagnetic signal has a second frequency,
wherein the first frequency is different from the second frequency; and
at least a part of a wireless power transmitter circuit that transmits the second electromagnetic signal;
at least a part of a transceiver; and
a processor circuit;
wherein the processor circuit controls the transforming of the first electromagnetic signal into the first power,
wherein the processor circuit controls the transforming of the at a least portion of the first power into the second electromagnetic signal,
wherein the second electromagnetic signal is configured to provide second power to a peripheral device,
wherein the peripheral device is configured to perform an input or output function of user data under the control of the primary device,
wherein the transceiver exchanges first information comprising the user data,
wherein the transceiver exchanges second information with the peripheral device comprising electromagnetic field configuration information,
wherein the peripheral device is configured to receive the second electromagnetic signal based on the electromagnetic field configuration information,
wherein the first information is communicated utilizing a third frequency that is different than the first frequency and the second frequency,
wherein the third frequency is selected to avoid interference with harmonics of the first frequency and the second frequency.

10. The circuit of claim 9, wherein the second information comprises one or more of a control channel protocol,
a frequency of the second electromagnetic signal, an impedance matching parameter, and a resonant frequency tuning parameter.

11. The circuit of claim 9, wherein the first information comprises at least one of receiving input data from the peripheral device and transmitting output data to the peripheral device.

12. A wireless power system comprising:
a primary device; and
a peripheral device;
wherein the primary device comprises:
a first wireless power receiver circuit that receives a first electromagnetic signal;
a first power conversion circuit that transforms the first electromagnetic signal into a first power, wherein the first power is arranged to power the primary device;
a second power conversion circuit that transforms at least a portion of the first power into a second electromagnetic signal;
a wireless power transmitter circuit that transmits the second electromagnetic signal;
wherein the first electromagnetic signal has a first frequency;
wherein the second electromagnetic signal has a second frequency; and
wherein the first frequency is different from the second frequency; and
a first transceiver;
wherein the peripheral device is configured to perform an input or output function of user data under the control of the primary device,
wherein the peripheral device comprises:
a second wireless power receiver circuit that receives the second electromagnetic signal;
a third power conversion circuit that transforms the second electromagnetic signal into a second power, wherein the second power is arranged to power the peripheral device; and
a second transceiver;
wherein the first and second transceivers exchange first information, wherein the first information comprises the user data,
wherein the first and second transceivers exchange second information comprising electromagnetic field configuration information,
wherein the peripheral device is configured to receive the second electromagnetic signal based on the electromagnetic field configuration information,
wherein the first information is communicated utilizing a third frequency that is different than the first frequency and the second frequency,
wherein the third frequency is selected to avoid interference with harmonics of the first frequency and the second frequency.

13. The system of claim 12, wherein the first power conversion circuit transforms the first electromagnetic signal into a DC voltage, wherein the second power conversion circuit transforms at least a part of the DC voltage into the second electromagnetic signal.

14. The system of claim 12, wherein the primary device transmits the second electromagnetic signal contemporaneously with the primary device receiving the first electromagnetic signal.

15. The system of claim 12, wherein the primary device comprises:
a battery;
a battery charger; and
a processing circuit;
wherein the battery charger receives the first power;
wherein the battery charger charges the battery using the first power,
wherein the processing circuit controls the battery charger's charging of the battery,
wherein the processing circuit controls the first transceiver's exchange of the first information,
wherein the processing circuit controls the first transceiver's exchange of the second information.

16. The system of claim 12, wherein the peripheral device comprises:
- a battery;
- a battery charger; and
- a processing circuit;
- wherein the battery charger receives the second power,
- wherein the battery charger charges the battery using the second power,
- wherein the processing circuit controls the battery charger's charging of the battery,
- wherein the processing circuit controls the second transceiver's exchange of the first information,
- wherein the processing circuit controls the second transceiver's exchange of the second information.

17. The system of claim 12,
- wherein the primary device comprises a computer; and
- wherein the peripheral device is selected from the group consisting of a keyboard, a mouse, a track ball, a game controller, a cell phone, a hard drive, a memory device, a digital camera, and a personal A/V player.

18. The system of claim 12, wherein the second information comprises one or more of a control channel protocol, a frequency of the second electromagnetic signal, an impedance matching parameter, and a resonant frequency tuning parameter.

19. The system of claim 12, wherein the peripheral device comprises a peripheral processing circuit that performs at least one of providing input data to the primary device and receiving output data from the primary device.

20. The system of claim 12, wherein first information comprises one or more of input data, an input command, output data, and an output command.

* * * * *